US005462224A

United States Patent [19]
Enoki et al.

[11] Patent Number: 5,462,224
[45] Date of Patent: Oct. 31, 1995

[54] HOT AND COLD WATER MIXING DISCHARGE DEVICE

[75] Inventors: Masatoshi Enoki; Osamu Tokunaga; Shinichi Yamato; Masahiko Imazono, all of Kitakyushu, Japan

[73] Assignee: Toto Ltd., Kitakyushu, Japan

[21] Appl. No.: 303,578

[22] Filed: Sep. 8, 1994

Related U.S. Application Data

[62] Division of Ser. No. 187,825, Jan. 27, 1994, abandoned, which is a division of Ser. No. 867,234, Jun. 3, 1992, abandoned.

[30] Foreign Application Priority Data

Oct. 5, 1990 [JP] Japan ............................ 2-269095

[51] Int. Cl.⁶ .................................................. G05D 23/13
[52] U.S. Cl. ........................................ 236/12.13; 137/606
[58] Field of Search .......................... 236/12, 13, 12.2; 137/606, 896, 897, 898

[56] References Cited

U.S. PATENT DOCUMENTS

| | | | |
|---|---|---|---|
| 2,296,266 | 9/1942 | Breckenridge | 236/12.13 |
| 2,581,855 | 1/1952 | Griffith | 137/606 X |
| 2,830,618 | 4/1958 | Mitchell | 137/606 X |
| 3,929,283 | 12/1975 | Delpa | 236/12 R |
| 4,819,867 | 4/1989 | Delpa | 236/12.16 |
| 5,050,640 | 9/1991 | Cowley | 137/606 |

FOREIGN PATENT DOCUMENTS

| | | |
|---|---|---|
| 0189170 | 1/1986 | European Pat. Off. . |
| 0257135 | 3/1988 | European Pat. Off. . |
| 0470647 | 7/1989 | European Pat. Off. . |
| 0324367 | 10/1989 | European Pat. Off. . |
| 0426639 | 10/1990 | European Pat. Off. . |
| 8800204 | 2/1988 | France . |
| 7340290 | 1/1989 | France . |
| 3537474 | 4/1987 | Germany . |
| 49-7980 | 2/1974 | Japan . |
| 50-79830 | 6/1975 | Japan . |
| 58-946683 | 6/1983 | Japan . |
| 58-152984 | 9/1983 | Japan . |
| 61-50194 | 1/1986 | Japan . |
| 61-157881 | 7/1986 | Japan . |
| 61-248970 | 11/1986 | Japan . |
| 61-295436 | 12/1986 | Japan . |
| 61-44062 | 12/1986 | Japan . |
| 61-295437 | 12/1986 | Japan . |
| 62-98879 | 6/1987 | Japan . |
| 63-53379 | 7/1988 | Japan . |
| 63-210485 | 9/1988 | Japan . |
| 64-79519 | 3/1989 | Japan . |
| 266384 | 10/1989 | Japan . |

*Primary Examiner*—William E. Tapoical
*Attorney, Agent, or Firm*—Ladas & Parry

[57] ABSTRACT

An automatic temperature control means 16 for automatically generating a mixed warm water of prescribed temperature by mixing an introduced hot water from a hot water inflow passage 14 and an introduced cold water from a cold water inflow passage 12 with each other at a flow rate ratio corresponding to the prescribed temperature, and a flow rate control means 19 for regulating the temperature of the discharged mixed warm water by mixing it with a hot or cold water introduced from the hot or cold water inflow passage 14 or 12 through a by-pass 18 around the former means are provided. As a result, mixed warm water of desired temperature can be easily obtained by manipulating the flow rate control means 19.

6 Claims, 53 Drawing Sheets

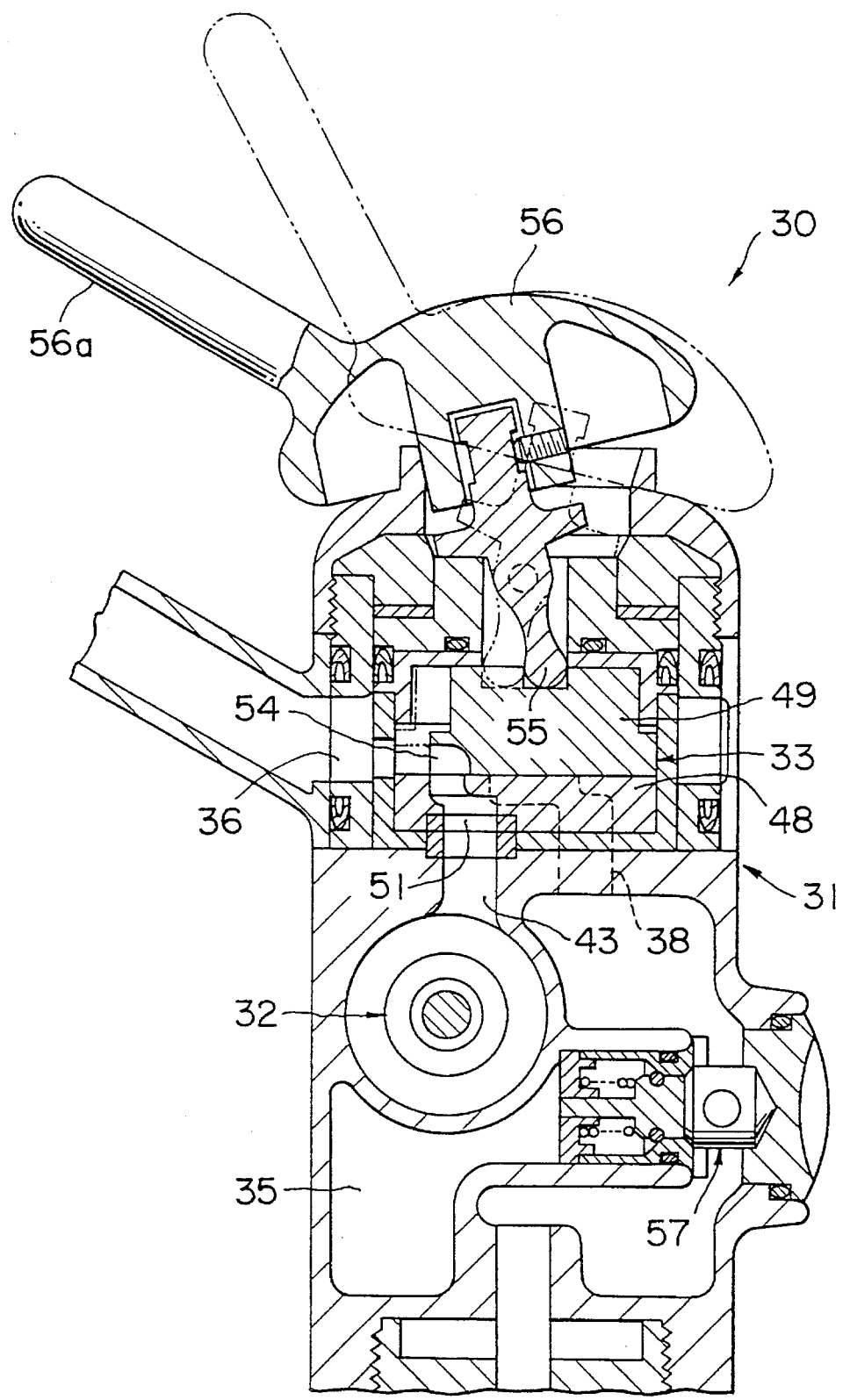
F I G. 4

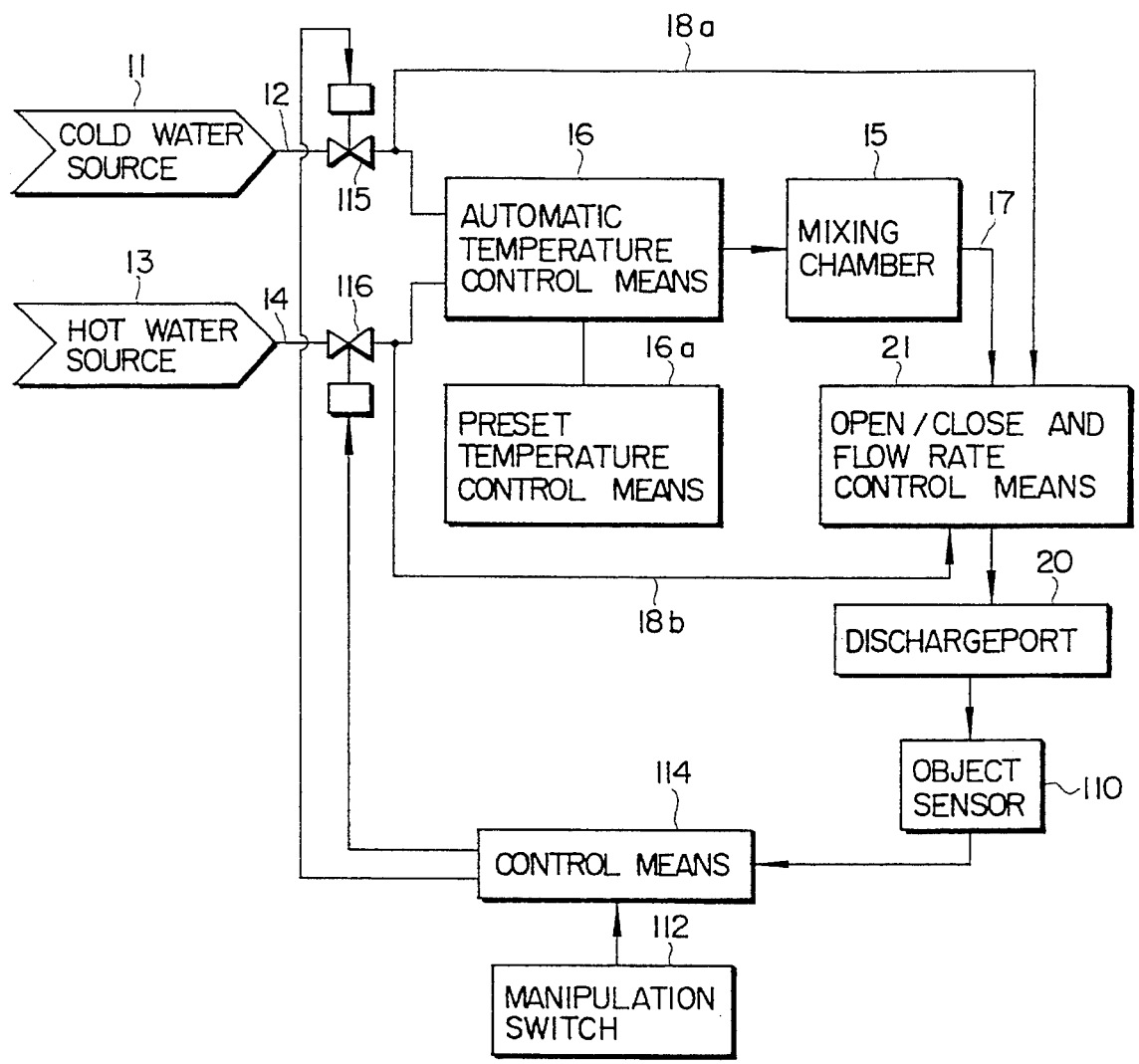
F I G . 40

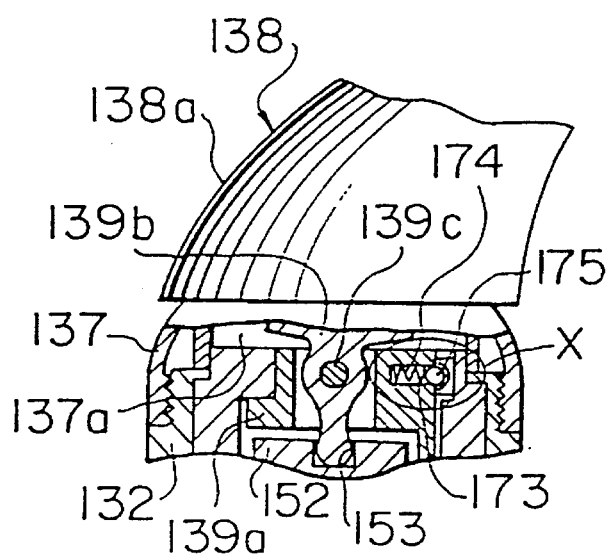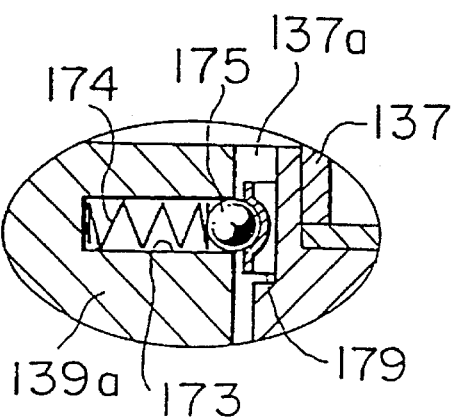
FIG.54A      FIG.54B
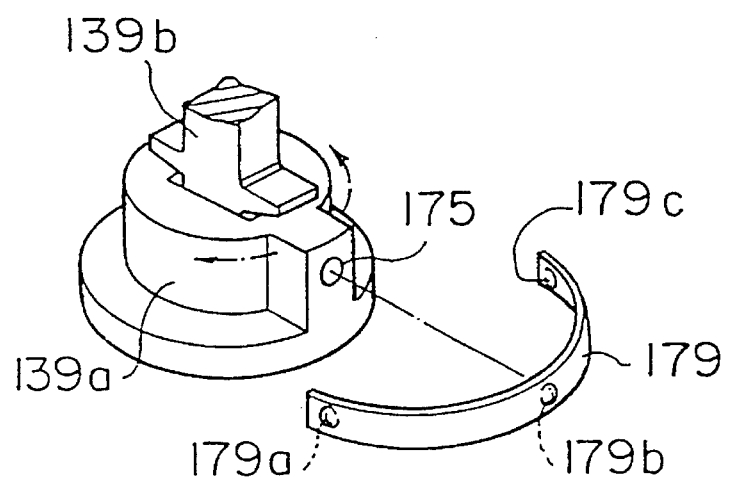
FIG.55

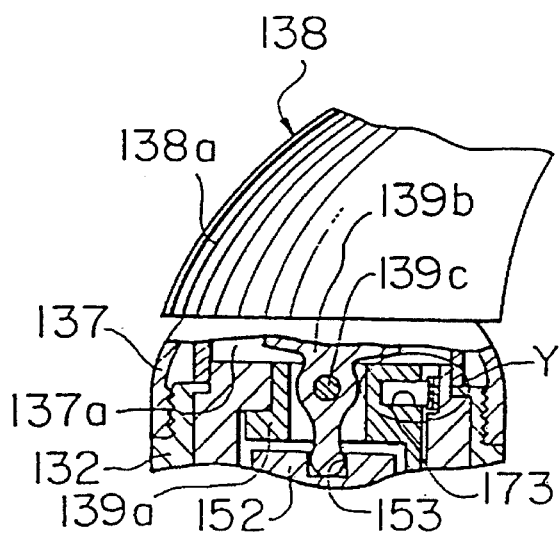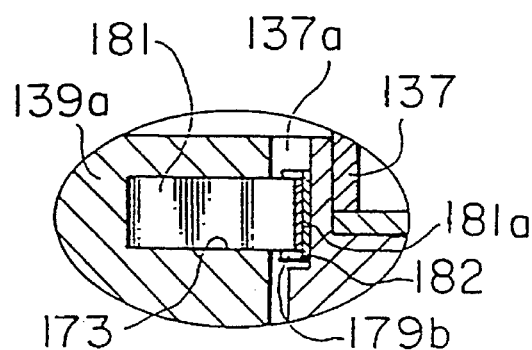
FIG. 56A  FIG. 56B
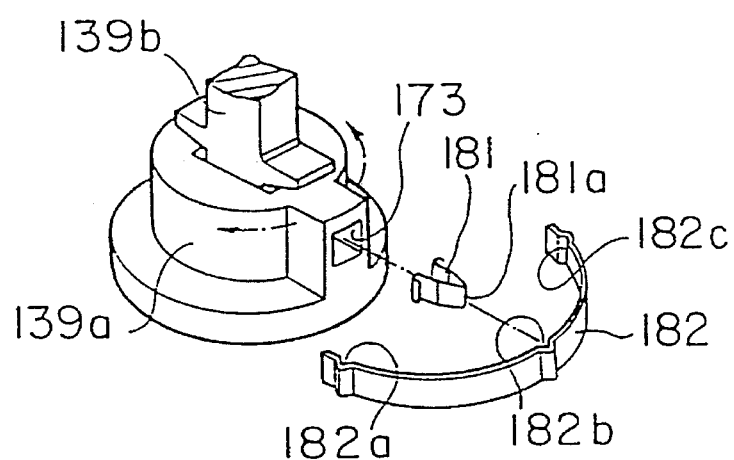
FIG. 57

HOT AND COLD WATER MIXING DISCHARGE DEVICE

This is a divisional of application(s) Ser. No. 08/187,825 filed on Jan. 27, 1994, now abandoned which is a divisional of application Ser. No.: 07/867,234 filed on Jun. 3, 1992, now abandoned, and International Application PCT/JP91/01360 filed on Oct. 5, 1991 and which designated the U.S.

TECHNICAL FIELD

The present invention relates to a hot and cold water mixing discharge device which operates so that a hot water or high-temperature water supplied from a hot water source, and a cold water or low-temperature water supplied from a cold water source are mixed together to make a warm water of desired temperature, and the warm water is then discharged.

BACKGROUND ART

A hot and cold water mixing discharge device such as a hot and cold water mixing faucet is used in a place such as a kitchen, a bathroom and a lavatory so that the device can receive a hot and a cold waters at the same time, and mix them together in appropriate quantities to discharge a warm water of appropriate temperature such as about 30° to 45° C. Although such faucets of various constructions are known, typical ones of them are a thermostatic mixing valve unit, a hot and cold water mixing faucet of the single manipulation handle type and so forth. The thermostatic mixing valve unit includes an automatic temperature control section provided in a warm water passage to automatically regulate the ratio of the flow rates of a hot and a cold waters through a temperature sensor to keep the temperature of a mixed warm water at a preset temperature, and an open/close section provided in the body of the unit separately from the former section to start and stop the discharge of the warm water and regulate the flow rate thereof. In the faucet of the single manipulation handle type, a temperature control section and an open/close section are integrally provided so that the sections can be manipulated by horizontally turning and vertically swinging a single handle with the lever thereof.

Since the temperature control section for presetting and regulating the temperature and the open/close section for starting and stopping the discharge of the warm water and regulating the flow rate thereof are provided separately from each other in the thermostatic mixing valve unit, it takes time and trouble to manipulate the unit. When only a warm water of preset temperature is to be always discharged from the unit, the temperature is only once preset by the temperature control section and the open/close section is thereafter manipulated. However, every time a warm water of temperature different from an already preset temperature is to be discharged from the unit, the temperature control section is manipulated again to preset the former temperature to replace the latter and the open/close section is thereafter manipulated. For that reason, it is troublesome to manipulate the unit in the latter case.

Since the hot and cold water mixing faucet of the single manipulation handle type does not have a thermostatic function, the temperature of a warm water to be discharged is likely to sharply change due to the change in the pressure of a supplied cold or hot water or the temperature of the hot water after the regulation of the former temperature to give an unpleasant feeling or even cause a scald. Since the faucet does not have a means for enabling the user of the faucet to swing and turn the handle thereof stepwise to precisely set the flow rate and temperature of the warm water at desired levels, the user only depend on his sixth sense for the setting. For that reason, the warm water is likely to be discharged too much or discharged to make intense splashes. Since the regulation of the temperature and flow rate of the discharged warm water and the start and stoppage of the discharge thereof and the regulation can be performed by manipulating the handle with the lever thereof, the manipulating property of the faucet is very high. However, since even a little child can easily move the handle with the lever thereof, he is likely to discharge very hot water from the faucet for fun or by mistake. Besides, a part of a person is likely to unexpectedly come into contact with the handle to move it to discharge very hot water from the faucet.

The present invention was made in consideration of the above-mentioned problems of the prior arts. Accordingly, it is an object of the invention to provide a hot and cold water mixing faucet or a hot and cold water mixing discharge device, which is better in manipulating property than the conventional thermostatic mixing valve unit and higher in the stability of the temperature of discharged water than the conventional hot and cold water mixing faucet of the single manipulation handle type.

DISCLOSURE OF THE INVENTION

The hot and cold water mixing discharge device provided in accordance with the present invention comprises a cold water inflow passage connected to a cold water source; a hot water inflow passage connected to a hot water source; a mixing chamber in which a cold and a hot waters are mixed together to make a warm water; an automatic temperature control means disposed between the mixing chamber and each of the cold and the hot water inflow passages so that the ratio of the flow rates of the cold and the hot waters flowing into the mixing chamber is automatically modulated by the means depending on a preset temperature; a warm water passage communicating with the mixing chamber; a by-pass for optionally connecting the cold or hot water inflow passage to the warm water passage around the means; a flow rate control means for regulating the flow rate of the cold or hot water flowing to the warm water passage through the by-pass; and a discharge port provided at the downstream end of the warm water passage.

The flow rate control means may include a fixed valve member; a movable valve member water-tightly and slidably thereon; and a handle coupled to the movable valve member and supported by the body of the device so that the handle can be vertically swung with the lever thereof to regulate the flow rate of the warm water about to be discharged from the discharge port, and can be horizontally turned with the lever to regulate the temperature of the warm water about to be discharged from the port.

The device may include a plurality of engagement parts provided at prescribed intervals and capable of being vertically swung or horizontally turned together with the handle.

The device may include a stopper means for preventing the handle from being moved beyond a prescribed position in such a direction as to heighten the temperature of the discharged warm water; a safety button provided in the handle; and a prevention annulment means for putting the stopper means out of preventive action by pressing the button in.

The device may include a stopper means for preventing the handle from being moved beyond a prescribed position in such a direction as to increase the flow rate of the discharged warm water; and a prevention annulment means for putting the stopper means out of preventive action.

BRIEF DESCRIPTION OF THE DRAWINGS

FIG. 4 is a front-to-rear sectional view of the faucet;

FIG. 40 is a block diagram of a hot and cold water mixing discharge device which is yet another embodiment of the invention;

FIG. 54(A) is a cutaway side view of a hot and cold water mixing faucet which is yet another modification of that shown in FIG. 45;

FIG. 54(B) is an enlarged sectional view of a portion X of the faucet;

FIG. 55 is a perspective exploded view of a major part of the faucet;

FIG. 56(A) is a cutaway side view of a hot and cold water mixing faucet which is yet another modification of that shown in FIG. 45;

FIG. 56(B) is an enlarged sectional view of a portion Y of the faucet;

FIG. 57 is a perspective exploded view of a major part of the faucet;

BEST MODE FOR CARRYING OUT THE INVENTION

Figure 1:
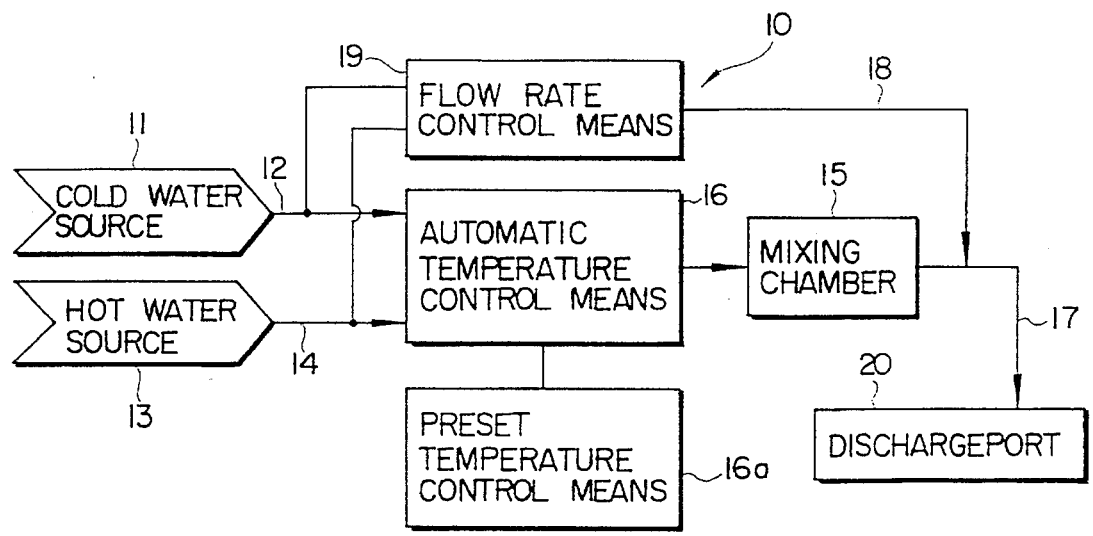
FIG. 1 is a block diagram of the basic constitution and operation of a hot and cold water mixing discharge device which is an embodiment of the present invention.

FIG. 1 is a block diagram of the basic constitution and operation of a hot and cold water mixing discharge device 10 which is an embodiment of the present invention. The device 10 comprises a cold water inflow passage 12 connected to a cold water source 11; a hot water inflow passage 14 connected to a hot water source 13; a mixing chamber 15 in which a cold water supplied from the cold water source and a hot water supplied from the hot water source are mixed together to make a warm water; an automatic temperature control means 16 provided between the mixing chamber and each of the inflow passage so that the ratio of the flow rates of the cold and the hot waters flowing into the mixing chamber is automatically regulated by the means depending on a preset temperature; a warm water passage 17 communicating with the mixing chamber; a by-pass 18 for optionally connecting the cold water inflow passage or the hot water inflow passage to the warm water passage around the control means; a flow rate control means 19 provided in the by-pass to regulate the flow rate of the cold or hot water flowing to the warm water passage through the by-pass; and a discharge port 20 provided at the downstream end of the warm water passage. The automatic temperature control means 16 includes a preset temperature change means 16a for charging the preset temperature for the control means.

The cold and the hot waters flow from the cold and the hot water sources 11 and 13 into the automatic temperature control means 16 through the cold and the hot water inflow passages 12 and 14, respectively, and are then mixed together in the mixing chamber 15. At that time, the ratio of the flow rates of the cold and the hot waters flowing out of the control means 16 into the mixing chamber 15 is automatically regulated by the means depending on the preset temperature, so that the warm water of appropriate temperature is generated in the chamber, and then discharged from the discharge port 20 through the warm water passage 17. If the temperature of the discharged warm water is to be increased, the flow rate control means 19 is manipulated to an appropriate flow rate of the hot water to flow from the hot water inflow passage 14 to the warm water passage through the by-pass 18. If the temperature of the discharged warm water is to be decreased, the flow rate control means 19 is manipulated to cause an appropriate flow rate of the cold water to flow from the cold water inflow passage 14 to the warm water passage 17 through the by-pass 18. Besides, the preset temperature for the discharged warm water can be optionally changed by the preset temperature change means 16a. Therefore, once the desired temperature is preset at the automatic temperature control means 16, the warm water of the desired temperature can be always automatically obtained from the device so that the temperature of the discharged warm water therefrom is kept stable. When the temperature of the discharged warm water is to be temporarily increased or decreased, the temperature control means 16 is not manipulated to change the preset temperature but the flow rate control means 19 is manipulated to supply the hot or cold water to the warm water passage 17 through the by-pass 18. For that reason, the manipulating property of the device is very good.

Figure 2:
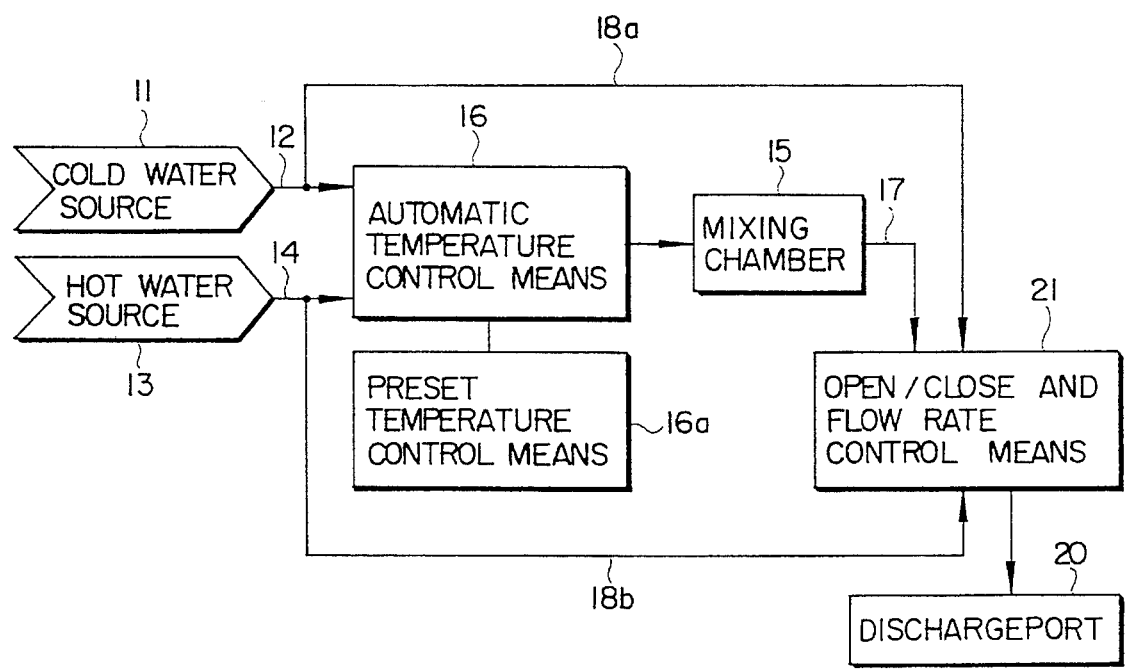
FIG. 2 is a block diagram of the basic constitution and operation of a hot and cold water mixing discharge device which is another embodiment of the invention.

FIG. 2 shows a hot and cold water mixing discharge device which is another embodiment of the present invention. The difference of the device from the preceding one is that this device includes an open/close and flow rate control means 21 provided disposed at the downstream ends of a cold water by-pass 18a and a hot water by-pass 18b not only regulate the flow rates of a cold and a hot waters, but also to regulate the flow rate of a warm water by changing the degree of opening of a warm water passage 17. The ratio of the flow rates of the cold and the hot waters to be mixed together in a mixing chamber 15 is automatically regulated by an automatic temperature control means 16 so that the warm water of appropriate temperature is generated in the chamber. The flow rate of the warm water is regulated by the open/close and flow rate control means 21 before the water is sent out therefrom to a discharge port 20. The flow rate of the warm water to be discharged from the port 20 can thus be optionally regulated to zero to a maximum level by the control means 21. The cold or hot water can be added at an appropriate flow rate to the warm water through the cold or hot water by-pass 18a or 18b and the control means 21 to easily decrease or increase the temperature of the warm water. The device can thus produce not only the same desirable effects as the preceding device, but also the other desirable effect that the flow rate of the warm water to be discharged from the faucet is controlled only by manipulating the open/close and flow rate control means 21.

FIGS. 3, 4, 5, 6, 7, 8 and 9 show a hot and cold water mixing faucet 30 which is a concrete example of the device shown in FIG. 2. The faucet includes a body 31, an automatic temperature control section 32 provided in the body, and an open/close and flow rate control section 33 provided in the body. The faucet also includes a hot water inflow passage 34, a cold water inflow passage 35, a water discharge passage 36, a hot water by-pass 37, and a cold water by-pass 38 which are provided in the body 31. Hot water from the hot water inlet passage 34 and cold water from the cold water inlet passage 35 flow to the water discharge passage 36 through the automatic temperature control section 32 and then the open/close and flow rate control section 33. The hot water by-pass 37 and the cold water by-pass 38 are for connecting the hot water inflow passage 34 and the cold water inflow passage 35 can be connected to the water discharge passage 36 through the open/close and flow rate control section 33.

The automatic temperature control section 32 has a hot water and a cold water temperature control valve seats 39 and 41 facing the body 31. A temperature control valve body 42 is provided at the valve seats 39 and 41 so that a hot water control valve 42a is made of the body and the seat 39, and a cold water control valve 42b is made of the body and the other seat 41. When the valve body 42 is moved in a direction, one of the valves 42a and 42b is closed and the other of them is opened. When the valve body 42 is moved in another direction reverse to the former, the former valve is opened and the latter is closed. A warm water passage 43 is formed behind the valve body 42, and communicates with the open/close and flow rate control section 33. A temperature sensor 44 is provided in the warm water passage 43, and kinematically associated with the valve body 42. When wax accommodated in the sensor 44 is thermally expanded or contracted, the sensor is moved back or forth from a preset position to move the valve body 42 back or forth from a preset position. A temperature presetting means 46 is coupled to the sensor 44 so that a spindle 45 can be turned to move the sensor back or forth to preset the position thereof to preset that of the temperature control valve body 42. The automatic temperature control section 32 extends rectangularly across the axis of the body 31 of the faucet 30. The spindle 45 projects at one end thereof from a side of the body 31, and is fitted with a temperature control knob 47 at that end.

Figure 5:
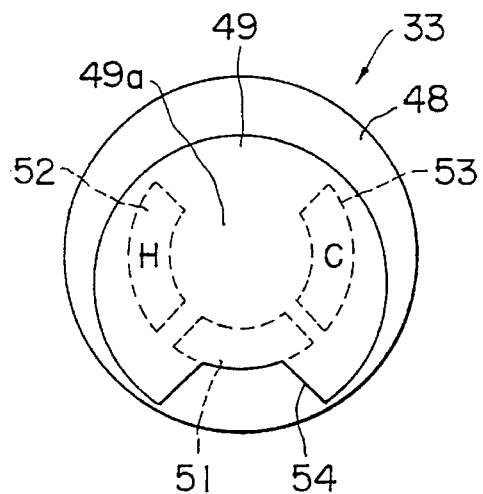
FIGS. 5, 6, 7, 8 and 9 are views to illustrate the operation of the fixed and movable valve bodies of the faucet.

The open/close and flow rate control section 33 includes a disk-shaped fixed valve body 48 secured to the body 31 of the faucet 30, and a movable valve body 49 water-tightly and slidably fitted on the fixed valve body. The fixed valve body 48 has a warm water inflow hole 51, a hot water inflow hole 52 and a cold water inflow hole 53 which extend through the body along the thickness thereof, as shown in FIG. 5, and communicate with the warm water inflow passage 43, the hot water by-pass 37 and the cold water by-pass 38, respectively. The inflow holes 51, 52 and 53 are shaped as mutually nearby arcs of a circle concentric to the cross section of the fixed valve body 48. The warm water inflow hole 51 is located between the hot water inflow hole 52 and the cold water inflow hole 53 so that there is a small distance between the warm water inflow hole and each of the other inflow holes. The movable valve body 49 has a plane surface 49a smaller in diameter than the fixed valve body 48 but extensive enough to cover all the three inlet holes 51, 52 and 53 of the fixed valve body as long as the movable valve body does not project from the fixed valve body in the diametrical direction thereof. The movable valve body 49 is overlaid on the fixed body valve 48 so that the former can be rectilinearly moved back and forth in any direction on the latter and circularly moved thereon.

The movable valve body 49 has a water outflow notch 54 at the peripheral edge of the bottom of the body on the fixed valve body 48 so that the notch can communicate with the discharge passage 36. The notch 54 is shaped as an arc, and virtually equal to or slightly larger in size than each of the three inflow holes 51, 52 and 53 of the fixed valve body 48. A handle 56 is provided at the top of the faucet body 31, and coupled to the top of the movable valve body 49 by a manipulative force transmission means 55. The handle 56 includes a lever 56a extending up forward at the front of the faucet body 31. The manipulative force transmission means 55 acts to circularly move the movable valve body 49 in response to the turning of the handle 56 and rectilinearly move the valve body back and forth in response to the vertical swing of the handle. Shown at 57 in FIG. 4 is a check valve.

Figure 8:
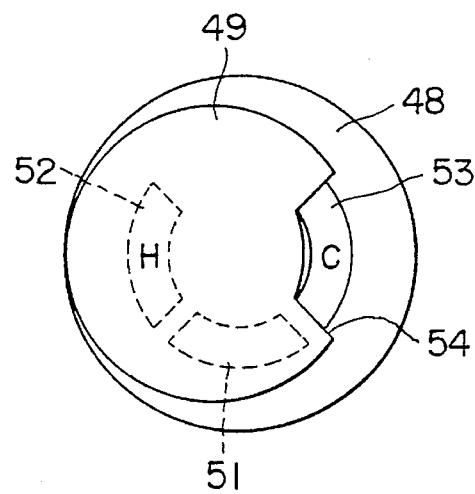
Figure 6:
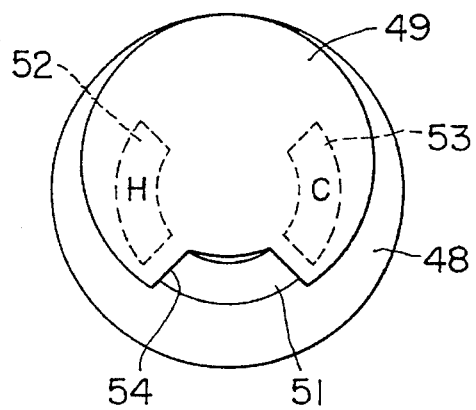
Figure 9:
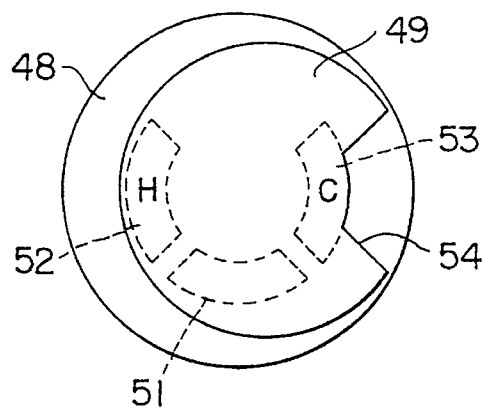
Figure 7:
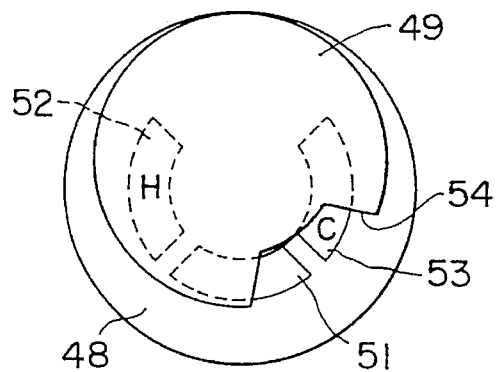
Figure 10:
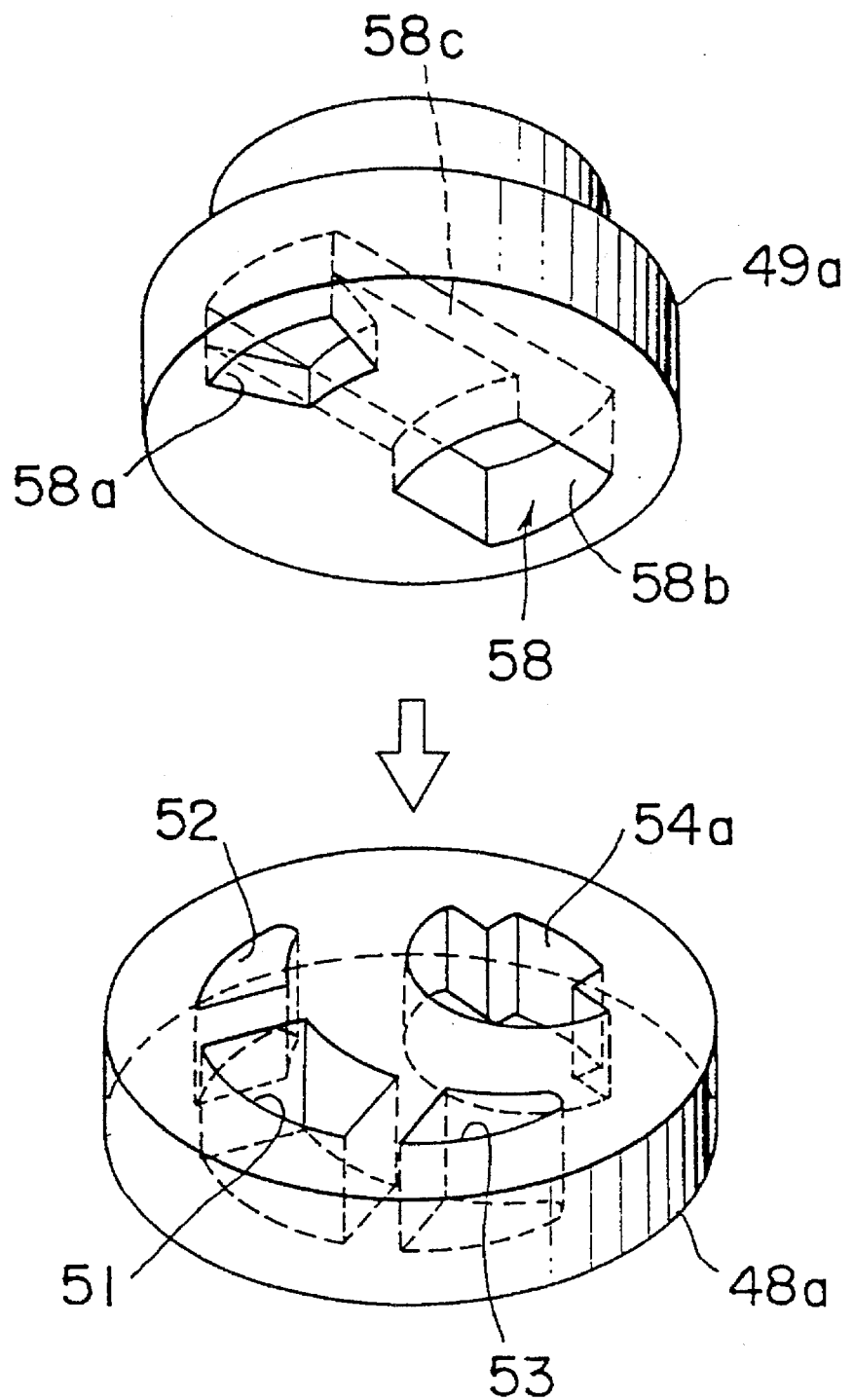
FIG. 10 is a perspective view of a fixed and a movable valve bodies which are modifications of those of the faucet.

The operation of the open/close flow rate control section 33 is described with reference to FIGS. 5, 6, 7, 8 and 9 from now on. When all the three inflow holes 51, 52 and 53 of the fixed valve body 48 are closed by the movable valve body 49 as shown in FIG. 5, no water is discharged from the faucet 30 through the discharge passage 36. At that time, the lever 56a of the handle 56 is located in a central uppermost position. When the lever 56a is then swung down to a central lowermost position, the movable valve body 49 is moved back and to outflow notch 54 thereof coincides with the warm water inflow hole 51, as shown in FIG. 6, so that warm of desired temperature preset by the automatic temperature control section 32 is discharged from the faucet 30 through the discharge passage 36. The flow rate of the discharged warm water depends on the position of the movable valve body 49 so as to be the maximum when the valve body is moved back most as shown in FIG. 6. When the lever 56a is then turned counterclockwise, the movable valve body 49 is also turned counterclockwise and the outflow notch 54 thereof partially coincide with the warm water inflow hole 51 and the cold water inflow hole 53, as shown in FIG. 7, so that warm water of the desired temperature and cold water are mixed together to make lower-temperature warm water which is discharged from the faucet 30 through the discharge passage 36. In that turning of the movable valve body 49, the ratio of the portion of the outflow notch 54, which coincides with the warm water inflow hole 51, and the ratio of the other portion of the notch, which coincides with the cold water inflow hole 53, change in inverse proportion to each other so that the former decreases, and the latter increases. When the lever 56a thereafter turned counterclockwise further, the movable valve body 49 is also turned counterclockwise further and the outflow notch 54 coincides with only the cold water inflow hole 53, as shown in FIG. 8, so that only the cold water is discharged from the faucet 30 through the discharge passage 36. When the lever 56a then swung up, the movable valve body 49 is moved forth and the outflow notch 54 does not coincide with the cold water inflow hole 53 at all, as shown in FIG. 9, so that no water is discharged from the faucet through the discharge passage 36. If the lever 56 is turned clockwise to shift the movable valve body 49 from the position shown in FIG. 6, the valve body is also clockwise turned and the outflow notch 54 coincides or does not coincide with the warm water outflow hole 51 and the hot water inflow opening 52 in the same manner as the above-described operation. Thus, the flow rate of the water to be discharged from the faucet 30 through the discharge passage 36 can be regulated within a range from zero to a maximum level by vertically swinging the lever 56 to move the movable valve body 49 back and forth, and the temperature of the water can be regulated by turning the lever to turn the movable valve body.

FIGS. 10, 11, 12, 13, 14, 15 and 16 show the fixed and movable valve bodies 48a and 49a of an open/close and flow rate control section 33a which is a modification of the preceding one 33. The fixed valve body 48a has a warm water inflow hole 51, a hot water inflow hole 52, a cold water inflow hole 53, and a water outflow hole 54a extending through the valve body along the thickness thereof. The movable valve body 49a has a passage 58 for connecting or disconnecting each of the three inflow holes to or from the outflow hole. The three inflow holes 51, 52 and 53 are disposed in a crescent form as a whole along a circle concentric to the fixed valve body 48a. The warm water inflow hole 51 is located between the hot water inflow hole 52 and the cold water inflow hole 53. The water outflow 54a is located inside the three inflow holes in the diametrical direction of the fixed valve body 48a, and shaped nearly as a mushroom. The passage 58 is opened at both the ends thereof in the bottom of the movable valve body 49a, which is slid on the fixed valve body 48a. The passage 58 has an inlet opening 58a for the three inflow holes 51, 52 and 53, an outlet opening 58b for the outflow hole 54a, and an intermediate opening 58c connecting the inlet and the outlet openings to each other. The outlet opening 58b is positioned and shaped in such a manner that it surely coincides with the water outlet hole 54a, in whatever position the movable valve body 49a is on the fixed valve body 48a. The inlet opening 58a is nearly the same in size and form as the warm water inflow hole 51, and is located to have the same relationship with the three inflow holes 51, 52 and 53 of the fixed valve body 48a as the water outflow notch 54 does with the three inflow holes 51, 52 and 53 in the preceding embodiment.

Figure 11:
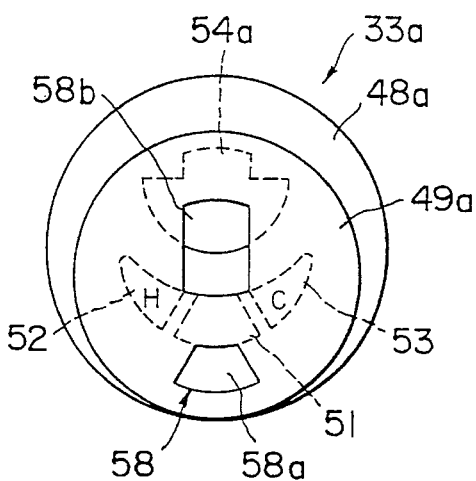
FIGS. 11, 12, 13, 14 and 15 are views to illustrate the operation of the valve bodies shown in FIG. 10.
Figure 14:
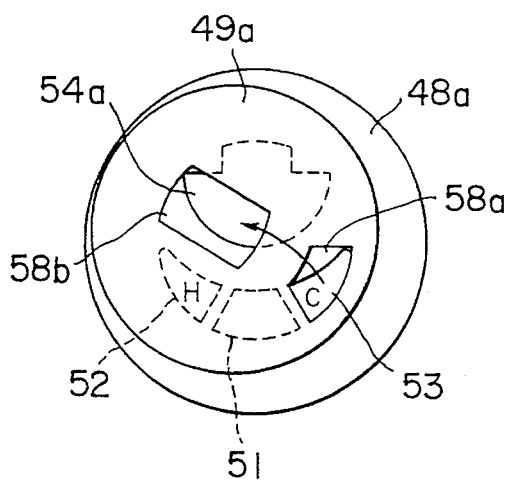
Figure 12:
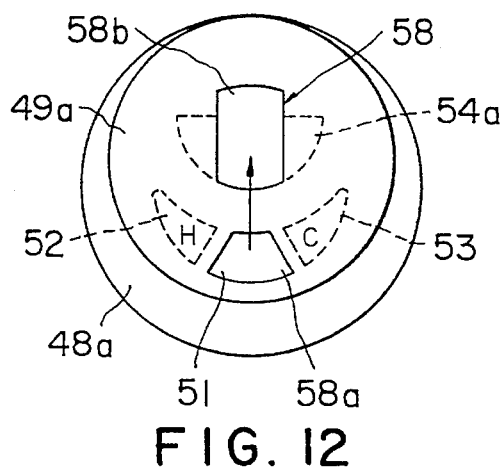
Figure 15:
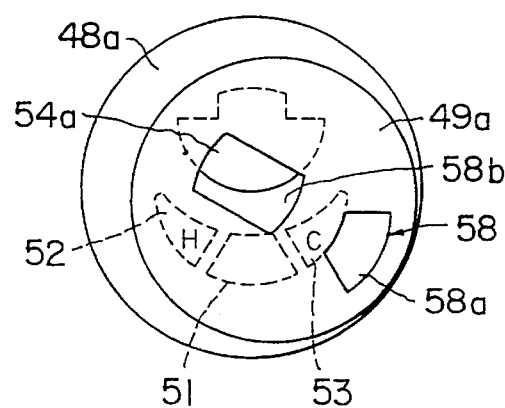
Figure 13:
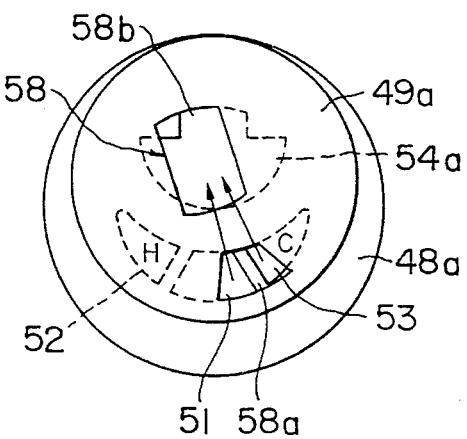
Figure 16:
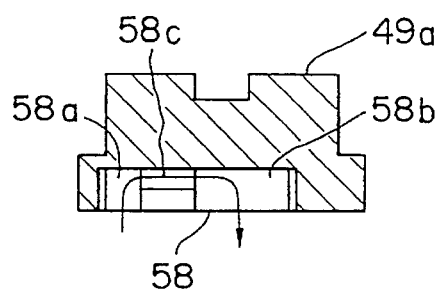
FIG. 16 is a front-to-rear sectional view of the movable valve body shown in FIG. 10.

When the lever 56a of the handle 56 is in a central uppermost position, in this embodiment, all the three inflow holes 51, 52 and 53 are closed by the movable valve body 49a as shown in FIG. 11, similarly to the preceding embodiment. When the lever 56a is then swung down, the inlet opening 58a of the passage 58 of the movable valve body 49a coincides with the warm water inflow hole 51 of the fixed valve body 48a, as shown in FIG. 12, so that warm water of desired temperature is discharged from the faucet through the water discharge passage 36. When the lever 56a is then turned counterclockwise, the movable valve body 49a is also counterclockwise turned and the inlet opening 58a partially coincides with the warm water inflow hole 51 and the cold water inflow hole 53, as shown in FIG. 13, so that the warm water of desired temperature and the cold water are mixed together to make a lower-temperature warm water which is discharged through the water discharge passage. When the lever 56a is turned counterclockwise further, the movable valve body 49a is also turned counterclockwise further and the inlet opening 58a coincides with only the cold water inflow hole 53, as shown in FIG. 14, so that only the cold water is discharged from the faucet through the discharge passage. the ratio of the cold water to the warm water to be mixed therewith increases gradually according as the lever 56a is turned counterclockwise to shift the movable valve body 49a from the position shown in FIG. 13, to that shown in FIG. 14. When the lever 56a is thereafter swung up, the inlet opening 58a does not coincide with the cold water inflow hole 53 at all, as shown in FIG. 15, so that all the three inflow holes 51, 52 and 53 are closed and no water is discharged from the faucet. If the lever 56a is turned clockwise to shift the movable valve body 49a from the position shown in FIG. 13, the movable valve body 49a is also turned counterclockwise so that the warm water and the hot water are mixed together to make a higher-temperature warm water which is discharged from the faucet through the discharge passage. When the lever 56a is then vertically swung as the inlet opening 58a is coincident with at least one of the inflow holes 51, 52 and 53, the area of the coincidence is increased or decreased to regulate the flow rate of the water which is discharged from the faucet through the discharge passage.

Figure 17:
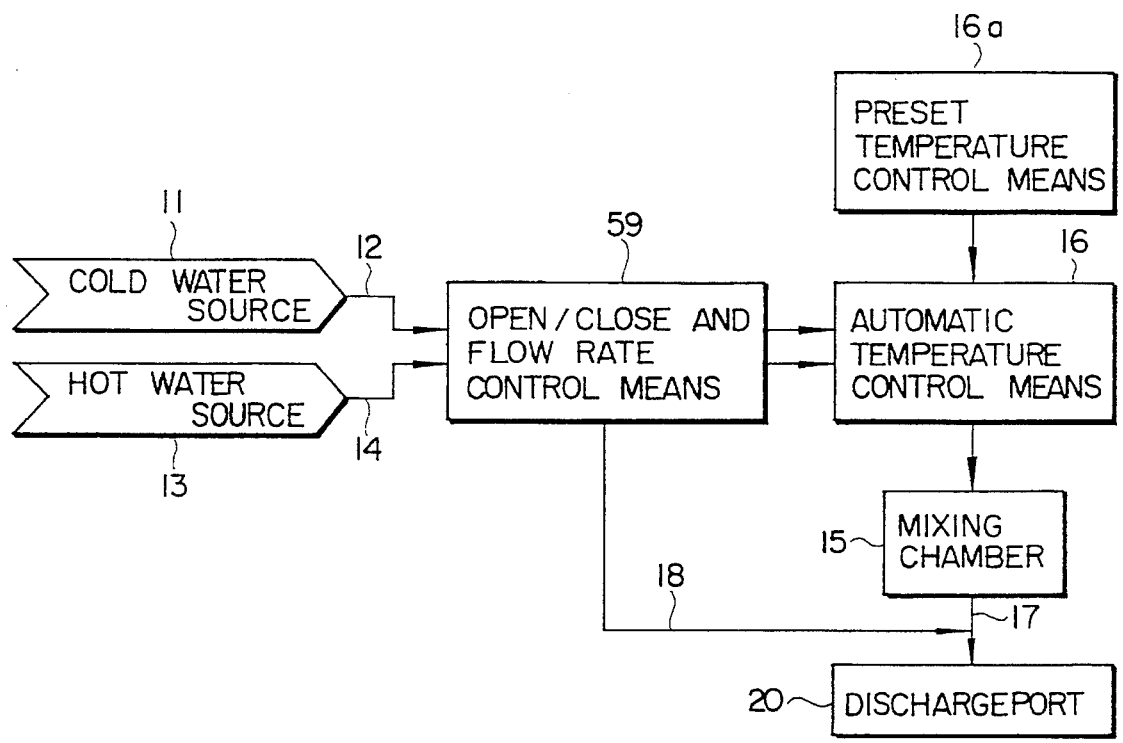
FIG. 17 is a block diagram of a hot and cold water mixing discharge device which is yet another embodiment of the invention.

FIG. 17 is a block diagram of a hot and cold water mixing discharge device which is yet another embodiment of the present invention. The difference of the device from that shown in FIG. 2 is that an open/close and flow rate control means 59 for regulating the flow rate of warm water within a range from zero to a maximum level is provided at the upstream end of a by-pass 18. A cold water supplied from a cold water source 11 and a hot water supplied from a hot water source 13 flow into an automatic temperature control means 16 through the open/close and flow rate control means 59 so that the ratio of the quantity of the cold water to that of the hot water is automatically regulated by the automatic temperature control means depending on a preset temperature for the warm water. The cold and the hot waters are mixed together in a mixing chamber 15 so as to make the warm water of appropriate temperature, which is discharged from the device through a discharge port 20. The flow rate of the discharged warm water is regulated by the open/close and flow rate control means 59. The control means 59 can be manipulated in a simple and easy manner to optionally send the cold or hot water to a warm water passage 17 through the by-pass 18 to discharge a warm water lower or higher than the appropriate temperature. Since the means 59 is disposed upstream of the automatic temperature control means 16, the latter is not affected by the fluctuation in the pressure of the cold or hot water in the cold water source 11 or the hot water source 13, so that a warm water of optimal temperature can be always obtained through the device.

FIGS. 18, 19, 20, 21, 22, 23, 24 and 25 show a hot and cold water mixing faucet 60 which is a concrete example of the device shown in FIG. 17. The faucet 60 includes a body 61, an automatic temperature control section 62 housed in a nearly cylindrical case 64 in the body, and an open/close and flow rate control section 63. A hot water inflow passage 65, a cold water inflow passage 66, and a water discharge passage 67 are defined in the body 61 by the case 64. The hot and the cold water inflow passages 65 and 66 can be connected to the hot water control valve 62a and cold water control valve 62b of the automatic temperature control section 62 through the open/close and flow rate control section 63, respectively. The warm water passage 68 of the automatic temperature control section 62 communicates with the water discharge passage 67. The hot water temperature control valve seat 69 of the hot water control valve 62a and the cold water temperature control valve seat 71 of the water control valve 62b are formed in the case 64.

The automatic temperature control section 62 is disposed concentrically to the faucet body 61, and has a control spindle 72 projecting from the top of the case 64. The case 64 is fitted in the faucet body 61 so that the case can be turned by a desired angle about the axis thereof by turning the lever 73b of a handle 73 provided at the top of the case, and be moved up and down by swinging the lever down and up. The spindle 72 is covered with the handle 73 in such a manner that the spindle can be turned for adjustment by a tool such as a screwdriver if the handle is removed.

The open/close and flow rate control section 63 has a cylindrically-shaped movable valve body 74 fitted on the outer circumferential surface of the case 64 so that the valve body can be turned and moved back and forth together with the case. The control section 63 also has a fixed valve body 75a for the hot water inflow passage 65, and another fixed valve body 75b for the cold water inflow passage 66. The movable valve body 74 has a hot water passage 76 and a cold water passage 77 which extend through the valve body along the thickness thereof. The movable valve body 74 also has a hot water by-pass 78 and a cold water by-pass 79 which are grooves formed in the outer circumferential surface of the valve body and extending vertically. The fixed valve body 75a has a hot water inflow hole 81 communicating with the hot water inflow passage 65. The other fixed valve body 75b has a cold water inflow hole 82 communicating with the cold water inflow passage 66.

Figure 18:
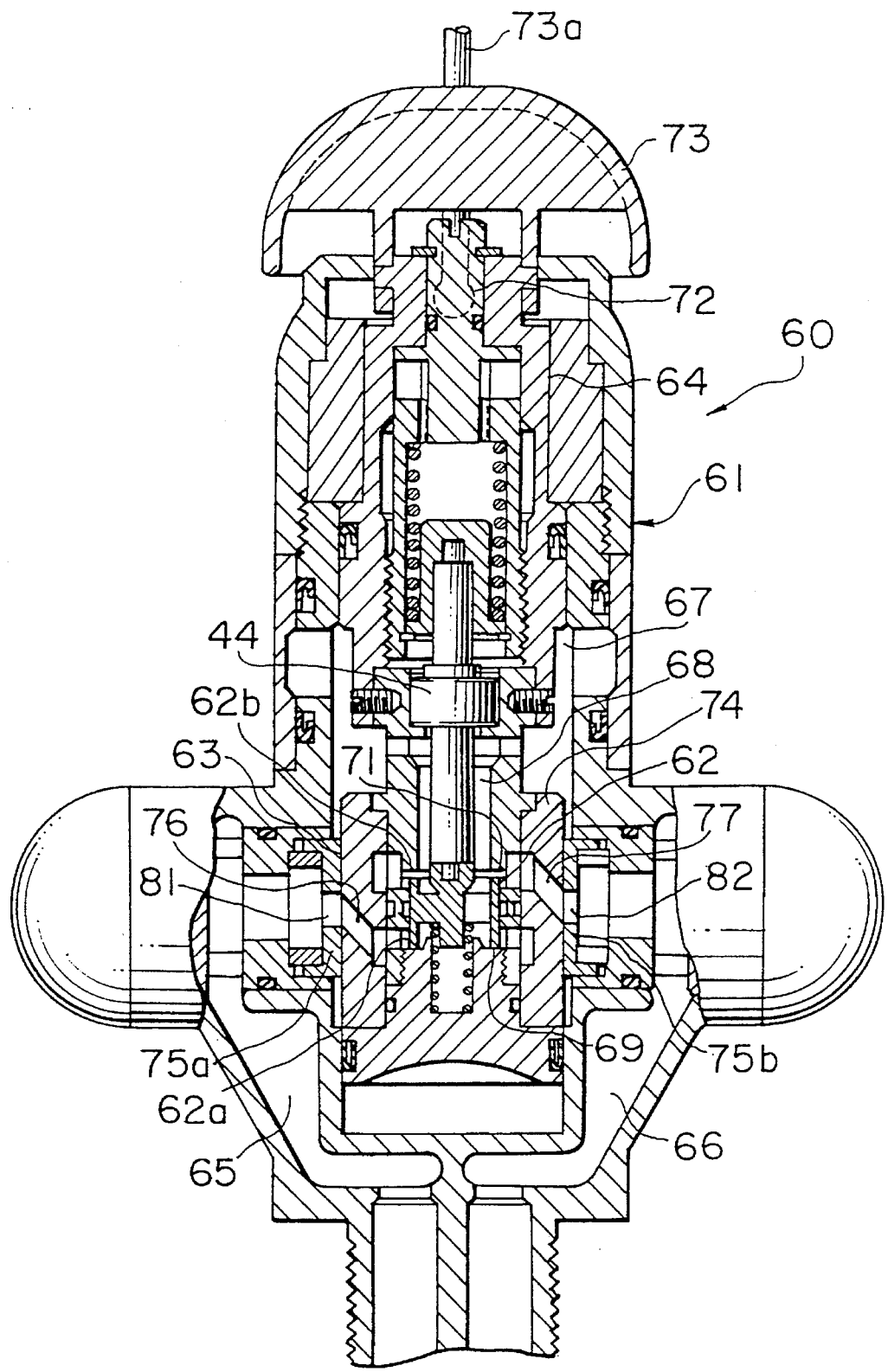
FIG. 18 is a sideward sectional view of a hot and cold water mixing faucet which is a concrete example of the device shown in FIG. 17.
Figure 19:
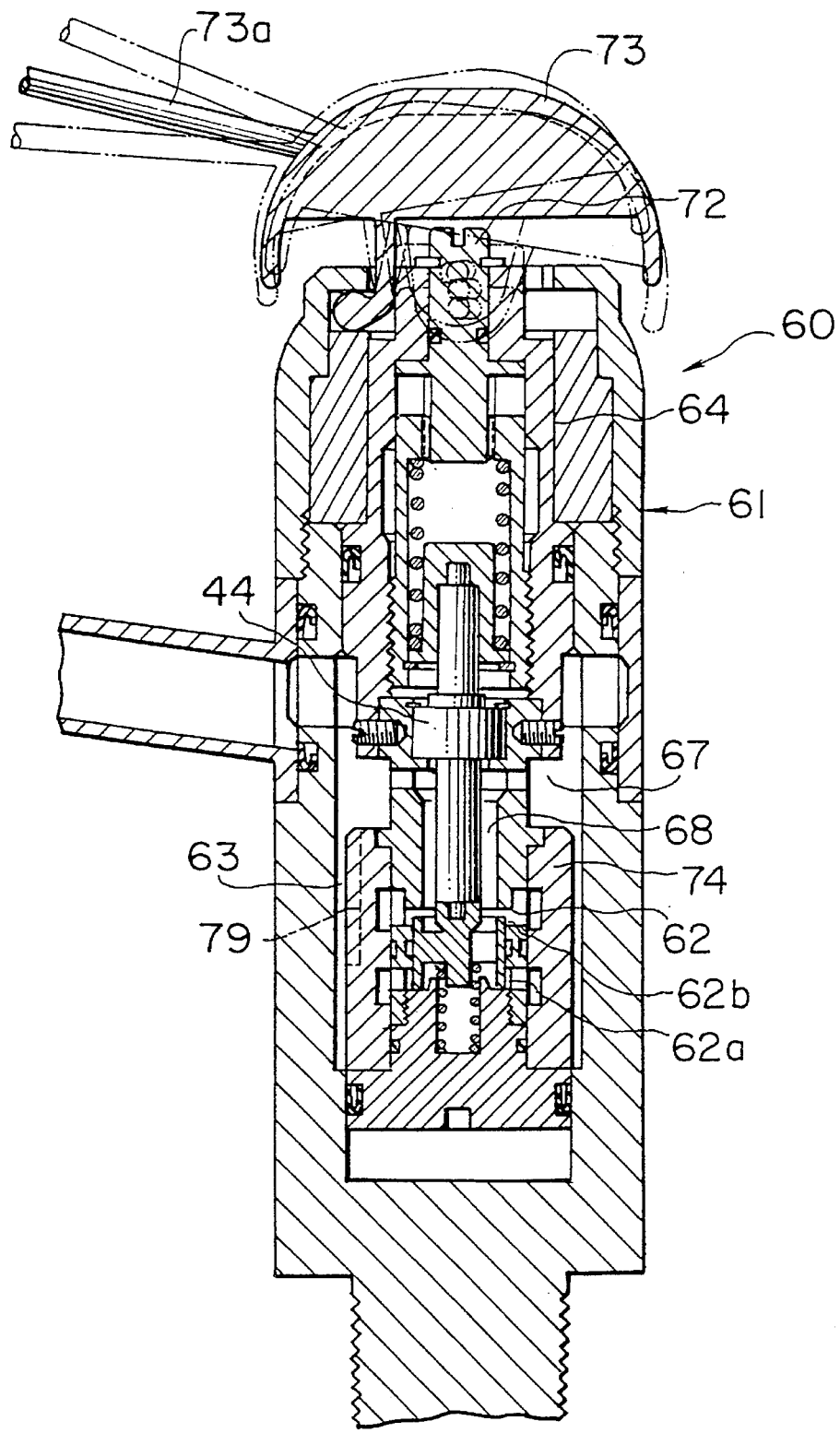
FIG. 19 a front-to-rear sectional view of the faucet shown in FIG. 18.
Figure 20:
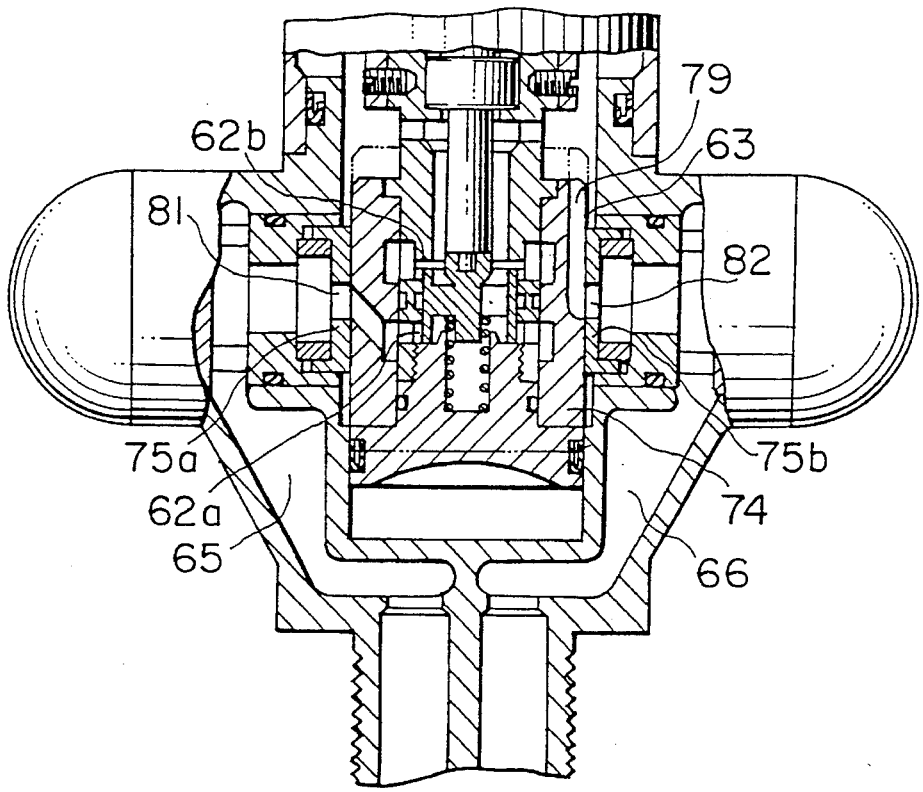
FIGS. 20 and 21 are cutaway side views of the faucet to illustrate the operation thereof.
Figure 21:
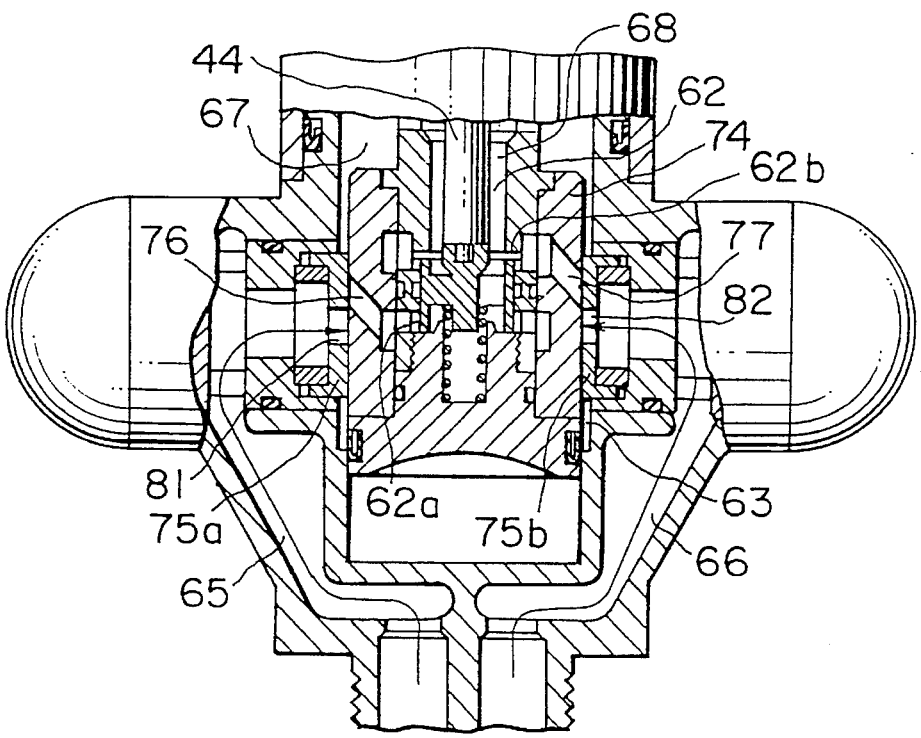
Figure 22:
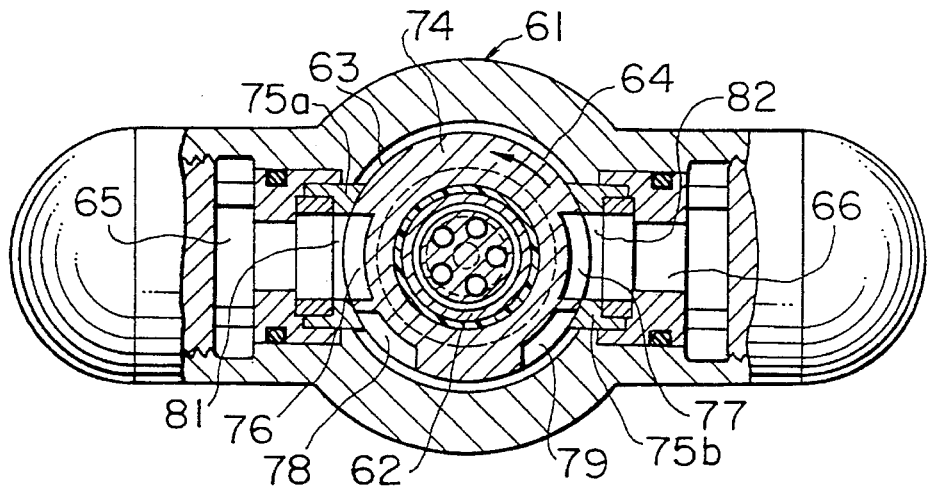
FIGS. 22, 23, 24 and 25 are partial cross-sectional views of the faucet to illustrate the operation thereof.

The hot and the cold water passages 76 and 77 are provided in positions symmetric to each other across the axis of the movable valve body 74. The movable valve body 74 is rotatably and slidably fitted in between the fixed valve bodies 75a and 75b so that the openings of the inner circumferential surface of the movable valve body correspond to the hot and cold water control valves 62a and 62b of the automatic temperature control section 62, and those of the outer circumferential surface of the movable valve body correspond to the hot water inflow hole 81 of the fixed valve body 75a and the cold water inflow hole 82 of the other fixed valve body 75b. The areas of coincidence of the openings of the hot and the cold water passage 76 and 77 in the outer circumferential surface of the movable valve body 74 with the hot and the cold water inflow holes 81 and 82 of the fixed valve bodies 75a and 75b increase or decrease in direct proportion to the quantities of the turning and vertical movement of the movable valve body. In other words, when the movable valve body 74 is at the central point of the range of the turning thereof, the openings of the hot and the cold water passages 76 and 77 in the outer circumferential surface of the movable body are completely coincident with the hot and the cold water inflow holes 81 and 82, as shown in FIG. 22. When the movable valve body 74 is at each of both the ends of the range, the openings are completely uncoincident with the holes 81 and 82. When the movable valve body 74 is moved down to the lowermost position thereof, the openings are completely coincident with the holes 81 and 82, as shown in FIG. 18. When the movable valve body 74 is moved up to the uppermost position thereof, the openings are completely uncoincident with the holes 81 and 82, as shown in FIG. 21.

Figure 23:
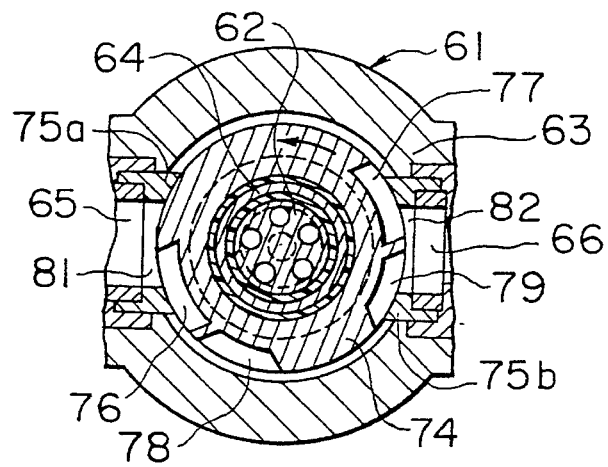
Figure 24:
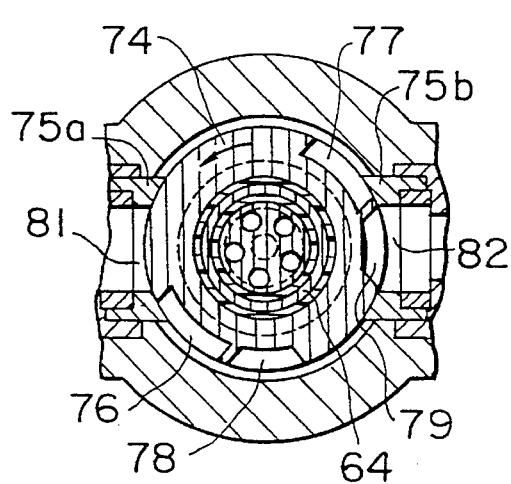
Figure 25:
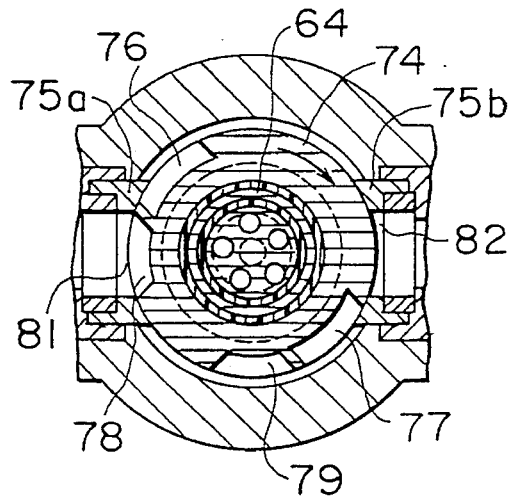
Figure 26:
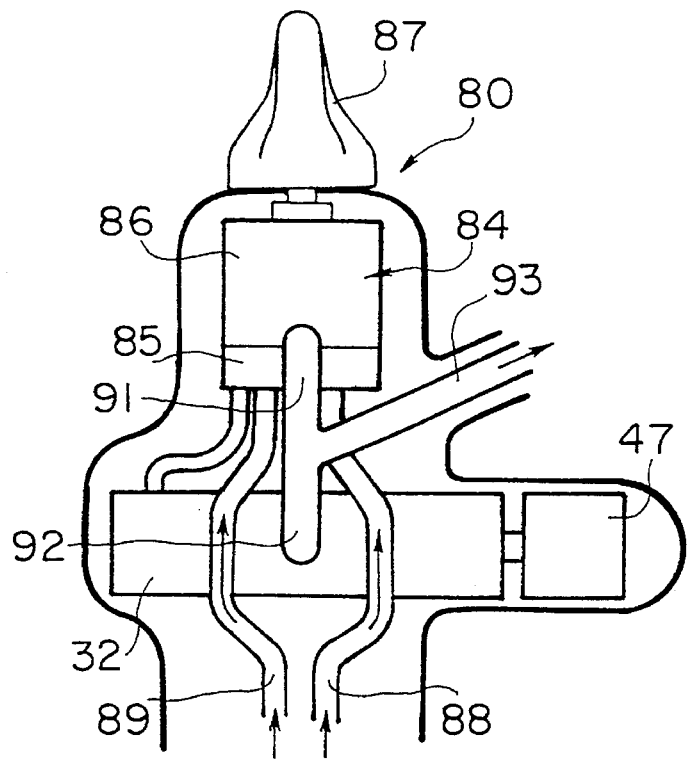
FIG. 26 is a sketchy sideward sectional view of a hot and cold water mixing faucet which is another concrete example of the device shown in FIG. 17.
Figure 27:
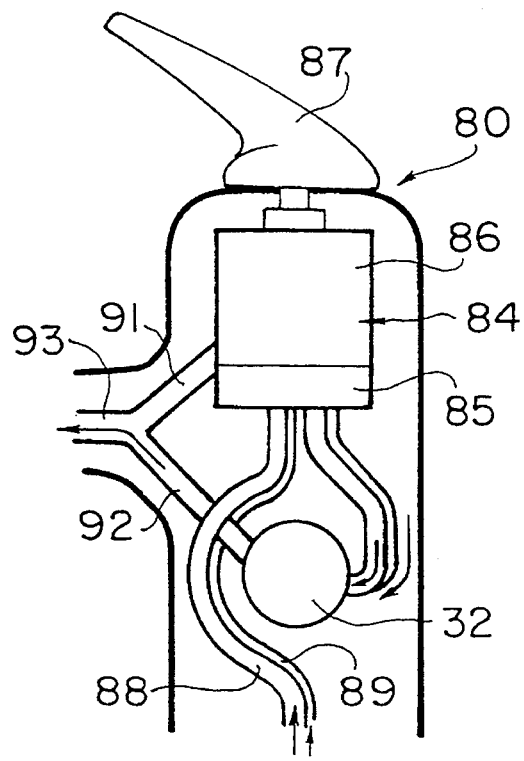
FIG. 27 is a sketchy front-to-rear sectional view of the faucet.

The hot and the cold water by-passes 78 and 79 correspond to the hot and the cold inflow holes 81 and 82, and are for connecting the hot and the cold water inflow passages 65 and 66 to the discharge passage 67 around the automatic temperature control section 62, respectively. The hot and the cold water by-passes 78 and 79 are provided near the hot and the cold water passages 76 and 77, respectively, and located at the same side of the vertical section of the faucet, which extends on the vertical center lines of the passages, as shown in FIG. 22. When the hot and the cold water passages 76 and 77 are completely coincident with the hot and the cold water inflow holes 81 and 82, the hot and the cold water by-passes 78 and 79 are not coincident with the hot and the cold water inflow holes, respectively, as shown in FIG. 22. When the coincidence of the hot and the cold water passages 76 and 77 with the hot and the cold water inflow holes 81 and 82 is then reduced by turning the movable valve body 74 in a direction, the cold water by-pass 79 coincides with the cold water inflow hole by a quantity nearly corresponding to the amount of the reduction, as shown in FIG. 23. If the coincidence of the passages 76 and 77 with the holes 81 and 82 is reduced by turning the movable valve body 74 in another direction reverse to the former, the hot water by-pass 78 coincides with the hot water inflow hole 81 by a quantity nearly corresponding to the amount of the reduction. When the hot and the cold water passages 76 and 77 are completely uncoincident with the hot and the cold water inflow holes 81 and 82, one of the by-passes 78 and 79 is completely coincident with the hole 81 or 82, as shown in FIG. 24 or 25. The areas of coincidence of the hot and the cold by-passes 78 and 79 with the hot and the cold water inflow holes 81 and 82, in a plan view, increase or decrease along with the vertical movement of the movable valve body 74. In other words, when the valve body 74 is moved up to the uppermost position thereof, the by-passes 78 or 79 does not coincide with the hole 81 or 82.

Thus, opening and closing the hot and the cold water inflow passages 65 and 66, and regulating the flow rates of the hot and the cold waters can be performed upstream of the automatic temperature control section 62, starting and stopping the discharge of warm water from the faucet and regulating the flow rate thereof can be performed by vertically swinging the lever 73a of the handle 73, and the temperature of the warm water can be regulated by turning the lever clockwise or counterclockwise. When the lever 73a is swung up as it remains in the central position thereof, a warm water of appropriate temperature preset by the automatic temperature control section 62 is discharged from the faucet. When the lever 73a is then turned clockwise or counterclockwise, the warm water of appropriate temperature and a hot or cold water are mixed together to make a warm water of higher or lower temperature, which is discharged from the faucet. At that time, the temperature and the flow rate of the discharged warm water are regulated in terms of the angles of the horizontal turning and vertical swinging of the lever 73a, respectively.

Figure 3:
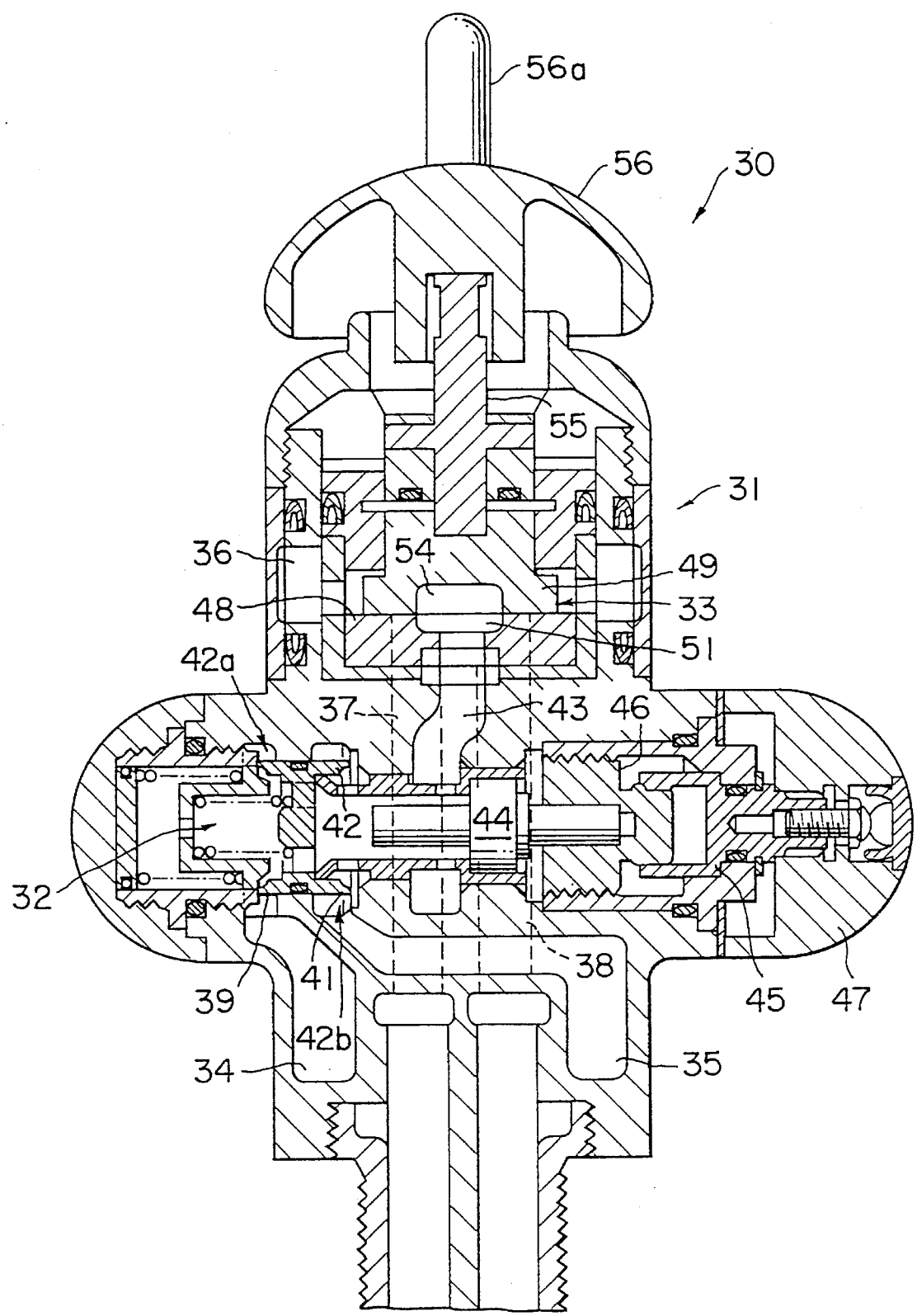
FIG. 3 is a sideward sectional view of a hot and cold water mixing faucet which is a concrete example of the device shown in FIG. 2.

FIGS. 26, 27, 28, 29, 30, 31, 32 and 33 show a hot and cold water mixing faucet 80 which is another concrete example the device shown in FIG. 17. The faucet 80 includes an open/close and flow rate control section 84 having a fixed and a movable valve bodies 85 and 86 shaped nearly as disks and water-tightly and slidably fitted on each other, similarly to the faucet shown in FIG. 3. The control section 84 is provided in an upper position in the body of the faucet 80. A handle 87 is coupled to the movable valve body 86. An automatic temperature control section 32 similar to that of the faucet shown in FIG. 3 is provided under the other control section 84 in the body of the faucet 80. Shown at 47 is the temperature control handle of the automatic temperature control section 32. A cold water passage 88 and a hot water passage 89 extend from a hot water source and a hot water source to the cold and hot water inflow holes of the fixed valve body 85 of the open/close and flow rate control section 84, and can be connected to the automatic temperature control section 32 through the former section. A by-pass 91 extends from the open/close and flow rate control section 84, and is connected to a warm water passage 92 extending from the automatic temperature control section 32, so that former section is connected to a discharge passage 93 through the by-pass around the latter section.

Figure 28:
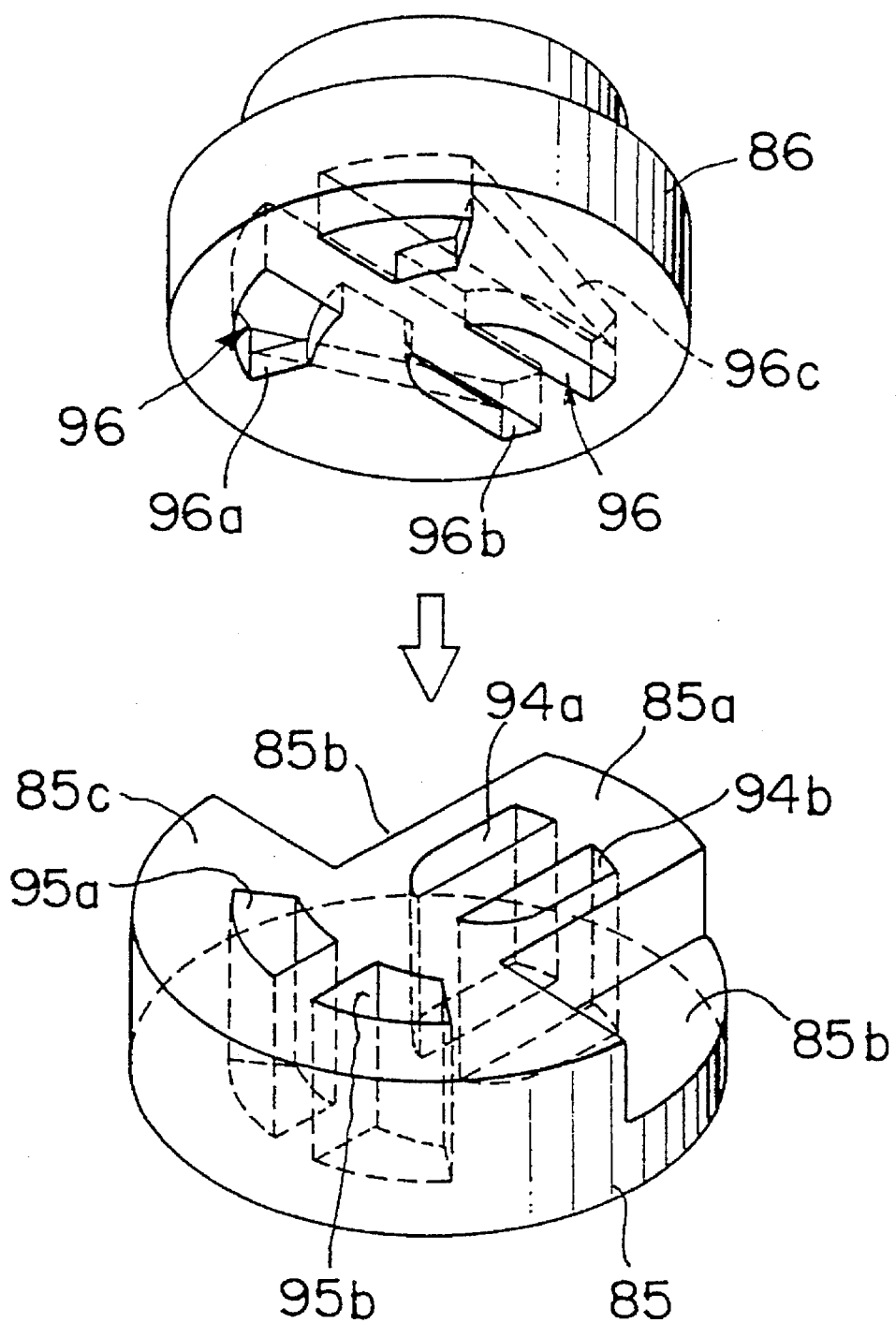
FIG. 28 is a perspective view of the fixed and movable valve bodies of the faucet.

The fixed valve body 85 has two notches 85b provided at the peripheral edge of the nearly disk-shaped body and located in mutually symmetric positions, so that the body has a projection 85a, as shown in FIG. 28. The notches 85b communicate with the by-pass 91. A hot water outflow hole 94a and a cold water outflow hole 94b extend in parallel with each other through the projection 85a along the thickness thereof. The hole 94a communicates with the hot water control valve of the automatic temperature control section 32, while the other hole 94b communicates with the cold water control valve thereof. The fixed valve body 85 has a land 85c through which a hot water inflow hole 95a and a cold water inflow hole 95b extend in parallel with each other along the thickness of the land. The projection 85a and the land 85c are integrally conjoined together to make a mushroom form. The hole 95a communicates with the hot water passage 89 provided in the body of the faucet 80, while the other hole 95b communicates with the cold water passage 88 provided in the faucet body.

Figure 29:
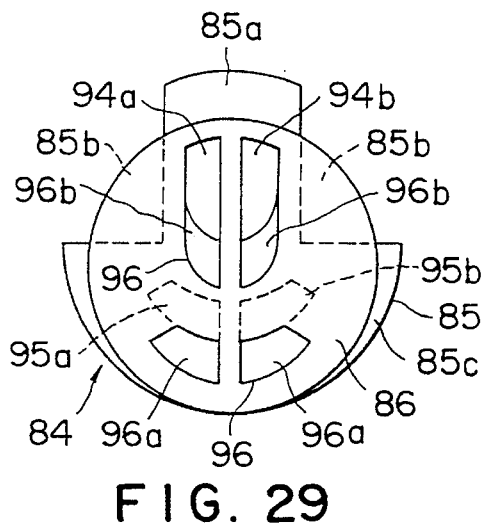
FIGS. 29, 30, 31 and 32 are views of the valve bodies to illustrate the operation thereof.
Figure 31:
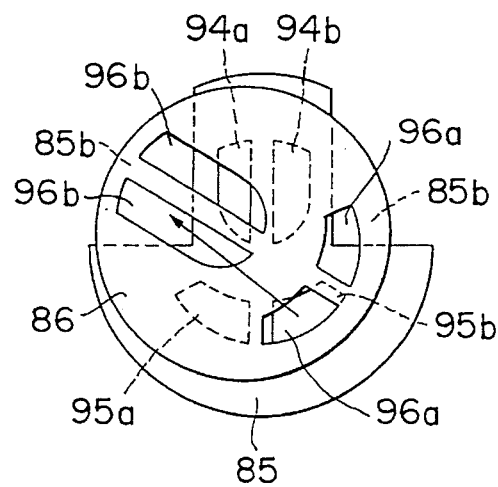
Figure 30:
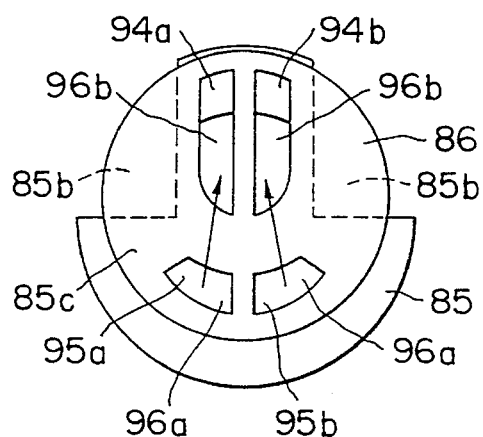
Figure 32:
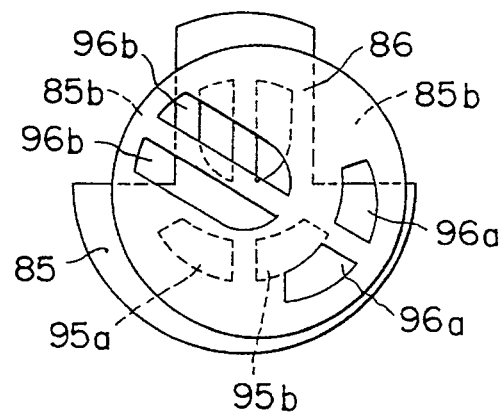
Figure 33:
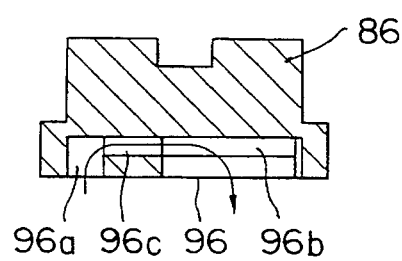
FIG. 33 is a front-to-rear sectional view of the movable valve body.

The movable valve body 86 is made of a disk smaller in diameter than a circle, a part of which is coincident with the arc-shaped outer edge of the land 85c of the fixed valve body 85. The movable valve body 86 has two passages 96 for connecting the hot and the cold water inflow holes 95a and 95b to the hot and the cold water outflow holes 94a and 94b or the notches 85b. Each of the passages 96 includes an inlet opening 96a provided in the sliding surface of the movable valve body 86 on the fixed valve body 85 and corresponding to the hot or cold water inflow hole 95a or 95b, an outlet opening 96b provided in the sliding surface and corresponding to the hot or cold water outflow hole 94a or 94b, and an intermediate opening 96c connecting both the former openings to each other, as shown in FIGS. 28 and 33. The positional relationship of the passages 96 with the hot and the cold water inflow holes 95a and 95b, the hot and the cold water outflow holes 94a and 94b and the notches 85b is described with reference to FIGS. 29, 30, 31 and 32 from now on. When the lever of the handle 87 is in a central uppermost position, the two passages 96 are not coincident with the two inflow holes 95a and 95b, as shown in FIG. 29, so that no water is discharged from the faucet 80. When the lever is then swung down, the movable valve body 86 is rectilinearly moved up and the two passages 26 connect the hot water inflow hole 95a to the hot water outflow hole 94a and connect the cold water inflow hole 95b to the cold water outflow hole 94b, as shown in FIG. 30, so that a hot water and a cold water flow to the automatic temperature control section 32, and are mixed together therein to make a warm water of appropriate temperature, which flows to the discharge passage 93 and is then discharged from the faucet 80. The flow rate of the discharged warm water can be regulated by moving the movable valve body 86, and is maximum as the faucet 80 is the state shown in FIG. 30. When the lever is thereafter turned clockwise or counterclockwise, the inlet opening 96a of only one of the passages 96 coincides with the cold or hot water inflow hole 95b or 95a and the outlet opening 96b of the passage coincides with one of the notches 85b, as shown in FIG. 31, so that the hot or cold water flows to the discharge passage 93 through the by-pass 91. The flow rate of the hot or cold water which is added to the warm water of appropriate temperature is altered along with the turning of the lever so as to regulate the temperature of the warm water which is discharged from the faucet 80. When the lever is then swung up, the movable valve body 86 is rectilinearly moved down, the inlet opening 96a of the passage 96 is made uncoincident with the cold or hot water inlet hole 95b or 95a, as shown in FIG. 32, so that the faucet is closed and no water is discharged therefrom.

Figure 34:
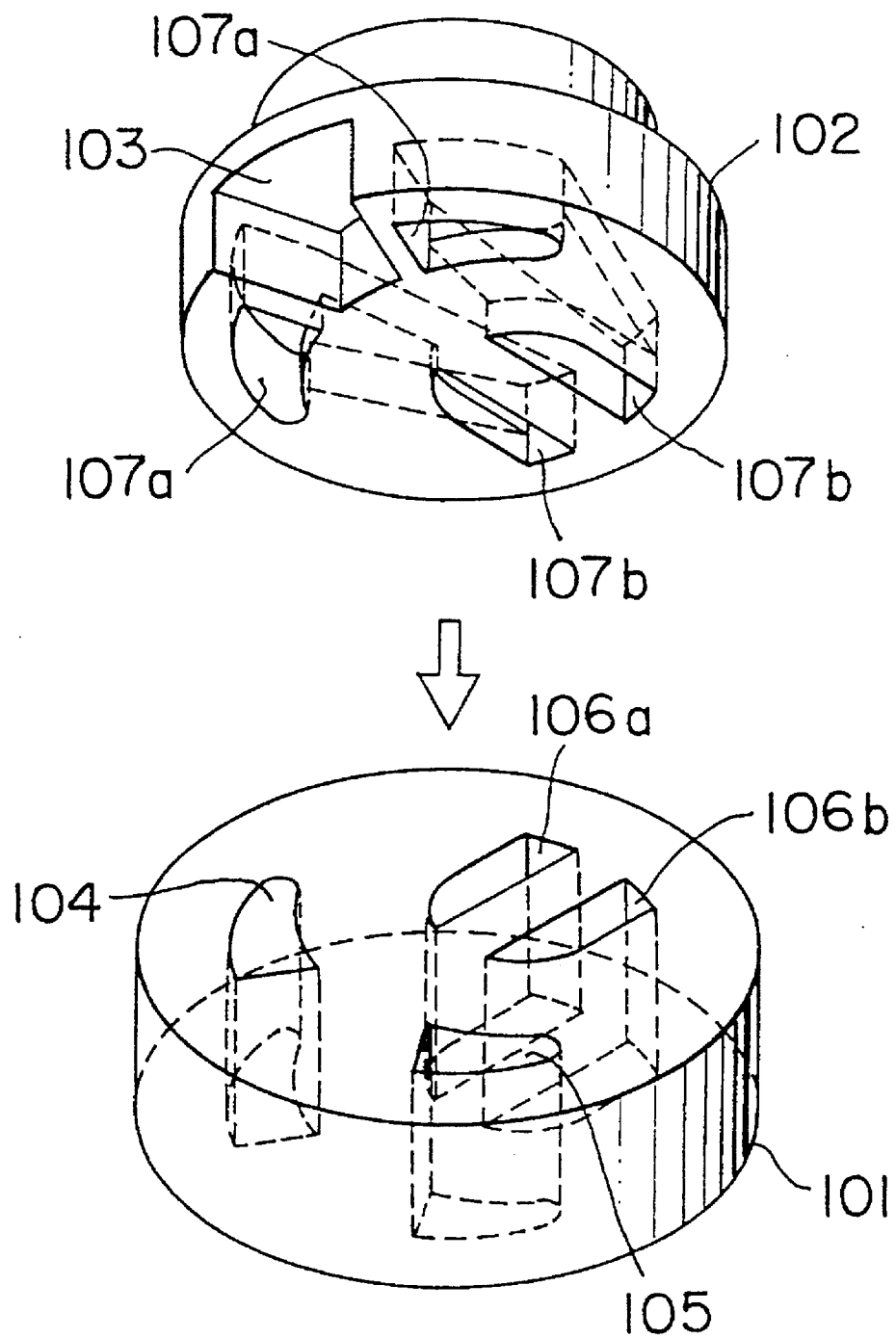
FIG. 34 is a perspective view of a fixed and a movable valve bodies which are modifications of those of the faucet shown in FIG. 26.
Figure 35:
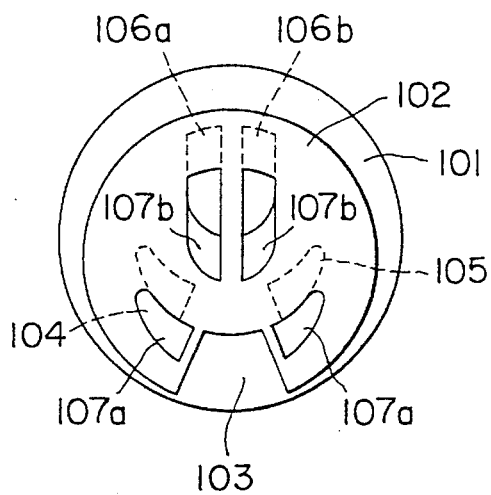
FIGS. 35, 36, 37 and 38 are views of the valve bodies to illustrate the operation thereof.
Figure 37:
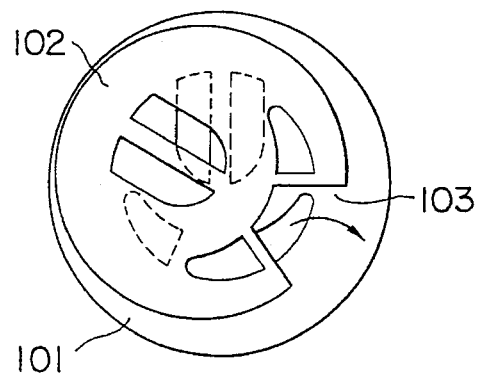
Figure 36:
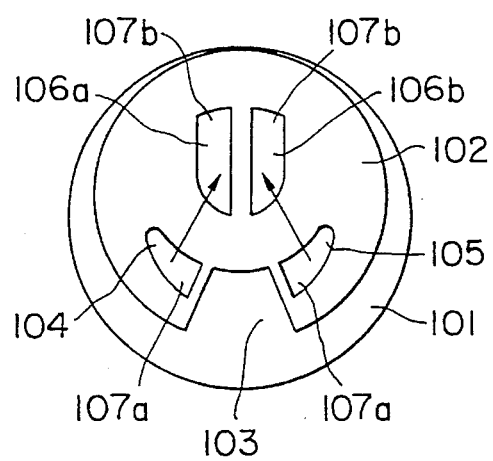
Figure 38:
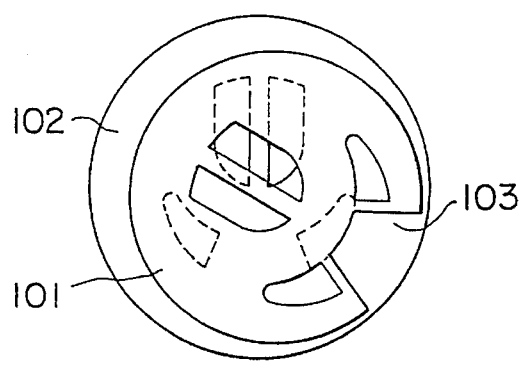
Figure 39:
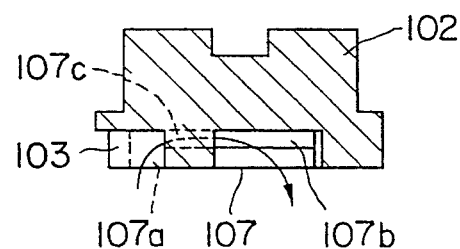
FIG. 39 is a front-to-rear sectional view of the movable valve body.

FIGS. 34, 35, 36, 37, 38 and 39 show an open/close and flow rate control section which is a modification of the preceding one in the modification, a fixed valve body 101 is made of a disk, and movable valve body 102 is made of a disk smaller in diameter than the former and has an outflow notch 103 at the peripheral edge of the body. The outflow notch 103 is for connecting a hot and a cold water passages to a hot and a cold water by-passes as described in detail hereinafter. The fixed valve body 101 has a hot and a cold water inflow holes 104 and 105, and a hot and a cold water outflow holes 106a and 106b. The movable valve body 102 has passages 107 for connecting the hot and the cold water inflow holes 104 and 105 to the hot and the cold water outflow holes 106a and 106b, similarly to the preceding section. FIG. 34 shows the forms and positions of these holes and passages. Each of the passages 107 includes an inlet opening 107a corresponding to the hot or cold water inflow hole 104 or 105, an outlet opening 107b, corresponding to the hot or cold water outflow hole 106a or 106b, and an intermediate opening 107c connecting the inlet and the outlet openings to each other, similarly to the preceding section. when the inlet opening 107a of the passage 107 for hot water and that 107a of the other passage 107 for cold water are not coincident at all with the hot and cold water inflow holes 104 and 105, as shown in FIG. 35, no water is discharged from the faucet. When movable valve body 102 is then rectilinearly moved up, the inlet and outlet openings 107a and 107b of the passages 107 coincide with the hot and the cold water inflow holes 104 and 105 and the hot and the cold water outflow holes 106a and 106b, as shown in FIG. 36, the hot and the cold waters flow to the hot and cold water control valves of the automatic temperature control section through the outflow holes. When the movable valve body 107 is then turned, the outflow notch 103 thereof coincides with the cold or hot water inflow hole 105 or 104, as shown in FIG. 37, only the cold water flows to the discharge passage through the cold water by-pass and is then discharged from the faucet. During the process of the turning, the cold water flows to the cold water by-pass along with the flowing of the hot and the cold waters to the automatic temperature control section. When the movable valve body 102 is turned further, the hot and the cold water inflow holes 104 and 105 are closed by the valve body, as shown in FIG. 38, no water is discharged from the faucet. If the movable valve body 102 is turned in reverse after the movable and the fixed valve bodies are put in the positional relationship shown in FIG. 36, only the hot water flows to the discharge passage through the hot water by-pass and is then discharged from the faucet. No matter how the water is discharged from the faucet, the flow rate of the water can be easily regulated by moving the movable valve body 102 up or down with the lever of the handle.

FIG. 40 is a block diagram of a hot and cold water mixing discharge device which is yet another embodiment of the present invention. The device is an extension of that shown in FIG. 2, and includes components equivalent to those of the latter. The components are denoted by the same reference symbols as the latter, and not described in detail hereinafter. In this embodiment, an object sensor 110 is provided near a discharge port 20 so as to detect the presence of a human hand, a washed thing or the like to generate a signal. Besides, a switch 112 is provided in a position off the body of the device so as to be manipulated by a human hand or foot or the like. The sensor 110 and the switch 112 are connected to a control means 114 for sending out a control signal on the basis of signals from the sensor and the switch as described in detail hereinafter. Automatic open/close valves 115 and 116 are provided in a cold and a hot water inflow passages 12 and 14, and connected to the control means 114.

Figure 41:
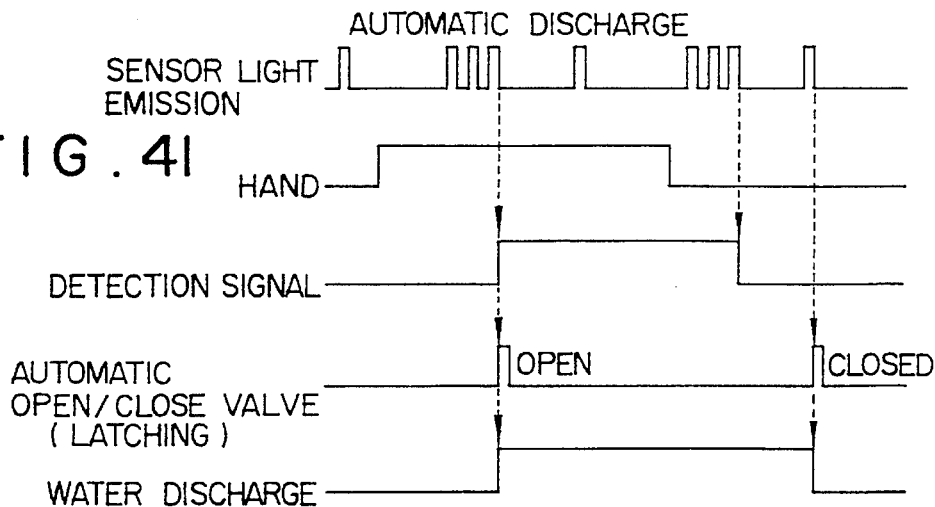
FIGS. 41, 42, and 43 are time charts of method of controlling the device.
Figure 42:
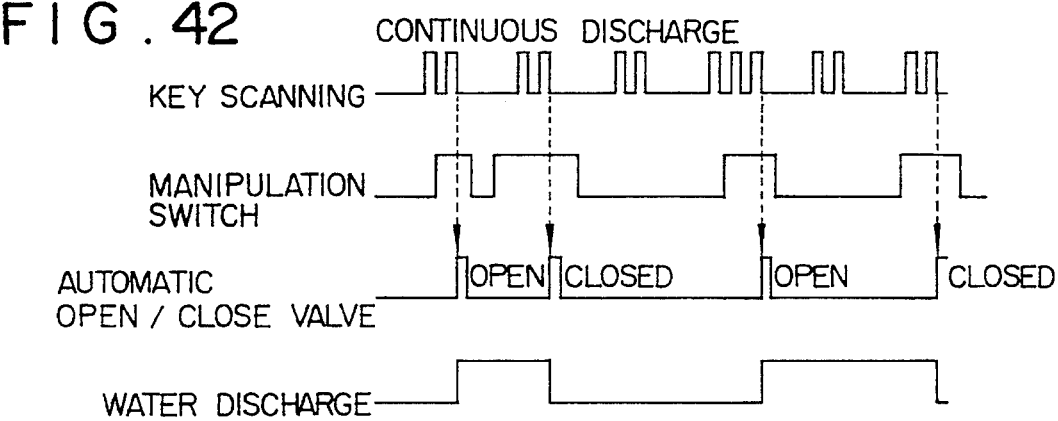
Figure 43:
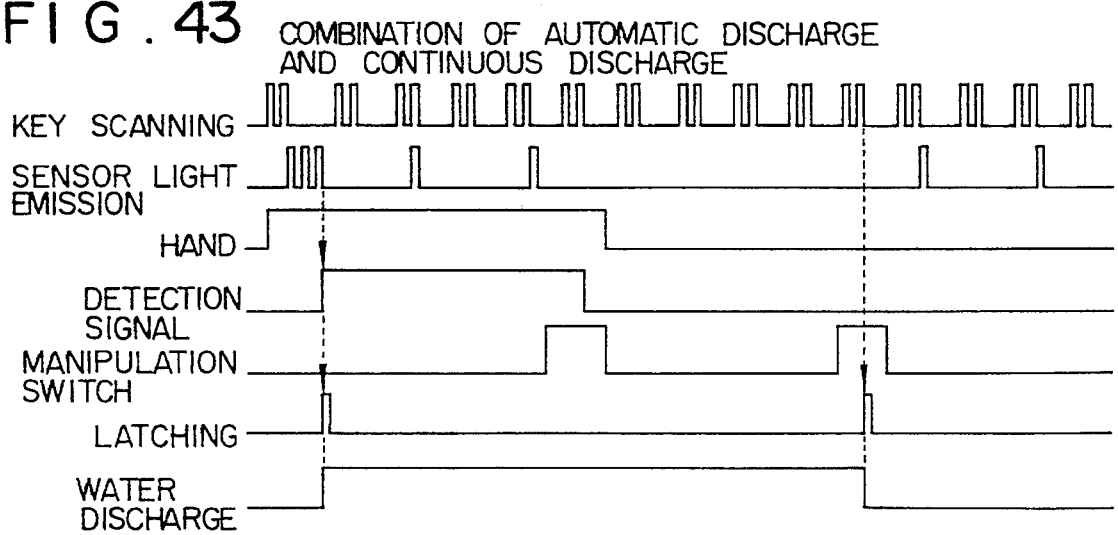

FIGS. 41, 42 and 43 are time charts of a method of controlling the device shown in FIG. 40. The operation of the device is hereafter described with reference to the time chart from now on. Light is periodically emitted from the object sensor 110. When the emitted light is reflected by an approaching object such as a human hand and material body and is then detected by the sensor 110, a detection signal is generated by the sensor and sent out to the control means 114 so that an opening signal is sent out as a control signal from the means to the automatic open/close valves 115 and 116 to open them to supply a cold and a hot waters to the device through the cold and the hot water passages 12 and 14. A desired warm water is thus generated through mixing, and then discharged from the discharge port 20 of the device, similarly to the device shown in FIG. 2. When the object has gone away from the sensor 110, the detection signal vanishes so that the automatic open/close valves 115 and 116 are closed again by the control means 114 to stop the discharge of the warm from the device. Before the stoppage, the discharge is still continued for a prescribed time such as 0.3 second after the object has gone away from the sensor 110, as shown in FIG. 41. The warm water can thus be automatically discharged from the device through the use of the sensor 110 without using a handle or the like.

When the switch 112 such as a foot switch is turned on, an opening signal is sent out as a control signal from the control means 14 to open the automatic open/close valves 115 and 116 to supply the cold water and the hot waters into the device through the cold and the hot water passages 12 and 14 to generate the desired warm water to discharge it from the device, as shown in FIG. 42. When the switch 112 is thereafter turned off, a signal is sent out as a control signal from the control means 114 to close the valves 115 and 116 to stop the discharge of the warm water. The warm water of appropriate temperature can thus be automatically discharged from the port 20 through the use of the switch 112 as well.

The operation of the device with the combination of the operation of the sensor 110 and that of the switch 112 is described with reference to FIG. 43 from now on. When the object is detected by the sensor 110, the warm water is automatically discharged from the discharge port 20. When the switch 112 is then turned on or off as the warm water remains discharged from the port 20, the emission of the light from the sensor 110 is ceased so that the device is shifted out of a state of automatic water discharge into a state of continuous water discharge. As a result, even if the object has gone away from the sensor 110, the discharge of the warm water is still continued. When the switch 112 is thereafter turned off or on, a control signal is sent out from the control means 114 to open the valves 115 and 116 to stop the discharge of the warm water. The device can thus be easily and optionally put in either the state of automatic water discharge or the state of continuous water discharge, depending on the need of the user of the device. Therefore, the manipulating property of the device is high.

Other types of sensors and switches may be provided instead of the light sensor 110 and the switch 112. Besides, the automatic open/close valves 115 and 116 may be solenoid valves, for example.

Figure 44:
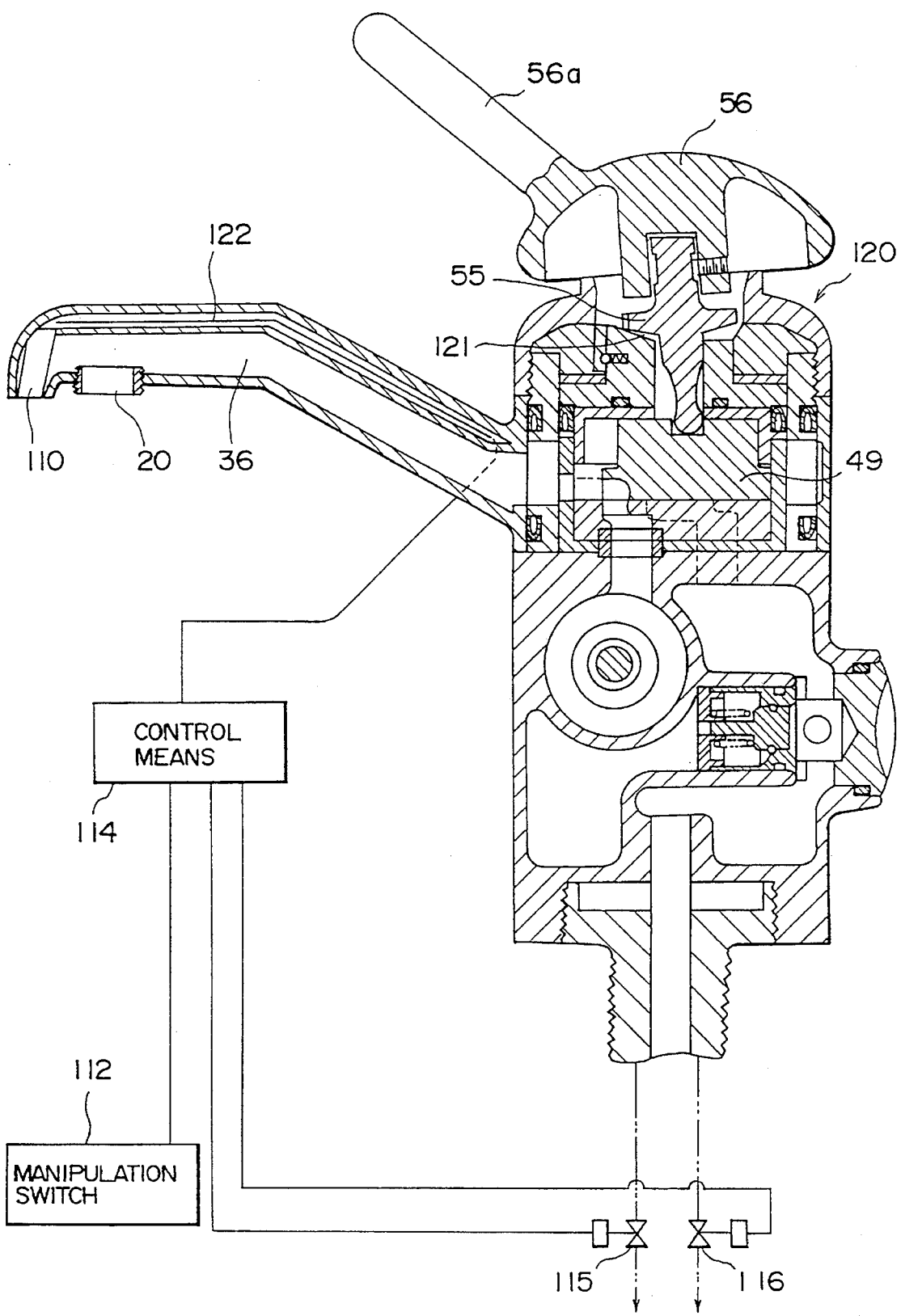
FIG. 44 is a sideward sectional view of a hot and cold water mixing faucet which is a concrete example of the device.

FIG. 44 shows a hot and cold water mixing faucet 120 which is a modification of the device shown in FIG. 40. The faucet 120 is the same in basic constitution and operation as the faucet 30 shown in FIG. 4, and is therefore described only about the difference from the latter from now on. Since the faucet 120 is for at least automatic water discharge, the range of the movement of the lever 56a of a handle 56 is limited so that only the flow rates of a hot and a cold waters and the temperature of a warm water to be discharged from the faucet can be regulated with the handle. For that purpose, a stopper portion 121 is provided in contact with a motive power transmission means 55 for transmitting the action of the handle 56 to the movable valve body 49 of the open/close and flow rate control section of the faucet 120, so that the handle cannot be moved to a position for closing the faucet. A light sensor 110 is provided near a discharge port 20, and connected to a control means 114 through a cord 122 laid in the discharge passage 36. As a result, the faucet 120 can be optionally put in either a state of automatic water discharge or a state of continuous water discharge so as to discharge a warm water of appropriate temperature through mixing, depending on the need of the user of the faucet.

Once a temperature is preset by the automatic temperature control means in each of the embodiments described above, starting and stopping the discharge of the warm water of appropriate temperature, regulating the flow rate of the water, and adding the hot or cold water to the warm water to discharge a warm water of higher or lower temperature can be performed only by manipulating the open/close and flow rate control means. For that reason, the automatic temperature control means does not need to be manipulated to preset a temperature again at every time of discharge of warm water of temperature different from the previously preset temperature, but the temperature of the discharged warm water can be regulated in conjunction with an opening or closing manipulation. Therefore, the manipulating property of the device or faucet is very good. If a temperature of high frequency in use is preset by the automatic temperature control means, the temperature of the discharged warm water is unlikely to sharply change due to the change in the pressure of the supplied hot water or the like during the normal use of the device or faucet. Therefore, safety thereof is high. Even if the pressure of the supplied hot water changes during the use of the device or faucet with the addition of the hot or cold water to the warm water of appropriate temperature, only the hot or cold water is affected by the change in the pressure but the warm water is hardly affected by the change. For that reason, the stability of the temperature of the discharged warm water is high.

FIGS. 45, 46, 47 and 48 show a hot and cold water mixing faucet 130 which is yet another embodiment of the present invention. The faucet 130 is characterized in that a handle is vertically swung stepwise to make it easy to set the flow rate of a discharged warm water at each of desired levels with the use of the handle. A cylindrical member 132 open at the top and bottom thereof is provided in the body 131 of the faucet 131. A functional section chamber 133 and a discharge passage 134 are defined in the cylindrical member 132. A discharge portion 136 is provided outside the cylindrical member 132, and communicates with the discharge passage 134. A discharge port 136a is provided in the discharge portion 136 at the tip thereof. A cover 137 is secured to the faucet body 131 by a screw over the cylindrical member 132, and covers the upper opening of the functional section chamber 133. The handle 138 is supported over the cover 137. A circular opening 137a is provided in the cover 137 at the top thereof, and communicates with the chamber 133. The cover 137 has a projecting engagement portion 137b around the opening 137a. The upper part of the portion 137b has a hemispherical cross section. The handle 138 includes a body 138a covering the top of the cover 137, and a lever 138b extending from the body, and is supported in a swingable and turnable manner by a kinematics conjunction mechanism 139.

Figure 46:
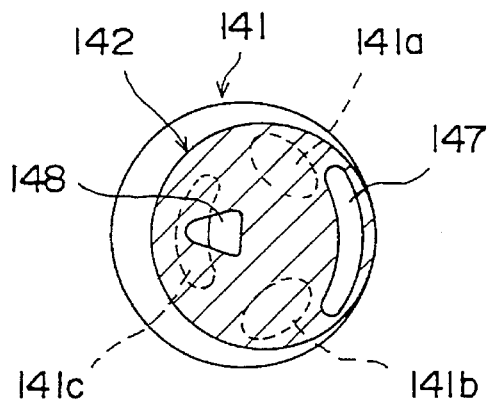
FIG. 46 is a plan view of the fixed and movable valve bodies of the faucet to illustrate the constitution of the bodies.

A fixed valve body 141 is secured in the functional section chamber 133. A movable valve body 142 is water-tightly and slidably fitted on the top of the fixed valve body 141. The fixed valve body 141 has a cold water inflow hole 141a, a hot water inflow hole 141b, and a warm water outflow hole 141c which extend through the valve body along the thickness thereof, as shown in FIG. 46, and communicate with a cold water source, a hot water source and the discharge port 136a through a cold water inflow passage 145, a hot water inflow passage 146 and the discharge passage 134, respectively. The movable valve body 142 is kinematically associated with the handle 138 through the kinematic conjunction mechanism 139 provided over the valve body, so that the body is turned in the circumferential direction thereof by horizontally turning the lever 138b of the handle, and is slid backward and forward by vertically swinging the lever. As shown in FIG. 46, an opening 147 for regulating the degree of opening of the cold and hot water inflow holes 141a and 141b of the fixed valve body along with the turning of the movable valve body 142, and another opening 148 for regulating the degree of opening of the warm water outflow hole 141c of the fixed valve body or setting the degree at zero along with the sliding of the movable valve body, are provided in the movable valve body at the bottom thereof, which is slid on the top of the fixed valve body. A lid 151 having a recess 149 for connecting the openings 147 and 148 to each other, and a cover 152 for securing the lid are provided on the top of the movable valve body 142. The cover 152 has an engagement recess 153 in the top of the cover.

The kinematic conjunction mechanism 139 includes a cylindrical member 139a rotatably supported over the cover 152, and a lever 139b whose lower half is inserted into the internal opening of the cylindrical member. The lever 139b is slidably supported with a pin 139c, secured in the body 138a of the handle 138 at the upper end of the lever, inserted into the engagement recess 153 of the cover 152 at the lower end of the lever, and engaged with the top of the movable valve body 152 at the lower end of the lever, so that the handle and the movable valve body are kinematically associated with each other by the conjunction mechanism 139. As a result, discharging the warm water from the discharge port 136a, stopping the discharge, and regulating the flow rate of the warm water can be performed by vertically swinging the lever 138b of the handle 138, and regulating the temperature of the warm water can be performed by horizontally turning the lever.

The inner surface of the body 138a of the handle 138 has a recess 138c facing the projecting engagement portion 137b of the cover 137. A plate 154 is fitted in the recess 138c so that the plate can be moved into and out of the recess. A spring 155 is provided in the recess 138c, and urges the plate 154 toward the projecting engagement portion 137b. The surface of the plate 154, which faces the portion 137c, has a plurality of engagement grooves 154a, 154b, 154c and 154d curved along the circumferential direction of the portion and located at prescribed intervals along the radial direction of the body 138a of the handle 138, so that the projecting engagement portion can be engaged in one of the grooves every time the handle is swung up or down by a prescribed length. A plurality of engagement points are thus set at the prescribed intervals along the direction of the swinging of the handle 138 by the projecting portion 137b as an engagement part and the grooves 154a, 154b, 154c and 154d as engagement reception parts. Although the number of the grooves is four and the positions thereof are as shown in the drawings, they may differ therefrom. The lowermost groove 154a is in such a position that when the projecting portion 137b is engaged in the groove by vertically swinging the handle 138 with the lever 138b thereof, the opening 148 of the movable valve body 142 does not communicate with the warm water outflow hole 141c and no water is discharged from the discharge port 136a. The second lowermost groove 154b is in such a position that when the projecting portion 137b is engaged in the groove by vertically swinging the handle 138 with the lever 138b thereof, the opening 148 communicates with the warm water outflow hole 154c and the degree of opening of the hole is kept low to make the flow rate of the discharged warm water small. The next groove 154c is in such a position that when the portion 137b is engaged in the groove by vertically swinging the handle 138 with the lever 138b thereof, the opening 148 communicates with the warm water outflow hole 141c and the degree of opening of the hole is kept at the middle to make the flow rate of the discharged warm water moderate. The uppermost groove 154d is in such a position that when the portion 137b is engaged in the groove by vertically swinging the handle 138 with the lever 138b thereof, the opening 148 communicates with the warm water outflow hole 141c and the degree of opening of the hole is kept maximum to make the flow rate of the discharged warm water maximum.

Figure 45:
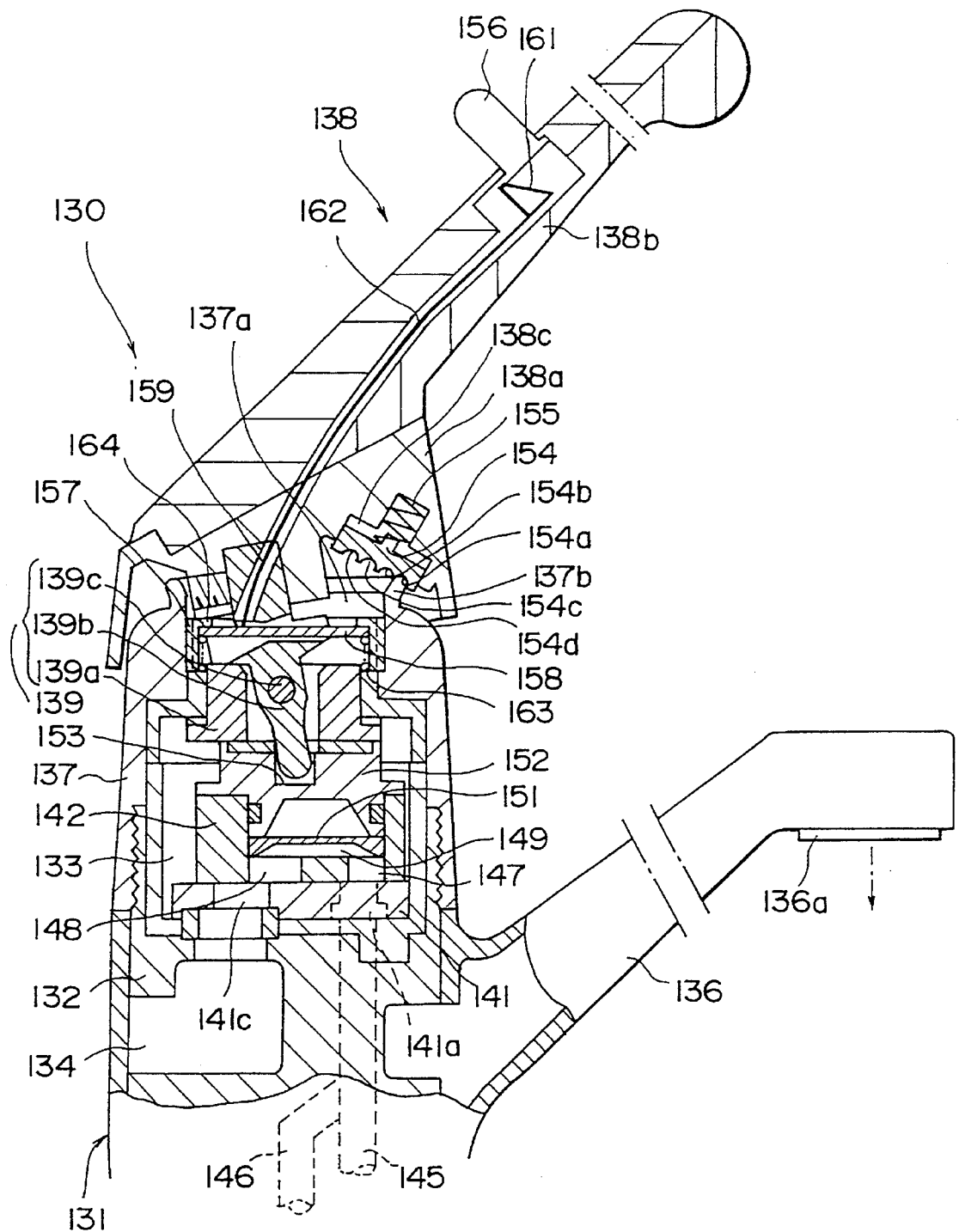
FIG. 45 is a hot and cold water mixing faucet which is yet another embodiment of the invention.
Figure 47:
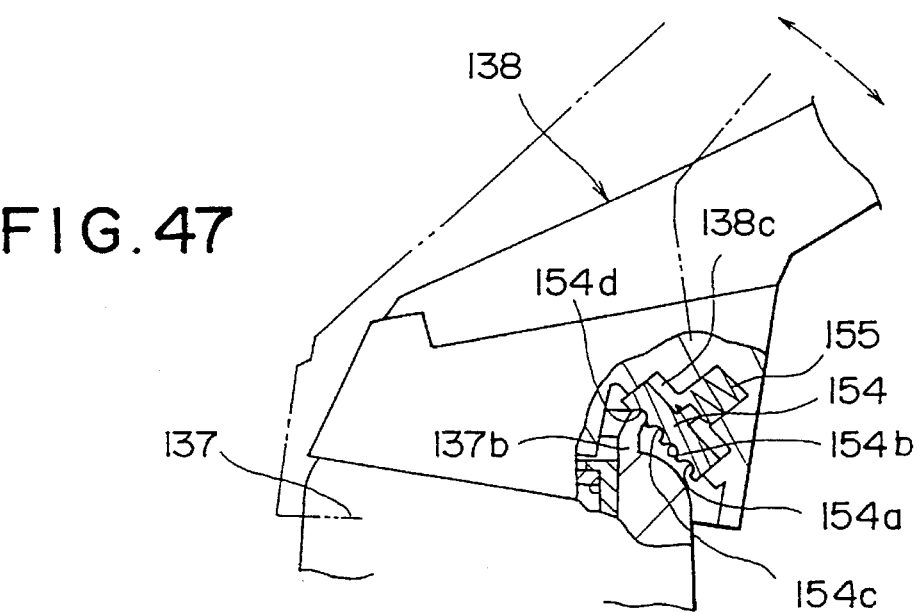
FIG. 47 is a partial cutaway view of the faucet to illustrate a state of the operation thereof.

When the handle 138 is in a position shown in FIG. 45 and the portion 137b is engaged in the lowermost groove 154a, the movable valve body 142 is in a position shown in FIG. 46. At that time, the warm water is not discharged from the discharge port 136a. When the handle 138 is then swung down with the lever 138b thereof, the movable valve body 142 is slid and the opening 148 thereof communicates with the warm water outflow hole 141c of the fixed valve body 141 so that the warm water is discharged from the port 136a. During the process of the swinging, the degree of opening of the hole 141c is gradually heightened to increase the flow rate of the discharged warm water, and the portion 137b is engaged in the groove 154b or 154c to give the manipulating hand of the user of the faucet 130 a feeling of resistance to enable him to recognize that the flow rate of the discharged warm water is low or moderate, or the portion is engaged in the other groove 154d to give the hand a feeling of resistance to enable him to recognize that the flow rate is maximum, as shown in FIG. 47.

Figure 48:
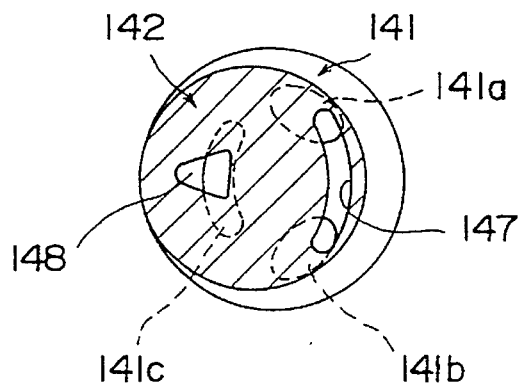
FIG. 48 is a plan view of the valve bodies to illustrate the positional relationship between them in the state of operation.

When the movable valve body 142 is in a position shown in FIG. 46 or 48, the handle 138 is located nearly at the center of the range of the turning thereof and the degrees of opening of the cold and the hot water inflow holes 141a and 141b of the fixed valve body 141 are nearly equal to each other. The handle 138 can be then turned to change the ratio of the degrees of opening of the inflow holes 141a and 141b to set the temperature of the discharged warm water at a desired lower or higher level. At that time, the plate 154 is turned together with the handle 138 as the projecting engagement portion 137b remains engaged in one of the grooves 154a, 154b, 154c and 154d of the plate. Another such groove may be provided between them to set a larger number of engagement points.

A locking mechanism is provided in the body 130 of the faucet 131 so that the mechanism can be put out of action by manipulating a safety button 156 provided in the halfway portion of the lever 138b and movable into and out of it. The locking mechanism includes a guide ring 157 unrotatably fitted in the opening 137a of the cover 137, an elastic disk 158 provided in the ring so as to be turned together with the handle 138, a wire 162 laid in the handle movable back and forth therein and having the lower end 159 on the top of the disk and the upper end 161 in the halfway portion of the lever 138b, and a spring 163 urging the disk upward. The ring 157 has an inner projecting portion 164 for keeping the elastic disk 158 from coming off the ring. Projections not shown in the drawings are provided on the inner circumferential surface of the ring 157 and the outer circumferential surface of the disk, respectively, so that immediately before the degree of opening of the hot water inflow hole 141b of the fixed valve body 141 becomes maximum, the projections are engaged with each other to restrict the turning of the handle 138. The wire 162 is obliquely bent at the upper end 161 thereof as shown in FIG. 45, and is in sliding contact with the safety button 156 at the upper end of the wire, so that when the button is moved into the lever 138b, the wire is moved down to push the elastic disk 158 downward to disengage the projections from each other. When the handle 138 is turned with the lever 138b thereof to heighten the temperature of the discharged warm water, the turning is hindered by the mutual engagement of the projections immediately before the temperature becomes maximum to make the water very hot. Very hot water is thus prevented from being unexpectedly discharged from the discharge port 136a. Therefore, the safety of the faucet 130 is high.

Figure 49:
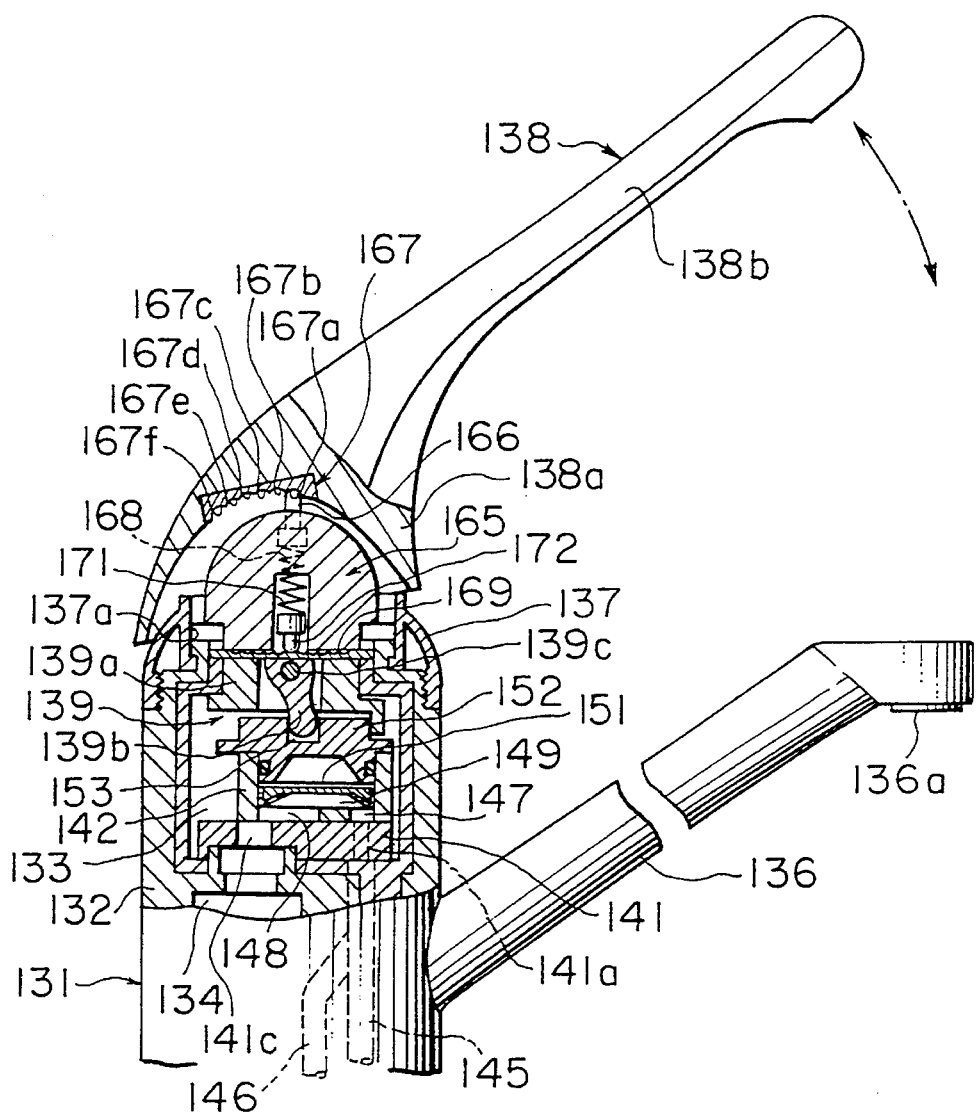
FIG. 49 is a cutaway side view of a hot and cold water mixing faucet which is a modification of that shown in FIG. 45.
Figure 50:
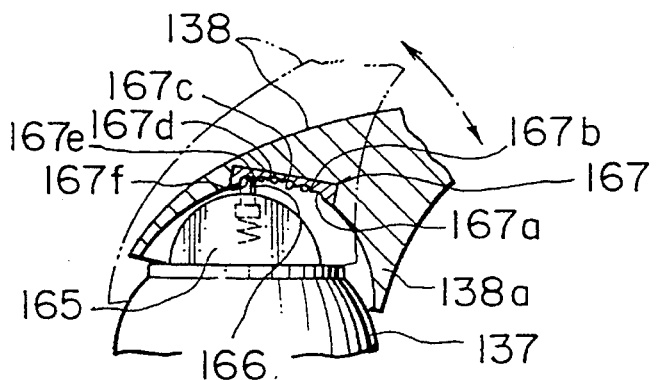
FIG. 50 is a partially sectional view of the faucet to illustrate a state of operation thereof.
Figure 51:
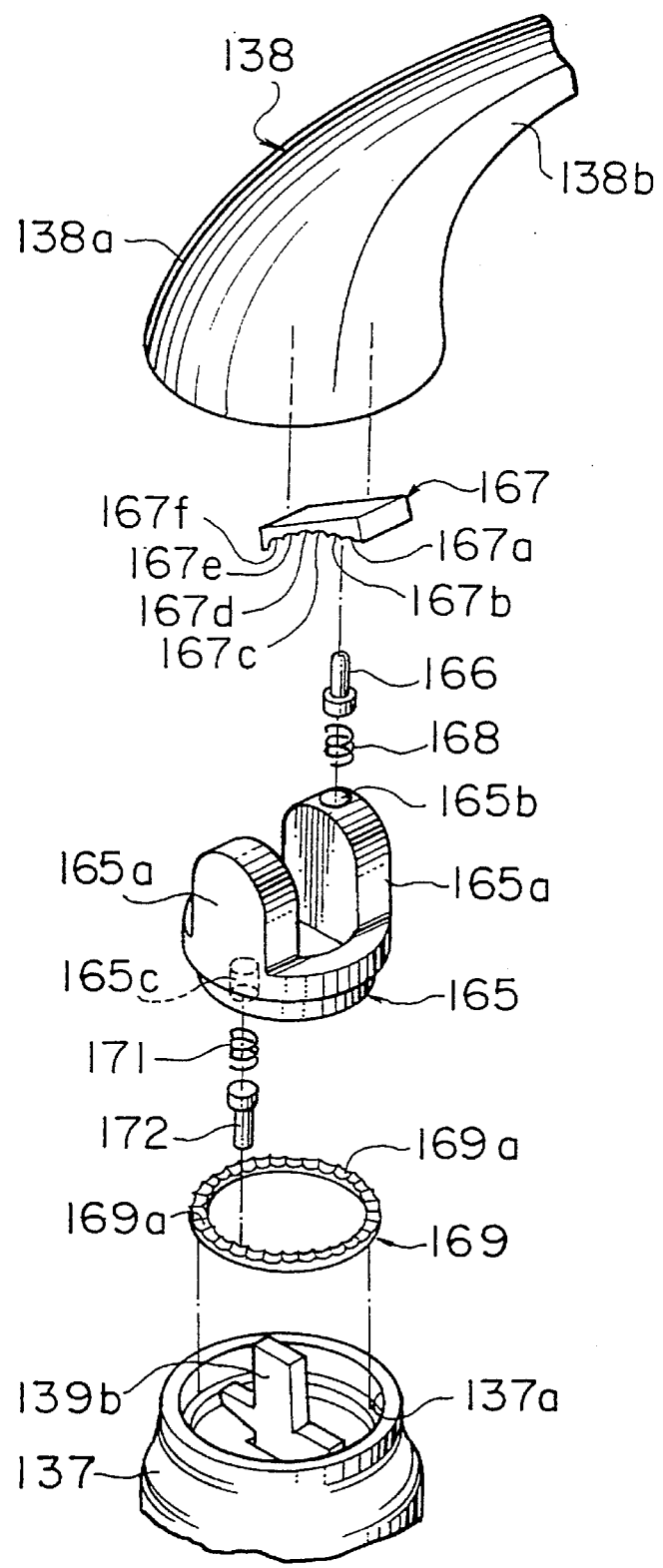
FIG. 51 is a perspective exploded view of a major part of the faucet.

FIGS. 49, 50 and 51 show a hot and cold water mixing faucet which is a modification of the preceding one and in which not only a plurality of engagement points are set along the direction of the swinging of a handle but also a plurality of engagement points are set along the direction of the turning thereof. The faucet includes components equivalent to those of the preceding one, and denoted by the same reference symbols as the latter. The components are not described in detail hereinafter. In the faucet, a projecting engagement pin 166 for flow rate regulation is fitted in an intermediate member 165 provided in the opening 137a of a cover 137, so that the pin can be moved into and out of the member. A plurality of engagement grooves 167a, 167b, 167c, 167d, 167e and 167f are provided in the bottom of an engagement member 167 fitted in the inner surface of the body 138a of the handle 138 so that the pin 166 can be engaged in each of the grooves. The former plurality of engagement points are thus set in the direction of the swinging of the handle 138. The intermediate member 165 has a right and a left vertical portions 165a each having a semicircular top, as shown in FIG. 51. The upper half of the lever 139b of a kinematic conjunction mechanism 139 is inserted in between the vertical portions 165a. The intermediate member 165 is fastened to the cylindrical member 139a of the mechanism 139 so that the intermediate member is turned together with the handle 138. One of the vertical portions 165a has a hole 165b in the top of the member. A spring 168 and a projecting member 166 are fitted in the hole 165b so that the member is urged toward the engagement member 167 by the spring. The engagement member 167 faces the projecting engagement pin 166, and has the grooves 167a, 167b, 167c, 167d, 167e and 167f juxtaposed together along the direction of the swinging of the handle 138.

An engagement ring 169 having a large number of engagement grooves 169a continuously juxtaposed together at optional intervals in the top of the ring along the total circumference thereof is provided under the intermediate member 165. A projecting engagement pin 172 for temperature regulation is fitted in the intermediate member 165 at the bottom thereof so that the pin is engaged in one of the grooves 169a, and can be moved into and out of the member. The latter plurality of engagement points are thus set along the direction of the turning of the handle 138. The ring 169 is unrotatably fitted in the opening 137a of the cover 137 so that the top of the ring is in sliding contact with the bottom of the intermediate member 165. A spring 171 and the projecting engagement pin 172 are fitted in the hole 165c of the intermediate member 165 at the bottom thereof so that the pin is urged toward one of the grooves 169a of the top of the engagement ring 169 by the spring.

When the handle 138 is in a position shown in FIG. 49, a movable valve body 142 is in the same position as that shown in FIG. 46, so that no water is discharged from the discharge port 136a of the faucet. When the handle 138 is then swung down with the lever 138b thereof, the movable valve body 142 is slid so that a warm water is discharged from the port 136a, and the flow rate of the water is regulated. At that time, the projecting engagement pin 166 for flow rate regulation is engaged in one of the grooves 167b, 167c, 167d, 167e and 167f of the engagement member 167 to give the manipulating hand of the user of the faucet a feeling of resistance to enable him to recognize stepwise that the flow rate of the discharged warm water is increased or decreased.

When the handle 138 is nearly at the center of the range of the turning thereof as shown in FIGS. 49 and 50, the degrees of opening of a cold and a hot water inflow holes 141a and 141b are nearly equal to each other. When the handle 138 is then horizontally turned to set the temperature of the discharged warm water at a desired lower or higher level, the projecting engagement pin 172 for temperature regulation is engaged in one of the grooves 169a of the engagement ring 169 to give the manipulating hand of the user of the faucet a feeling of resistance to enable him stepwise that the temperature is altered to be lower or higher.

At that time, the engagement member 167 is turned together with the handle 38 as the projecting engagement pin 166 remains engaged in one of the grooves 167a, 167b, 167c, 167d, 167e and 167f of the member.

The interval between the grooves 169a of the engagement ring 169 may be gradually reduced along the direction of the turning of the handle 138 to gradually diminish the interval between the times when the feelings of resistance are given to the manipulating hand as the handle is turned to regulate the temperature of the discharged warm water to a lower or higher level. It can thus be made easier for a blind person or the like to regulate the temperature by turning the handle 138 with the lever 138b thereof.

Figure 52B:
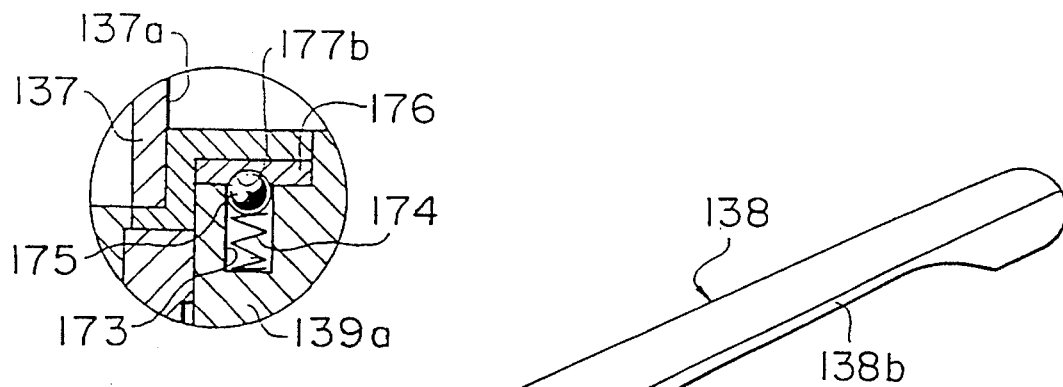
FIG. 52(B) is an enlarged partial sectional view of a portion W of the faucet.
Figure 52A:
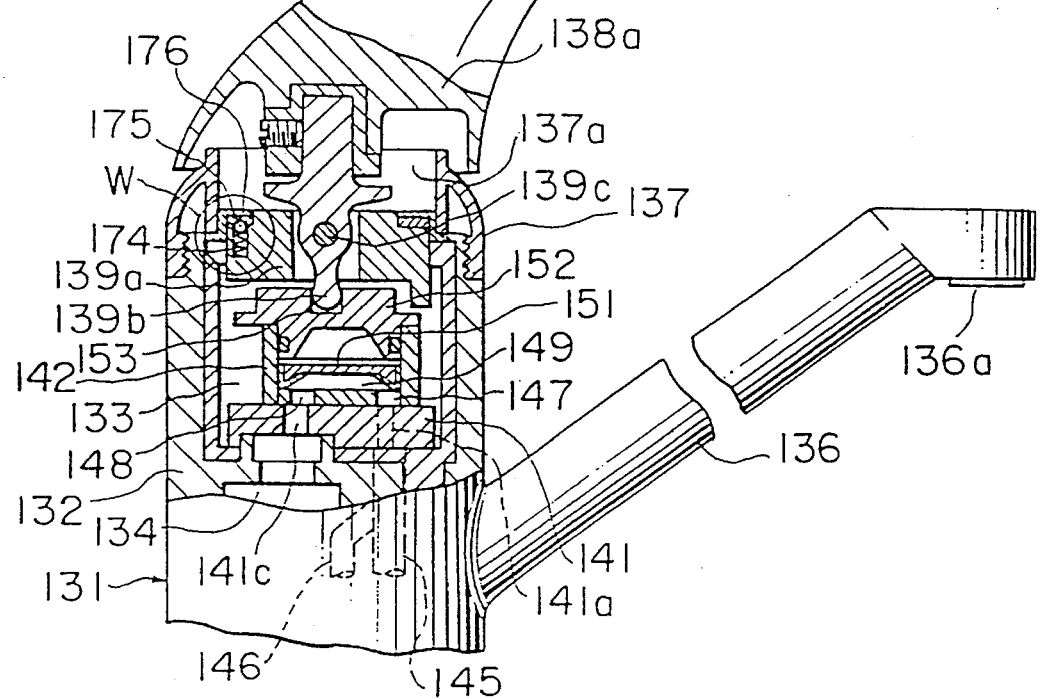
FIG. 52(A) is a hot and cold water mixing faucet which is another modification of that shown in FIG. 45.
Figure 53:
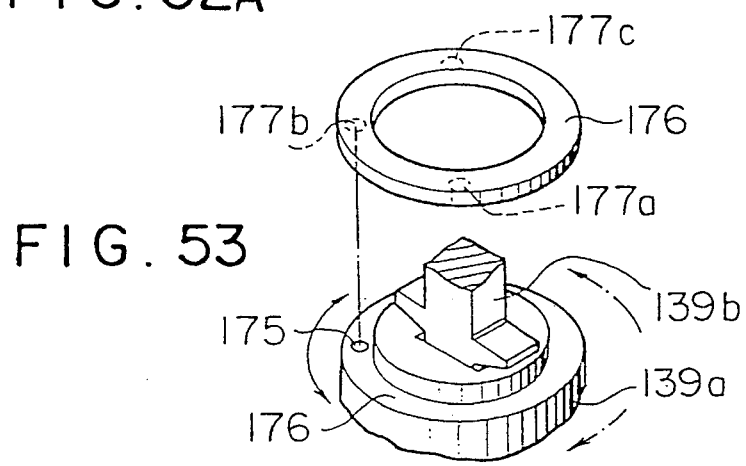
FIG. 53 is a perspective exploded view of a major part of the faucet shown in FIG. 52(A)

FIGS. 52 and 53 show a hot and cold water mixing faucet which is another modification of the embodiment shown in FIG. 45 and in which a plurality of engagement points are set along the direction of the turning of a handle. In the modification, a cylindrical member 139a, which is turned together with the handle 138, has a vertical hole 173 at the top of the member, as shown in FIG. 52(B). A spring 174 and a projecting engagement ball 175 are fitted in the hole 173 so that the ball can be moved into and out of the hole. An engagement ring 176 is unmovably fitted in the opening 137a of a cover 137 so that the ring is in sliding contact with the top of the cylindrical member 139a. The bottom of the ring 176, which is in sliding contact with the top of the cylindrical member 139a, has a plurality of engagement dimples 177a, 177b and 177c at prescribed intervals along the direction of the turning of the handle 138 so that the projecting engagement ball 175 can be engaged in each of the dimples. The plurality of engagement points are thus set at the prescribed intervals along the direction of the turning of the handle 138. The number and positions of the dimples, which are three and as shown in the drawings, respectively, may differ therefrom.

The intermediate dimple 177b is in such a position that when the projecting engagement ball 175 is engaged in the dimple by horizontally turning the handle 138 with the lever 138b thereof, the degrees of opening of a cold and a hot water inflow holes 141a and 141b are equal to each other to make the temperature of a discharged warm water moderate. The dimple 177a for a higher temperature is in such a position that when the ball 175 is engaged in the dimple by turning the handle 138 with the lever 138b thereof, the degree of opening of the cold water inflow hole 141a is higher than that of the hot water inflow hole 141b to set the temperature of the discharged warm water at a lower level. The dimple 177c for a lower temperature is in such a position that when the ball 175 is engaged in the dimple by turning the handle 138 with the lever 138b thereof, the degree of opening of the hot water inflow hole 141b is higher than that of the cold water inflow hole 141a to set the temperature of the discharged warm water at a higher level. Another dimple may be provided between the dimples 177a and 177b or between those 177b and 177c to set a larger number of engagement points.

When the handle 138 is virtually at the center of the range of the horizontal turning thereof as shown in FIG. 52, the degrees of opening of the cold and the hot water inflow holes 141a and 141b are virtually equal to each other. When the handle 138 is then turned with the lever 138b thereof to set the temperature of the discharged warm water at a desired lower or higher level, the projecting engagement ball 175 is engaged in one of the dimples 177a, 177b and 177c to give the manipulating hand of the user of the faucet a feeling of resistance to enable him to recognize that the temperature is set to be lower, higher or moderate.

FIGS. 54 and 55 show a hot and cold water mixing faucet which is a modification of that shown in FIGS. 52 and 53. In the modification, a projecting engagement ball 175 is supported so that it can be horizontally moved into and out of a cylindrical member 139a, which is turned together with a handle 138. The cylindrical member 139a has a horizontal hole 173 in the outer circumferential surface of the member. A spring 174 and the ball 175 are fitted in the hole 173. An engagement member 179 shaped as an arc is unmovably fitted in the opening 137a of a cover 137 so that the member is in sliding contact with the outer circumferential surface of the cylindrical member 139a. The inner surface of the engagement member 179, which is in sliding contact with the outer circumferential surface of the cylindrical member 139a, has a plurality of engagement dimples 179a, 179b and 179c at prescribed intervals along the direction of the turning of the handle 138 so that the ball 175 can be engaged in and disengaged out of each of the dimples. A plurality of engagement points are thus set at the prescribed intervals along the direction of the turning of the handle 138. The number and positions of the dimples, which are three and as shown in the drawings, respectively, may differ therefrom. The ball 175 is engaged in one of the dimples 179a, 179b and 179c of the engagement member along with the turning of the handle 138 so as to give the manipulating hand of the user of the faucet a feeling of resistance to enable him to recognize that the temperature of a discharged warm water is set to be low, high or moderate.

FIGS. 56 and 57 show a hot and cold water mixing faucet which is a modification of that shown in FIGS. 54 and 55 and in which an elastic engagement member 181 such as a plate spring is provided instead of the projecting engagement ball 175. In the modification, a cylindrical member 139a, which is turned together with a handle 138, has a horizontal hole 173 in the outer circumferential surface of the member, and the elastic engagement member 181 is fitted in the hole. An engagement member 182 shaped as an arc is unmovably fitted in the opening 137a of a cover 137 so that the member is in sliding contact with the outer circumferential surface of the cylindrical member 139a. The inner surface of the engagement member 182, which is in sliding contact with the outer circumferential surface of the cylindrical member 139a, has a plurality of engagement grooves 182a, 182b and 182c at prescribed intervals along the direction of the turning of the handle 138 so that the tip 181a of the elastic engagement member 181 can be engaged in and disengaged out of each of the grooves. A plurality of engagement points are thus set at the prescribed intervals along the direction of the turning of the handle 138. The number and positions of the grooves 182a, 182b and 182c, which are three and as shown in the drawings, respectively, may differ therefrom. The tip 181a of the elastic engagement member 181 is engaged in one of the grooves 182a, 182b and 182c of the engagement member 182 along with the turning of the handle 138 so as to give the manipulating hand of the user of the faucet a feeling of resistance to enable him to recognize that the temperature of a discharged warm water is set to be low, high or moderate.

In each of the faucets shown in FIGS. 45, 46, 47, 48, 49, 50, 51, 52, 53, 54, 55, 56 and 57, the feeling of resistance is given to the manipulating hand of the user of the faucet at every prescribed interval along with the swinging or/and turning of the handle to enable him to set the flow rate or/and temperature of the discharged warm water at a desired level. For that reason, the time which it takes to set the flow rate or/and the temperature can be shortened to improve the manipulating property of the faucet, and the warm water can be prevented from being needlessly discharged therefrom.

Figure 58:
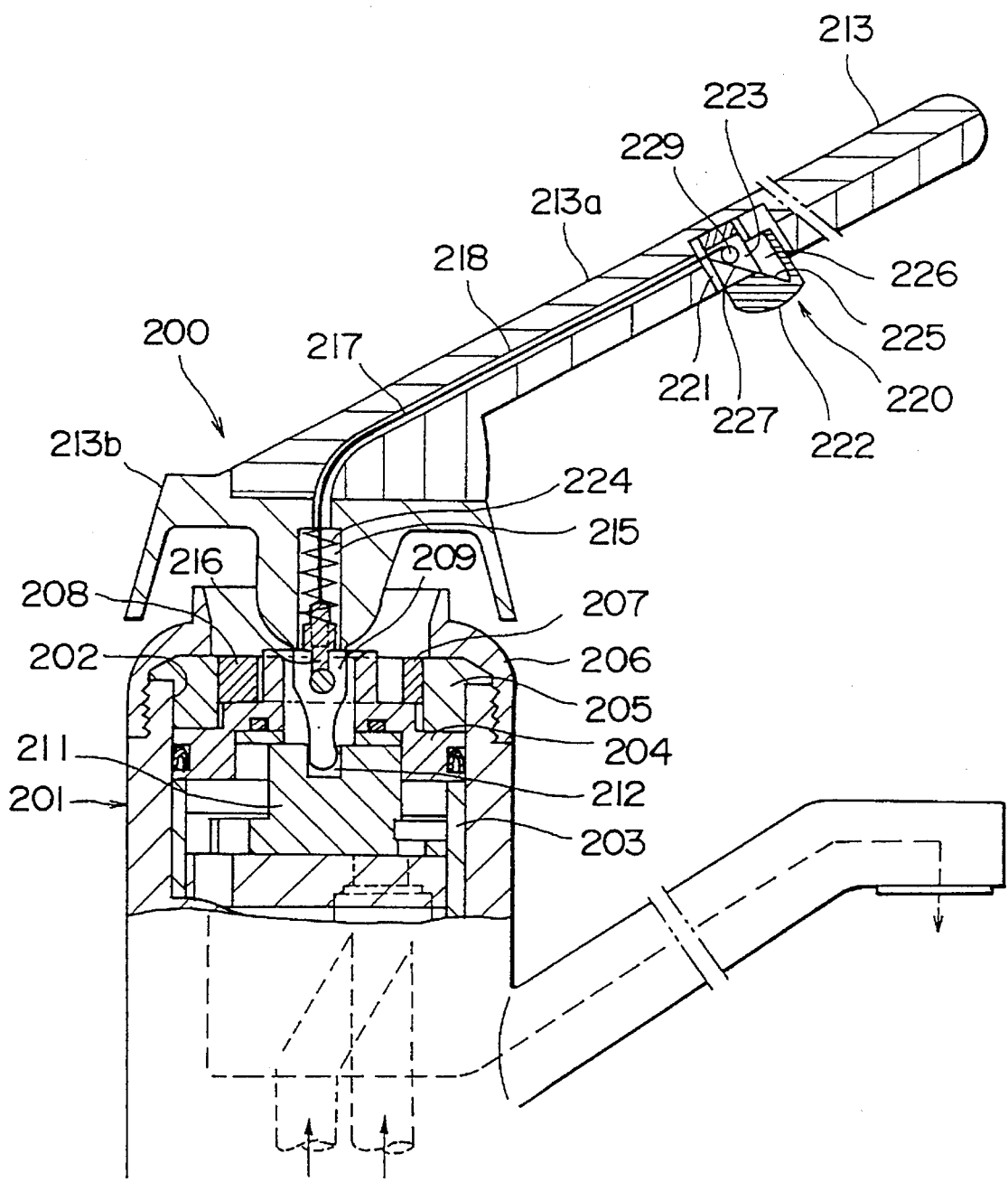
FIG. 58 is a cutaway side view of a hot and cold water mixing faucet which is yet another embodiment of the invention.
Figure 59:
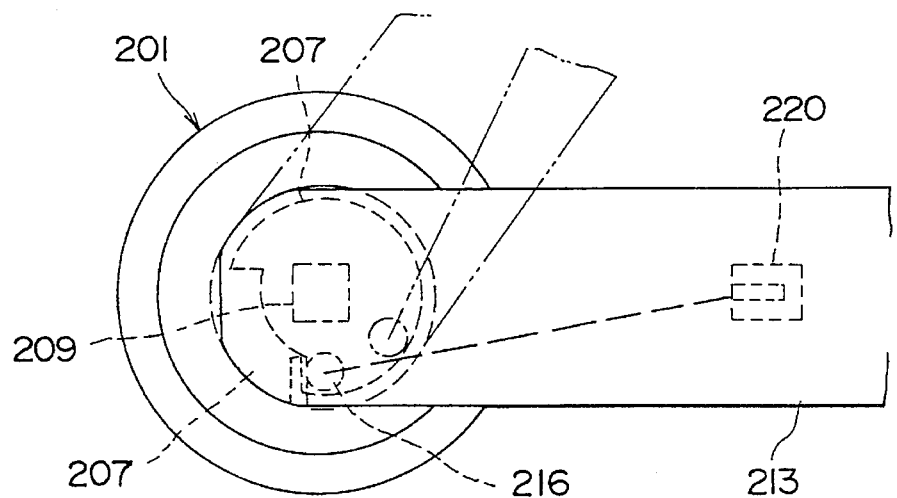
FIG. 59 is a sketchy plan view of the faucet.
Figure 60:
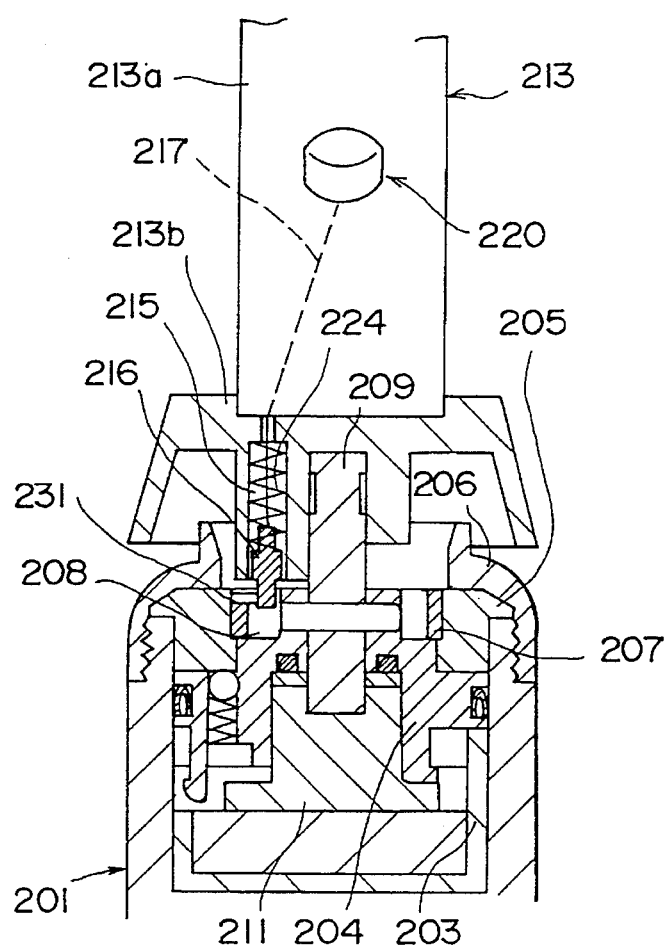
FIG. 60 s a cutaway front view of the faucet to illustrate the turning restriction state thereof.
Figure 61:
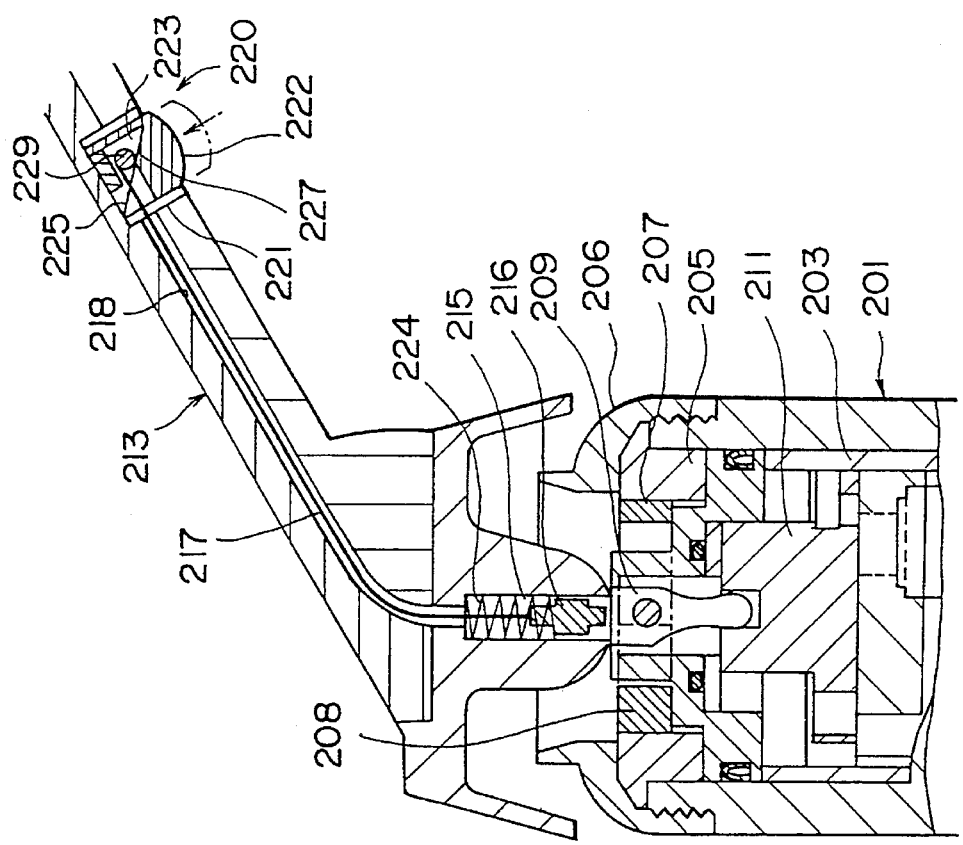
FIG. 61 is a front-to-rear sectional view of a major part of the faucet to illustrate the turning nonrestriction state thereof.
Figure 62:
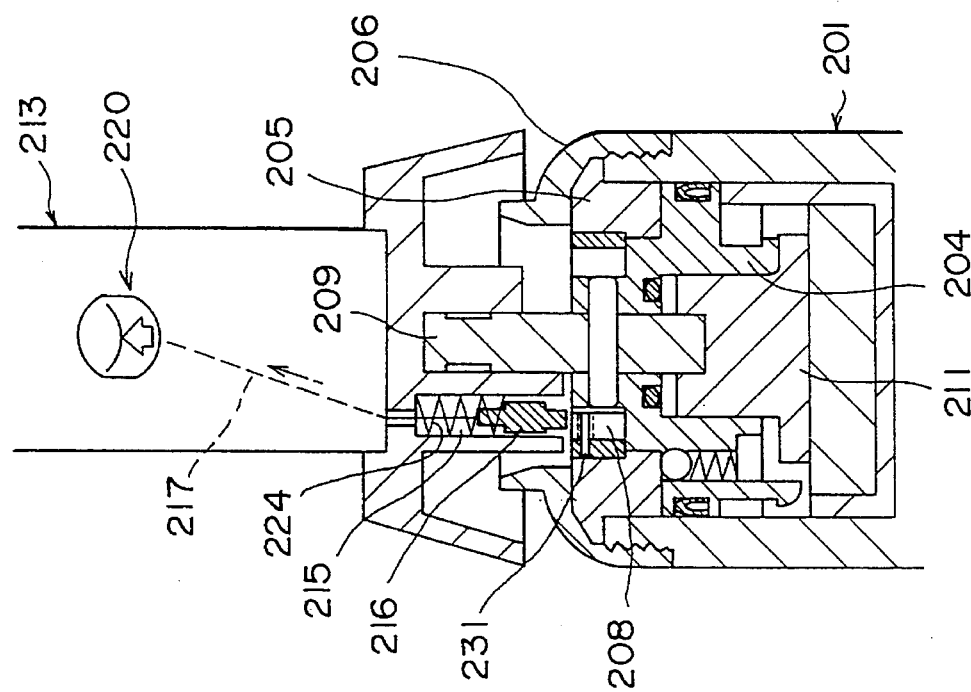
FIG. 62 is a cutaway front view of the part.
Figure 63:
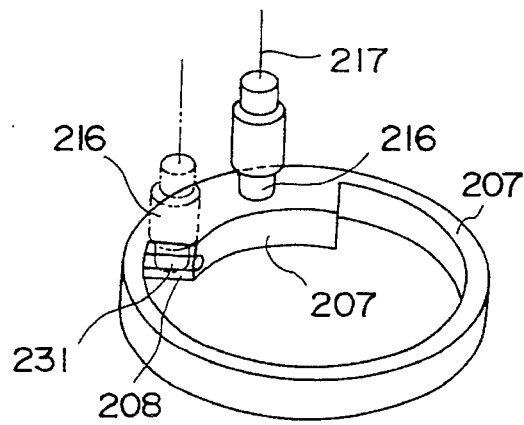
FIG. 63 is a perspective view of a part of the faucet to illustrate the annulment of restriction thereof.

FIGS. 58, 59, 60, 61, 62, 63, 64 and 65 show a hot and cold water mixing faucet which is yet another embodiment of the present invention. The faucet is characterized in that unless a special manipulation is purposely performed, a manipulation lever cannot be moved beyond a prescribed position to make the temperature of a discharged warm water higher than a prescribed level, thereby preventing the danger of causing a scald with the water. The body 201 of the faucet 200 has a valve chamber 202 open at the top thereof, as shown in FIG. 58. A case 203 housing valve members and so forth is provided in the valve chamber 202. A valve guide 204 is disposed on the case 203. A case hold-down member 205 is fitted in the valve chamber 202 at the top thereof. A cover 206 is screw-engaged with the faucet body 201 over the valve chamber 202, and tightened to push the case hold-down member 205 onto the top of the valve guide 204. A stopper ring 207 is unmovably fitted in the case hold-down member 205, and has a stopper portion 208 projecting inward from the inner circumferential surface of the ring in the radial direction thereof and extending in a prescribed angular range as shown in FIG. 63. An operation lever 209 is supported in a swingable manner by the valve guide 204, and unrotatably engaged in the lever engagement recess 212 of the top of a movable valve body 211 at the lower end of the lever.

A handle 213 is coupled to the lever 209 at the upper end thereof. The handle 213 includes a cup-shaped body 213 covering the top of the cover 206, and the manipulation lever 213a extending obliquely upward from the body whose central portion is secured to the upper end of the operation lever 209 so that the horizontal turning action and vertical swinging action of the body are transmitted to the movable valve body 211 through the operation lever. The handle body 213b has a pin guide hole 215 opened in the bottom of the body and eccentric thereto. A stopper pin 216 is fitted in the hole 215 so that the pin can be moved up and down. A spring 217 urges the pin 216 in such a direction as to move it down. As a result, the pin 216 is usually protruded from the hole 215 into the stopper ring 207. The stopper pin 216 is located at a distance from the axis of the faucet body 201. The distance is larger than the radius of the stopper portion 208 of the stopper ring 207, but slightly smaller than the radius of the other portion thereof, so that the pin comes into contact with the stopper portion at the prescribed angle of the horizontal turning of the handle 213 to prevent it from being turned beyond the angle. Horizontally turning the handle 213 with the lever 213a thereof in such a direction as to heighten the temperature of the discharged warm water is thus restricted by the stopper portion 208 of the stopper ring 207 and the stopper pin 216 to prevent the handle from being turned beyond such a prescribed position as to produce the danger of causing the scald with the discharged water.

Figure 64:
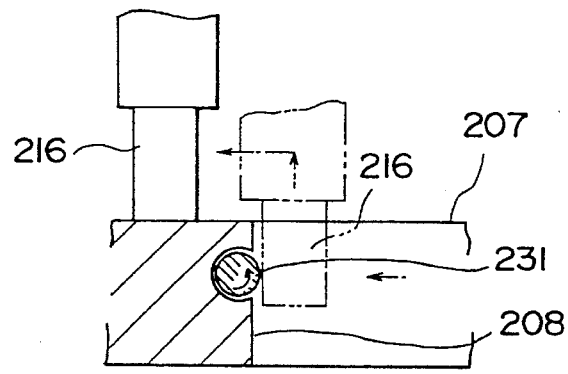
FIG. 64 is an enlarged sectional view of the part.
Figure 65:
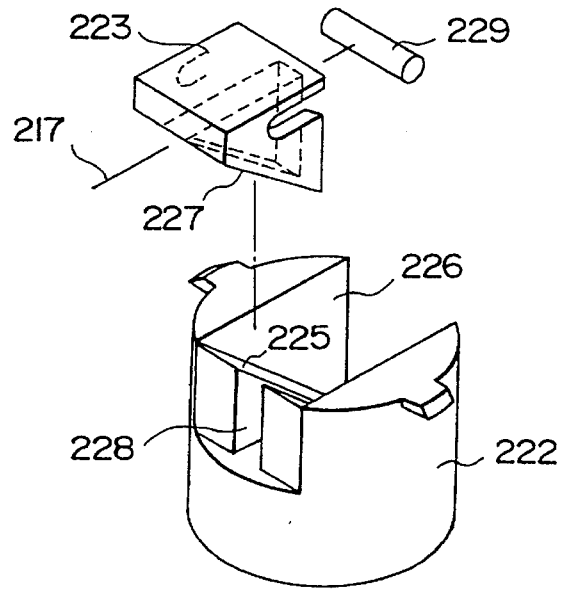
FIG. 65 is a perspective exploded view of a safety button of the faucet.
Figure 66:
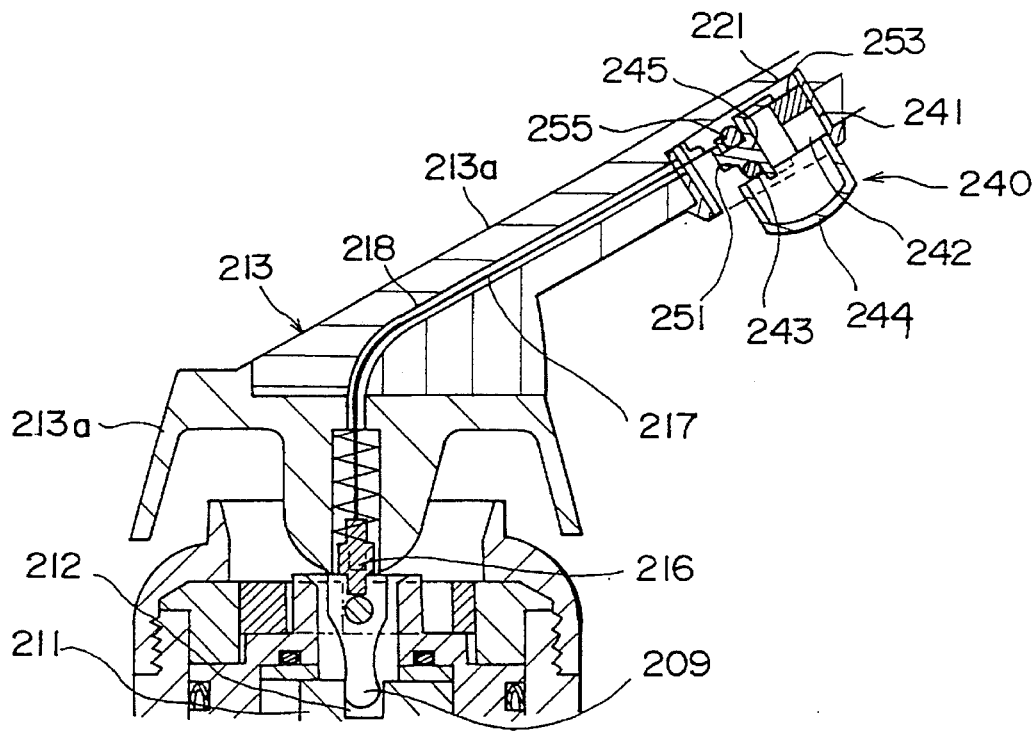
FIG. 66 is a front-to-rear sectional view of a major part of a hot and cold water mixing faucet which is a modification of that shown in FIG. 58.
Figure 67:
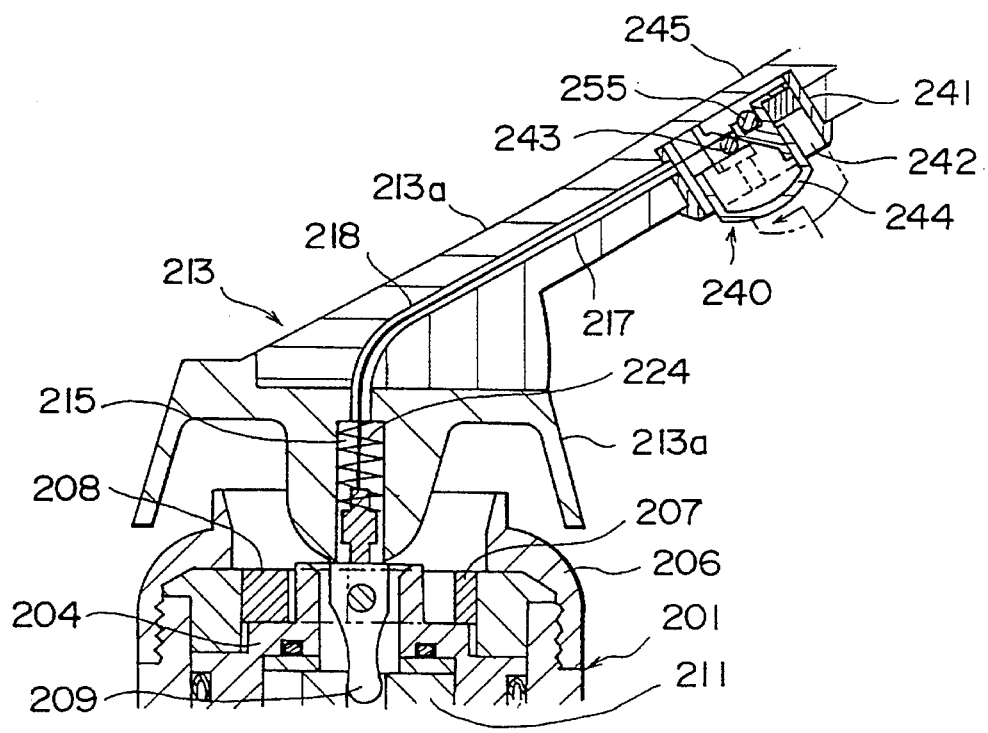
FIG. 67 is a front-to-rear sectional view of the part to illustrate the non-restriction state of the faucet.

A wire 217 such as a piano wore is coupled at one end thereof to the stopper pin 216 at the top thereof, and coupled at the other end thereof to a safety button 220 fitted in the halfway portion of the lever 213a of the handle 213 and usually projecting from the lower side of the portion. The wire 217 is flexible, but rigid in the longitudinal direction thereof, and extends through the internal hole 218 of the lever 213a. The safety button 220 includes a push button body 222 fitted in a button hole 221 provided in the lever 213a at the lower side thereof and communicating with the internal hole 218, and a slider 223. The push button body 222 can be moved into and out of the button hole 221, but cannot come off the lever 213a. The button body 222 is usually protruded down from the button hole 221 by the urging force of a spring 224. The button body 222 is notched from the top thereof to the rear thereof so that the body is formed with a slider housing portion 226 having guide slopes 225 made by the notching and obliquely extending up backward, as shown in FIG. 65. The slider 223 is fitted in the slider housing portion 226. The slider 223 is shaped nearly as a rectangular triangle, and has slopes 227 in sliding contact with the guide slopes 225 of the button body 222. The button body 222 and the slider 223 have wire passage openings 228 between the guide slopes 225 and between the slopes 227, respectively. The wire 271 extends through the internal hole 218 of the lever 213a and the wire passage openings 228, and is secured to a pin 229 fitted in the slider 223. The slider 223 is usually pulled by the wire 217 due to the force of the spring 224, which urges the stopper pin 216 downward, so that the slider is located on the upper portions of the guide slopes 225 of the button body 222. When the button body 222 is then pressed up into the handle lever 213a, the slider 223 is moved forward along the guide slopes 225 of the body to pull up the stopper pin 216 with the wire 217. When the pressing-in force on the button body 222 is thereafter removed therefrom, the stopper pin 216 is pushed again by the urging force of the spring 224 to pull the slider 223 with the wire 217 so that the slider slides backward to the original position thereof on the guide slopes 225 of the button body. If the stopper pin 216 were pushed on the stopper portion 208 of the stopper ring 207, a heavy resistance would act to the pulling-up of the stopper pin 216 to slow down or hinder the pulling-up. In order to avoid that phenomenon, a roller 231 is fitted in the stopper portion 208 and projects from the pin contact surface thereof, as shown in FIG. 64.

Thus, when the handle 213 reaches the prescribed position in being horizontally turned with the lever 213a thereof clockwise to heighten the temperature of the discharged warm water, the stopper pin 216 comes into contact with the stopper portion 208 of the stopper ring 207 to prevent the handle from being turned clockwise further beyond the position. Therefore, the temperature of the discharged warm water is kept from being made higher than the prescribed level. However, if the temperature of the discharged warm water is then to be made higher than the prescribed level, the body 222 of the safety button 220 is pressed in to move the slider 223 forward to pull up the stopper pin 216 from the stopper portion 208 of the ring 207 with the wire 217 to disengage the pin from the portion. The handle 213 can thus be turned clockwise further beyond the prescribed position to make the temperature of the discharged warm water higher than the prescribed level.

Figure 68:
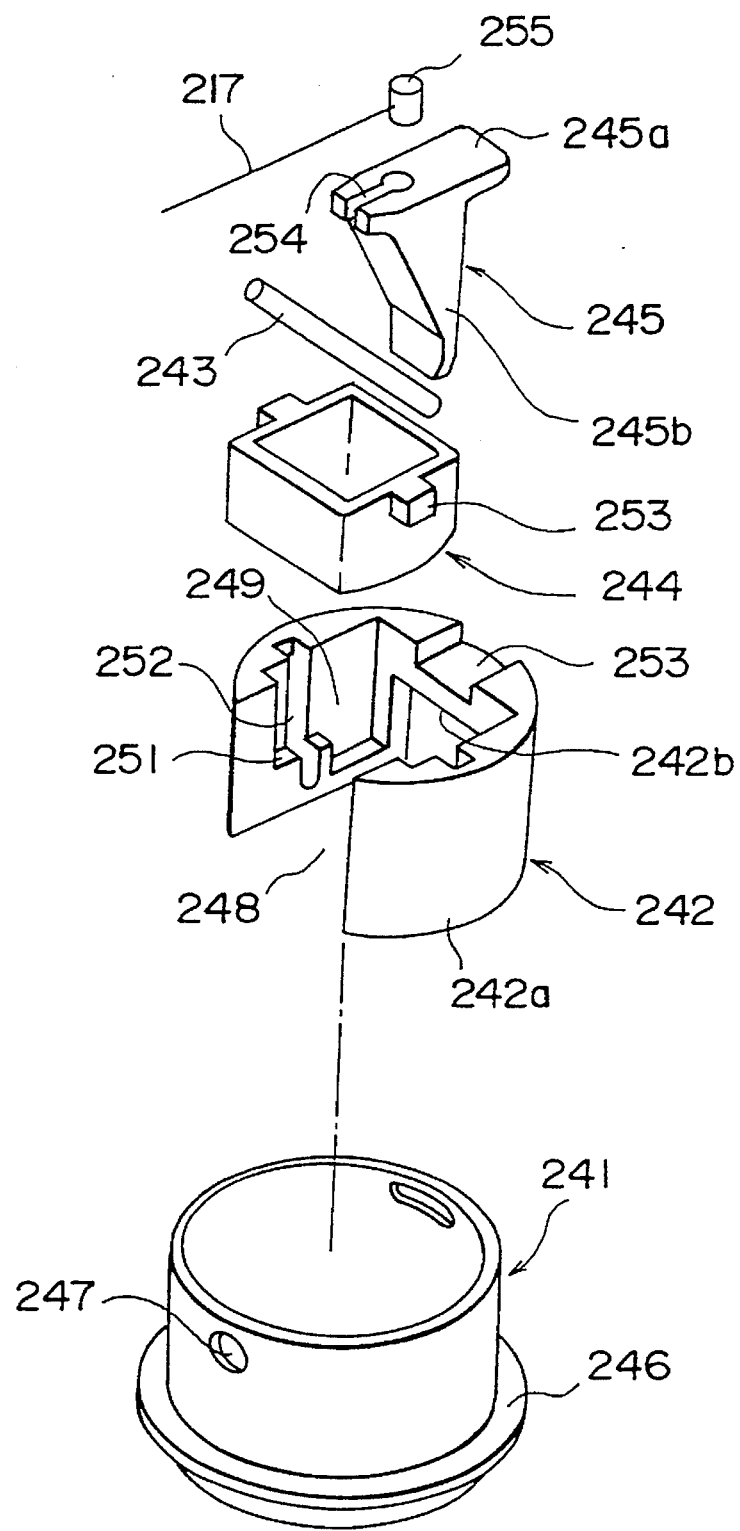
FIG. 68 is a perspective exploded view of the safety button of the faucet.
Figure 69:
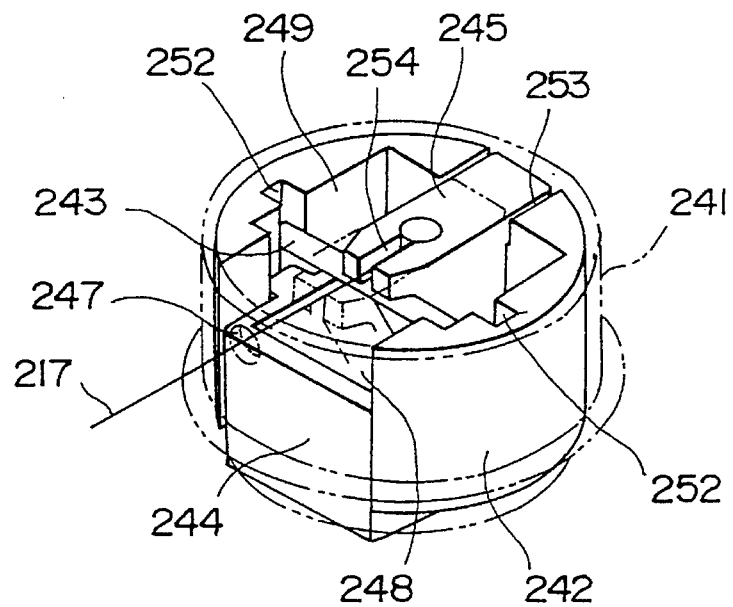
FIG. 69 is a perspective view of the safety button.
Figure 70:
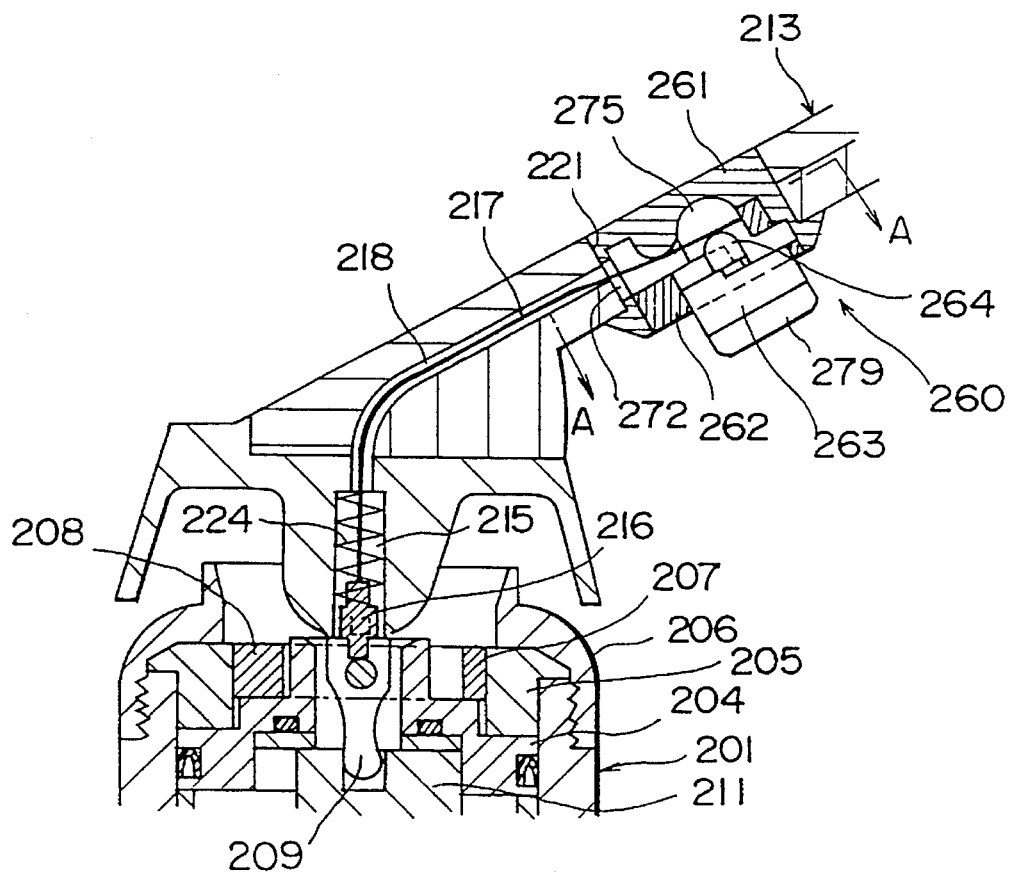
FIG. 70 is a front-to-rear sectional view of a major part of a hot and cold water mixing faucet which is another modification of that shown in FIG. 58.
Figure 71:
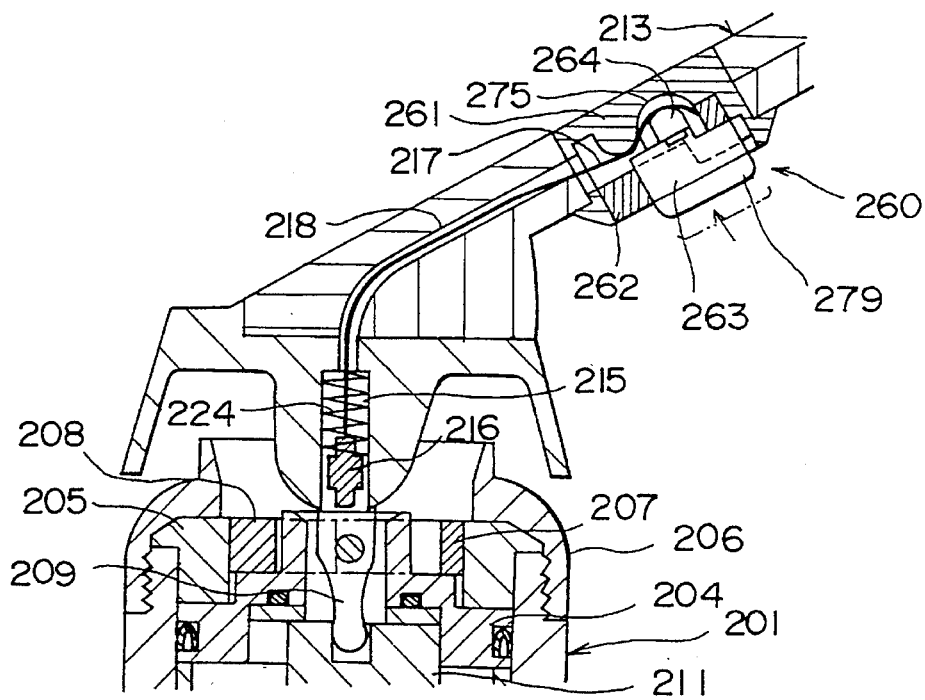
FIG. 71 is a front-to-rear sectional view of the part to illustrate the non-restriction state of the faucet.

FIGS. 66, 67, 68 and 69 show a hot and cold water mixing faucet which is a modification of the preceding embodiment. The faucet is the same as the preceding one except in a safety button. The faucet's parts equivalent to those of the preceding one are denoted by the same reference symbols as them, and not described in detail hereinafter. In the faucet, a slider is not directly slid by pressing in a push button body as in the preceding faucet, but a rolling shaft is moved by pressing in the push button body, to slide the slider through the action of the shaft. The safety button 240 includes a button housing 241 unmovably fitted in a button fitting hole 221 provided in the lever 213a of a handle 213 at the lower side thereof, a body cover 242 fitted in the housing, the rolling shaft 243 supported in the cover, the push button body 244 fitted in the body cover to be movable into and out of it and not to come off it, and the slider 245 accommodated in the body and coupled with a wire extending through the internal hole of the handle lever, as shown in FIG. 68.

The button housing 241 is cylindrically shaped, and has a flange 246 at one end thereof and a wire hole 247. The housing 241 is unmovably fitted in the hole 221 of the handle lever 213a so that the flange 246 is located at the lower end of the housing, and the wire hole 247 corresponds to the internal hole 218 of the lever.

The body cover 242 includes a pair of walls 242a having longitudinal curved surfaces and longitudinal plane surfaces facing each other in parallel, and a bridge 242b coupling the walls to each other at the upper portions thereof. The diameter of a circle defined by the longitudinal curved surfaces of the walls 242a is nearly equal to the inside diameter of the housing 241. The cover 242 is unmovably fitted in the housing 241 so that the bridge 242b of the cover is located at the upside thereof and an opening 248 defined between the walls and extending from the upper end of the cover to the lower one thereof faces the wire hole 247 of the housing when the safety button is disposed in the handle lever 213a. Button body engagement notches 249 are provided in the longitudinal plane surfaces of the walls 242a, and face each other. A locking step 251 is formed at one side of each notch 249 near the open end of the opening 248, and located above the bottom of the notch. A guide groove 252 is provided in the longitudinal plane surface of each wall 242a across the locking step 251, and extends down from the upper end of the surface to the same height as the bottom of the button body engagement notch 249. A slider guide notch 253 is provided in the bridge 242b at the central portion of the top thereof, and extends in the same direction as the opening 248. The push button body 244 is disposed in the cover 242 and engaged in the notches 249 thereof. The rolling shaft 243 is engaged at both the ends thereof in the guide grooves 252 so that the shaft movable up and down and rotatable. The slider 245 is engaged in the slide guide notches 253 of the cover 242.

The push button body 244 has a width nearly equal to the distance between the walls 242a of the cover 242, and is shaped as a box open at the top thereof. The button body 244 has engagement projections 253 on both the sides of the body, and is disposed between the walls 242a of the cover so that the projections are engaged in the body engagement notches 249 of the cover, the body can be moved up and down, and moved backward and forward, and the lower portion of the body projects down from the cover and the housing 241.

The rolling shaft 243 is fitted at both the ends thereof in the guide grooves 252 of the body cover 242, and located down on the push button body 244 due to the weight of the shaft.

The slider 245 includes a main plate portion 245a having an oblong top and equal in width to the slider guide notch 253 of the body cover 242, and a hanger portion 245b integrally conjoined to the bottom of the main plate portion except at both the ends thereof. The plate portion 245a is fitted in the slider guide notch 253 at the front end of the portion so that the portion is slidable backward and forward in the notch. The hanger portion 245b is fitted in the internal opening of the button body 244, and has a rear surface obliquely extending up backward and located in sliding contact with the rolling shaft 243, both side surfaces in sliding contact with the inner side surfaces of the body, and a vertical front surface in sliding contact with the inner front surface of the body. The slider 245 also has a slit 254 at the rear end of the main plate portion 245a. An engagement pin 255 is engaged in the slit 254. The wire 217 extending through the internal hole 218 of the lever 213a and the wire hole 247 of the button housing 241 is coupled to the pin 255 at the upper end of the wire.

When the push button body 244 of the safety button 240 is pressed up into the cover 242, the rolling shaft 243 is pushed up to press the slider 245 on the oblique rear surface thereof to move the slider down forward. As a result, the slider 245 pulls up a stopper pin 216 from a stopper ring 207 through the action of the wire 217 to disengage the pin from the stopper portion 208 of the ring to make it possible to turn the handle 213 with the lever 213a thereof beyond a prescribed position to make the temperature of discharged warm water higher than a prescribed level. When the push button body 244 is then pressed and moved backward, the engagement projections 253 thereof are put on the locking steps 251 of the cover 242 so that even if the manipulating hand of the user of the faucet is put off the button body, it does not descend but keeps the rolling shaft 243 pushed up. As a result, the slider 245 remains moved down forward, so that the stopper pin 216 is kept pulled up. In order to engage the stopper pin 216 with the stopper portion 208 of the ring 207 again, the push button body 244 is moved forward and the hand is then put off it.

FIGS. 70, 71, 72, 73 and 74 shows a hot and cold water mixing faucet which is another modification of the preceding embodiment. In each of the two preceding faucets, the slider coupled to the wire 217 connected to the stopper pin 216 is moved forward to pull up the pin from the stopper ring through the action of the wire to allow the handle to be turned beyond the prescribed position. In this faucet, however, a wire 217 is flexed to pull up a stopper pin 216 to allow a handle to be turned with the lever thereof beyond a prescribed position. The faucet differs from the two preceding ones in that respect, but is the same as them in other respects. The safety button 260 of the faucet includes a button body housing 261, a button body cover 262 fitted therein, a push button body 263 fitted in the cover, and a wire pusher 264 attached to the top of the body so as to be turnable.

Figure 73:
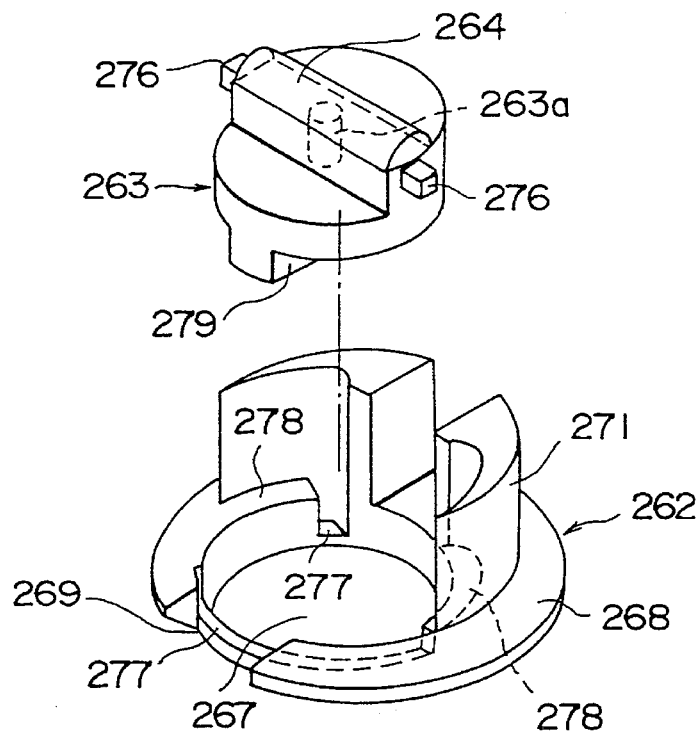
FIG. 73 is a perspective exploded view of the safety button of the faucet.
Figure 74:
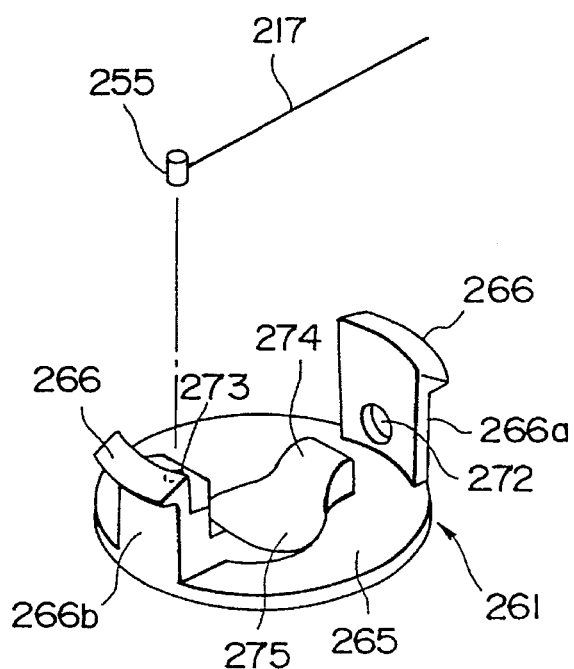
FIG. 74 is a perspective view of the housing of the button.

The button body housing 261 includes a disk 265, and a pair of position restricting juts 266 provided on one side of the disk at the peripheral edge thereof and facing each other across the center of the disk, as shown in FIG. 74. The button body cover 262 includes a ring 268 having a button body hole 267, positioning notches 269 provided at the peripheral edge of the ring so as to be engaged with the juts 266 of the housing 261, and a height restriction jut 271 provided at the peripheral edge of the button body hole between the notches, as shown in FIG. 73. The housing 261 and the cover 262 are disposed so that the position restricting juts 266 face the height restriction jut 271, and are fitted in the positioning notches 269, and the height restriction jut is in contact with the disk 265 of the housing. One position restricting jut 266a of the housing 261 has a wire hole 272, and the other position restricting jut 266b thereof has a wire anchoring portion 273. The housing 261 has a thick portion 274 which extends from the disk 265 to the inner surface of the intermediate-height portion of the jut 266b having the wire anchoring portion 273, and has a wire pusher reception notch 275 extending at the disk virtually rectangularly across an imaginary straight line extending from the wire securing portion to the wire hole 272 of the other jut 266a. An engagement pin 255 is attached to the wire 217 at the upper end thereof, and fitted in the wire anchoring portion 273 so that the wire extends through the slit of the thick portion 274. The wire 217 is thus anchored to the safety button 260.

The disk 268 of the button body cover 262 has button body engagement notches 277, in which the engagement projections 276 of the push button body 263 are fitted, and locking steps 278 adjacent to the notches and located above the other portion of the disk.

The push button body 263 is a generally circular body fitted with the wire rusher 264 on one side of the body, and has a knob 279 on the other side thereof, and the engagement projections 276 on the peripheral surface of the body. The button body 263 is fitted in the body cover 262 so that the wire pusher 264 faces the wire pusher reception notch 275 of the housing 261, the knob 279 projects down from the button body hole 267 of the cover, and the engagement projections 276 are fitted in the button body engagement notches 277 and can be moved up and down therein. A pin 263a is provided in the push button body 263 and fitted in the pin hole of the wire pushing holder 264 so that the body and the holder are coupled with each other rotatably relative to each other. The holder 264 has a form corresponding to that of the pusher reception notch 275.

The button body cover 262 has the two pairs of button body engagement notches 277 and locking steps 278 at the peripheral edge of the button body hole 267 of the cover so that the pairs correspond to the engagement projections 276 of the push button body 263, and the notch and the step in one pair are adjacent to each other in the same circumferential direction as those in the other pair are. The locking steps 278 are at the same height as the engagement projections 276 when the push button body 263 is pressed in. At least one of the engagement notches 277 has the same width as the projection 276 to prevent the button body 263 playing while the projections are fitted in the notches.

Figure 72:
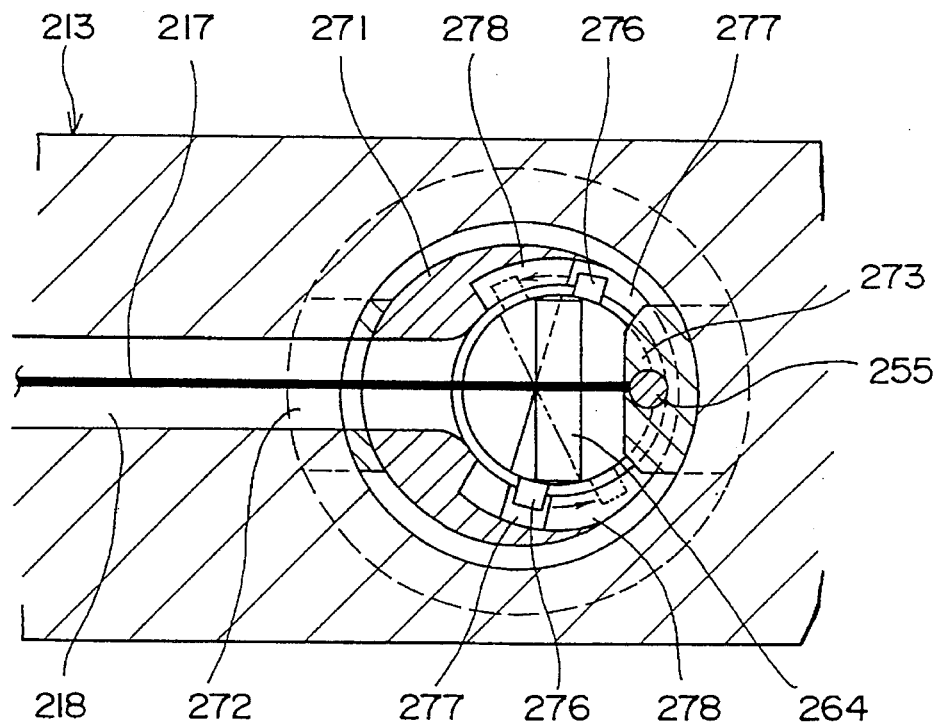
FIG. 72 is a sectional view of the part along lines A shown in FIG. 70.

The safety button 260 is provided in the button fitting hole 221 of the lever 213a of the handle 213. The wire 217 extends through the internal hole 218 of the lever and the wire hole 272 of the button body housing 261 and through between the wire pusher 264 and the pusher reception notch 275, and is anchored to the wire anchoring portion 273. When the body 263 of the button 260 is not pressed in, the stopper pin 216 is pushed out of a pin guide hole 215 by the urging force of a spring 224 so that the pin is engaged with the stopper portion 208 of a stopper ring 207 to prevent the handle 213 from being turned with the lever 213a thereof beyond the prescribed position. When the button body 263 is pressed in, the wire pusher 264 pushes the wire 217 into the pusher reception notch 275 to flex the wire in accordance with the form of the notch to pull up the stopper pin 216 from the stopper portion 208 of the ring 207 to disengage the pin from portion so that the handle 213 is allowed to be turned with the lever 213a thereof beyond the prescribed position to make the temperature of a discharged warm water higher than a prescribed level. At that time, the engagement projections 276 are located at the same height as the locking steps 278 so that if the button body 263 is turned with the knob 279 while remaining pressed in, the projections can be engaged on the steps as shown in FIG. 72, to keep the button body pressed in, the wire 276 flexed, and the stopper pin 216 pulled up, to maintain the faucet in a state of nonrestriction. If the faucet is thus maintained in the state of non-restriction, the warm water of the higher temperature can be discharged without pressing in the button body 263. In order to prevent the handle 213 again from being turned beyond the prescribed position, the button body 263 is turned back to disengage the projections 276 from the steps 278 so that the button body is pushed down by the urging force of the spring 224 through the action of the wire 217 while causing the wire pusher 264 to cease pushing the wire into the wire pusher reception notch 275. As a result, the wire 217 is unflexed, and does not pull the stopper pin 216, so that the pin is pushed down again by the spring 224 to be engaged with the stopper portion 208 of the ring 207 at the time of the turning of the handle 213 to the prescribed position.

In each of the faucets described above, the safety button is provided with a locking mechanism to keep the stopper pin from being engaged with the stopper portion of the stopper ring as the handle is turned to the prescribed position. For that reason, when the faucet is used in such a manner as to discharge the warm water of higher temperature a large number of times during a short period, the faucet does not need to be manipulated at each of the times to keep the stopper pin from being engaged with the stopper portion. The manipulating property of the faucet is thus improved.

FIGS. 75, 76, 77 and 78 show a hot and cold water mixing discharge faucet which is a modification of the above-described faucet and in which a stopper pin 281 is manipulated through the action of a thin plate 282 instead of the wire. The thin plate 282 is coupled with the stopper pin 281 or located in contact therewith at one end of the plate, and extends through the internal hole 218 of the lever 213a of a handle 213 and into the button fitting hole 221 of the lever. The plate 282 is triangularly bent at the other end thereof so that the plate has a slope 284 corresponding to a push button 283. The button fitting hole 221 has its open end in the upper side of the lever 213a to press the button 283 down into the hole. The slope 284 obliquely extends up backward.

Figure 78:
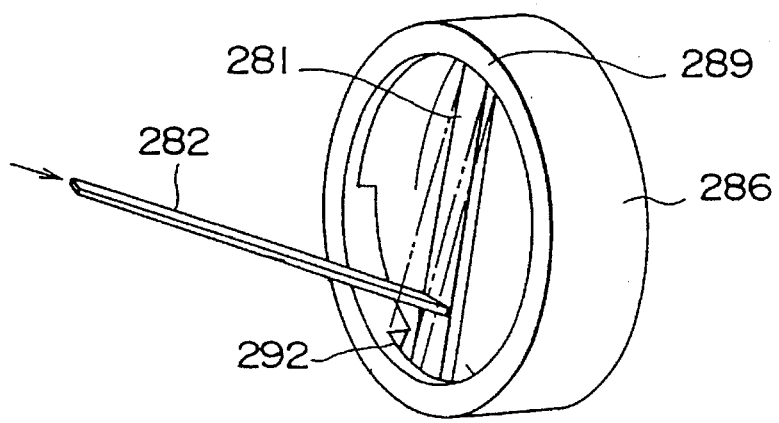
FIG. 78 is a perspective view of the part to illustrate the operation of the stopper ring and stopper pin of the faucet.
Figure 79:
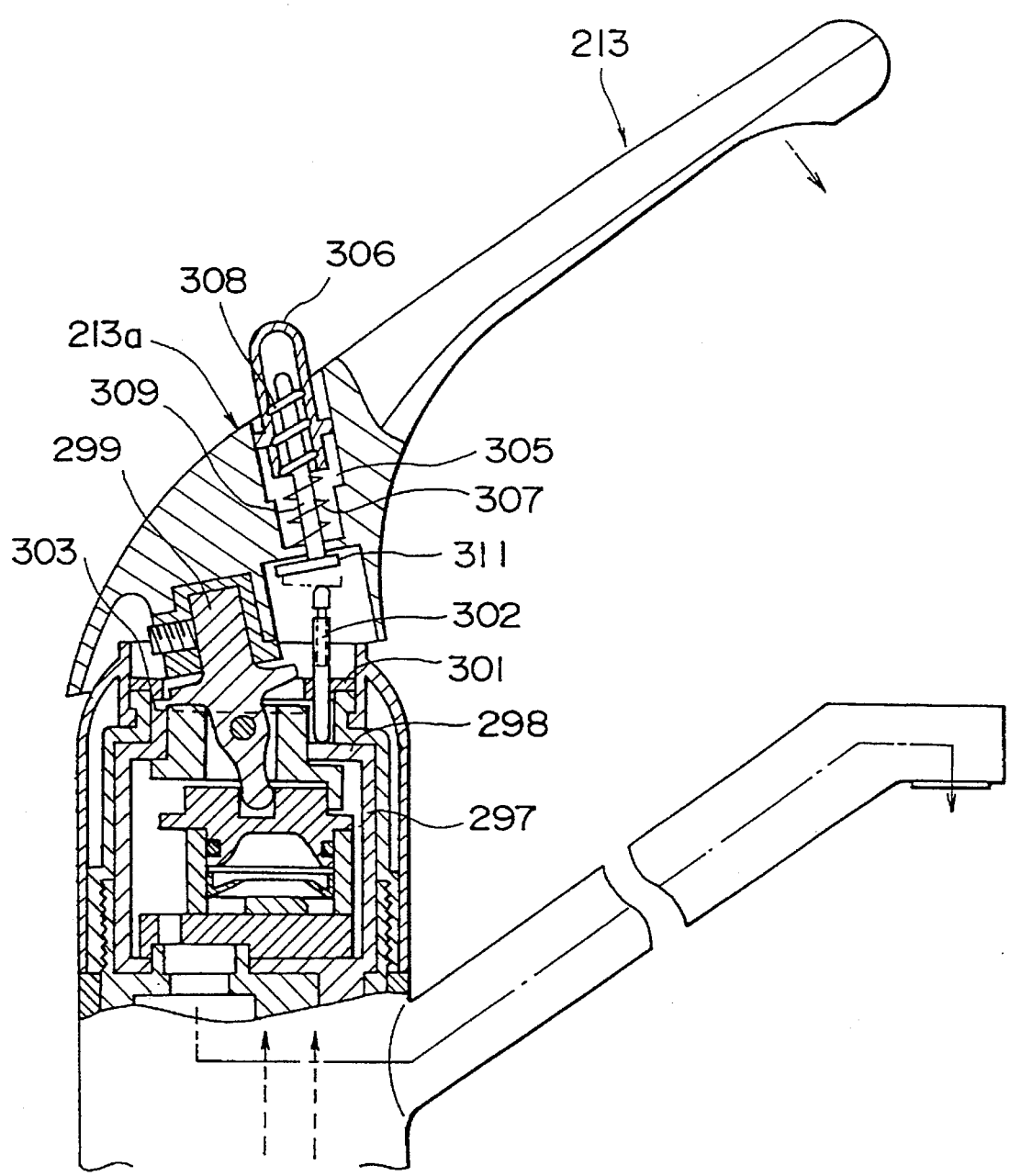
FIG. 79 is a cutaway side view of a hot and cold water mixing faucet which is yet another embodiment of the invention.

The stopper pin 281 extends through an operation lever 285 across the axis thereof along the diameter of a stopper ring 286 so that the pin is horizontally turned with both its ends in sliding contact with the inner circumferential surface of the ring by the lever as it is rotated along with the horizontal turning of the handle 213. The stopper ring 286 is disposed over a valve guide 287, and unrotatably fastened with a spline 288 to a cover 206 secured to the body 201 of the faucet at the top thereof, and has an inward projection 289 at the upper end of the ring. The stopper pin 281 is pushed on the bottom of the projection 289 by a spring 291 in such a manner that the pin is slidable on the projection. The stopper ring 286 has a stopper portion 292 formed in a prescribed position on the bottom of the projection 289 and projecting down therefrom, as shown in FIG. 78.

The operation lever 285 extends through the thin plate 282, and is connected therewith in such a position that the stopper pin 281 comes into contact with the stopper portion 292 of the ring 286 as the pin is turned to heighten the temperature of a discharged warm water. The through hole 293 of the lever 285, through which the stopper pin 281 extends, has a clearance for the pin in order to prevent the pin from being put out of its horizontal posture because of the vertical swinging of the lever along with that of the handle 213.

If the button 283 is not pressed in, turning the handle 213 in a direction to heighten the temperature of the discharged warm water is hindered when the handle is turned to such a prescribed position that the stopper pin 218 being turned together with the handle comes into contact with the stopper portion 292 of the stopper ring 286. If the button 283 is pressed in, the portion of the stopper pin 218, which comes into contact with the stopper portion 292 in the former case, is pushed down below the stopper portion so that the pin does not come into contact therewith when the handle 213 is turned to the prescribed position. As a result, the handle 213 can be turned beyond the position to more heighten the temperature of the discharged warm water.

Figure 75:
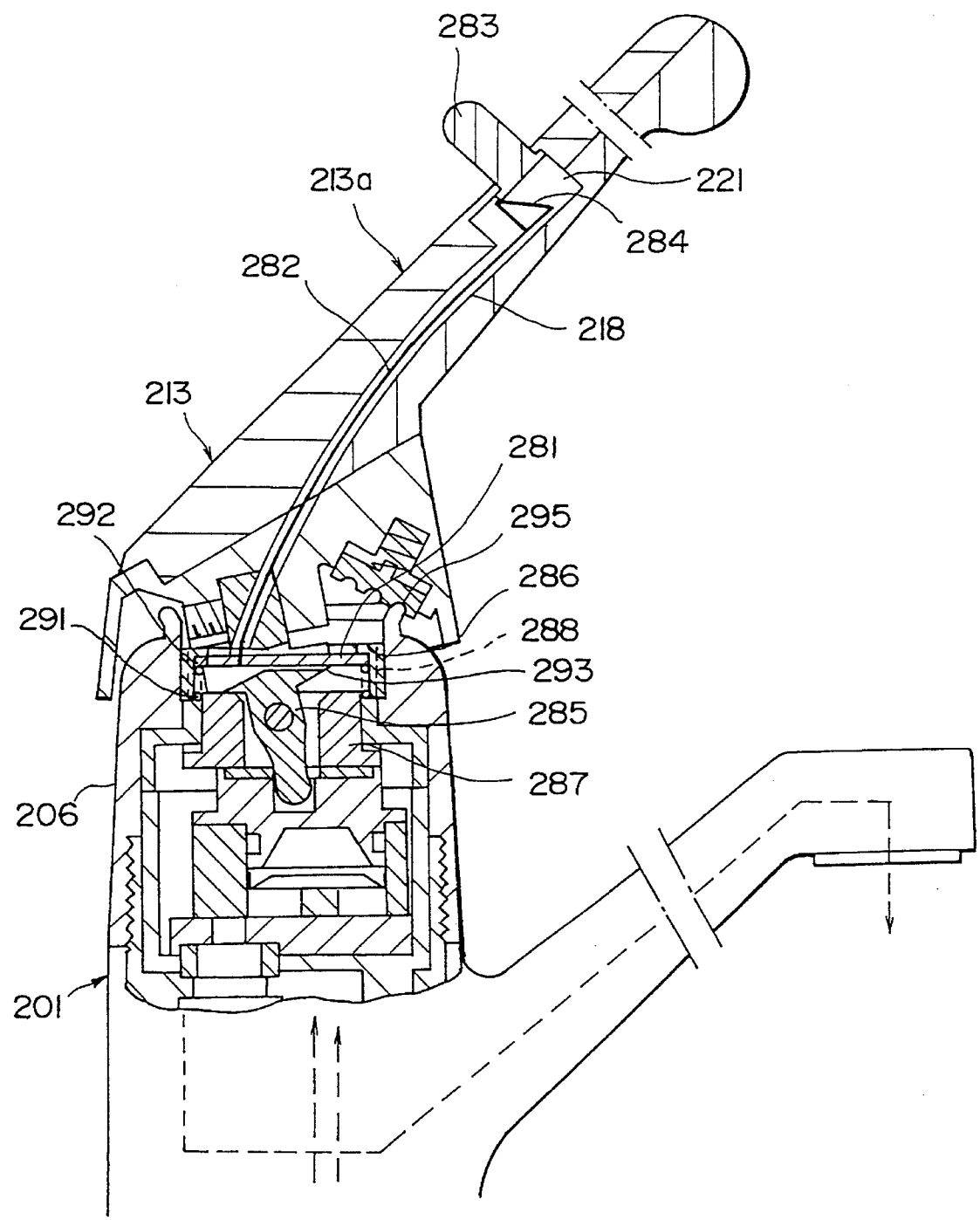
FIG. 75 is a cutaway side view of a hot and cold water mixing faucet which is yet another modification of that shown in FIG. 58.
Figure 76:
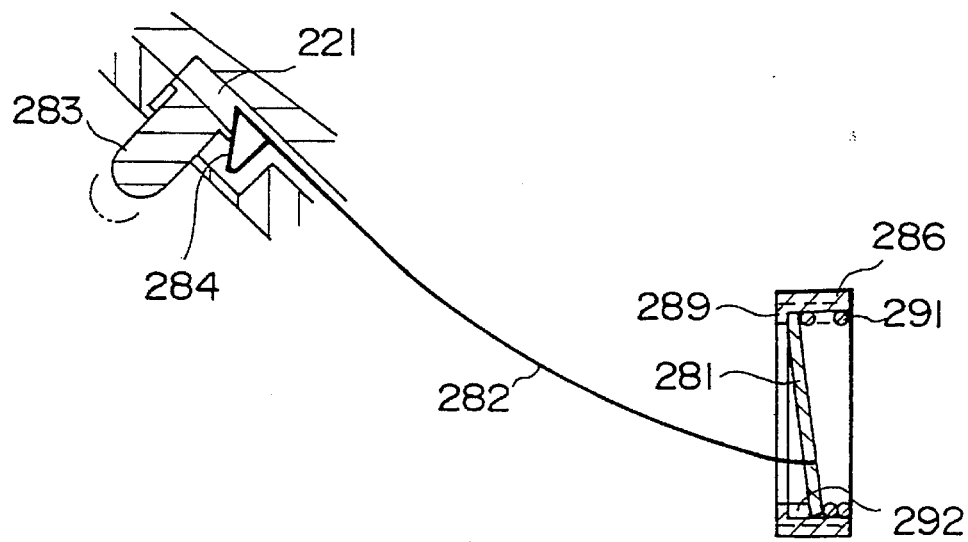
FIG. 76 is a sectional view of a major part of the faucet to illustrate the annulment of restriction of turning thereof.
Figure 77:
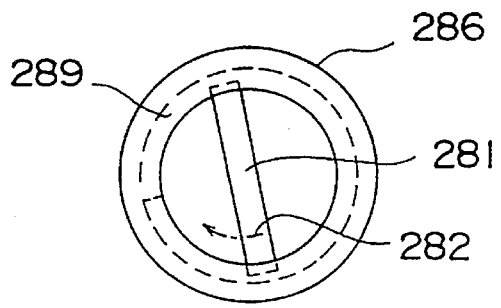
FIG. 77 is a plan view of the stopper ring of the faucet.

Shown at 295 in FIG. 75 is a flow rate recognition means made of a projection and grooves or dimples to give the user of the faucet a feeling of clicking to enable him to recognize whether the flow rate of the discharged warm water is being regulated to be high, middle or low, by vertically swinging the handle 213 with the lever 213a thereof. Since the projection is disengaged out of one of the grooves or dimples and engaged in another of them along with the vertical swinging of the handle 213, the feeling of clicking is given to him.

Figure 80:
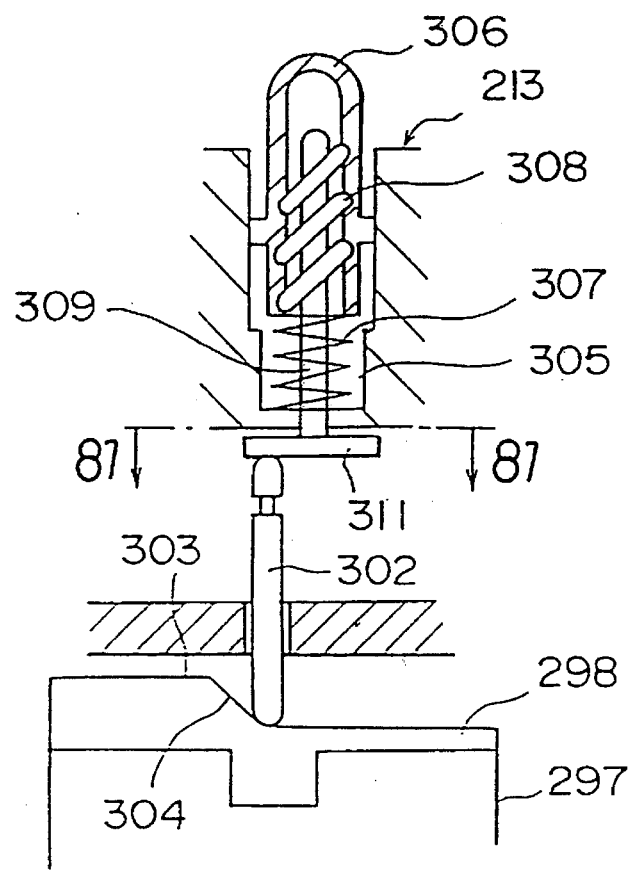
FIG. 80 is an enlarged sectional view of a major part of the faucet to illustrate the turning restriction state thereof.

FIGS. 79, 80, 81, 82 and 83 show a hot and cold water mixing faucet which is yet another embodiment of the present invention and in which manipulating a button puts a stopper pin directly out of such a position as to be engaged with a stopper portion, whereas the stopper pin is indirectly put out of such a position through the action of the wire or the thin plate by manipulating the button in each of the preceding faucets. In this embodiment, a case hold-down member 298 is provided on a case 297 housing valve members and so forth, and a rotary disk 301 is provided over the hold-down member so that the disk is rotated in conjunction with the rotation of an operation lever 299 due to the turning of a handle 213. A stopper pin 302 vertically extends through the disk 301 so that the pin can be slid up and down therein, and is in contact with the peripheral part of the top of the case hold-down member 298 at the lower end of the pin and revolved along the portion due to the turning of the handle 213. The peripheral part of the top of the case hold-down member 298 has a stopper portion 303. The stopper portion 303 is in such a position that the stopper pin 302 comes into contact with the portion when the handle 213 is turned to a prescribed angle in such a direction as to heighten the temperature of a discharged warm water. As shown in FIG. 80, the top of the stopper portion 303 adjoins the upper end of a slope 304 extending down from the top to that of the other portion of the peripheral part, on which the stopper pin 302 is revolved as the handle 213 is turned to the prescribed angle in the direction to heighten the temperature of the discharged warm water.

The body 213a of the handle 213 covers the open top of the body of the faucet, and has a button fitting hole 305 in which a cylindrical push button 306 open at the bottom thereof is fitted so that the button is unrotatable relative to the handle body, and is urged upward by a spring 307, to be movable into and out of the hole. The inner circumferential surface of the button 306 has an acme thread for engaging a rod 309 with the button that a semicircular stopper plate 311 attached to the lower end of the rod faces the upper end of the stopper pin 302 across a small gap.

Figure 81:
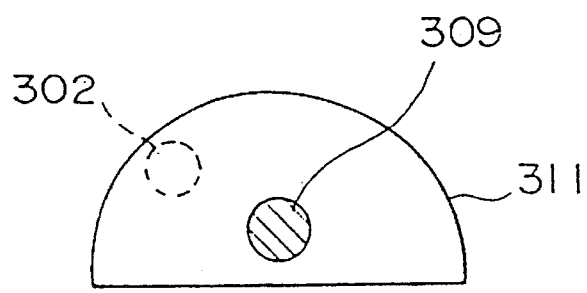
FIG. 81 is a sectional view of the part along lines B shown in FIG. 80.
Figure 82:
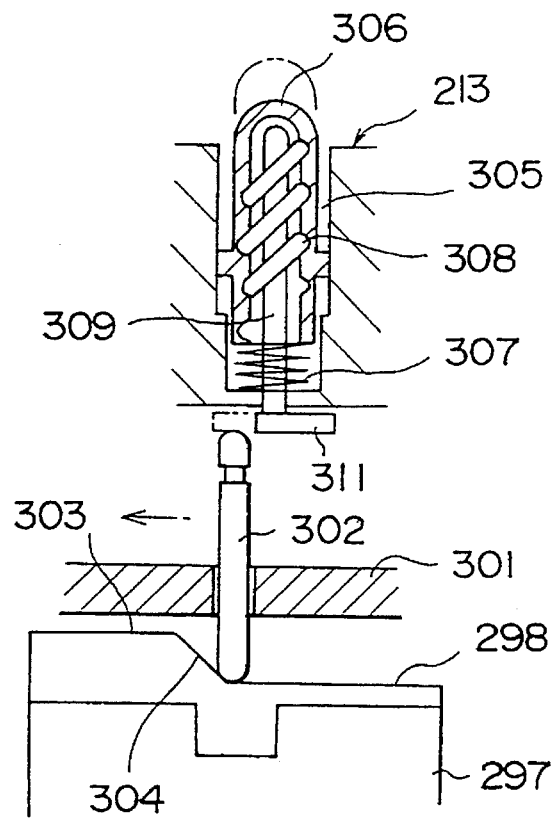
FIG. 82 is an enlarged sectional view of the part to illustrate the turning non-restriction state of the faucet.
Figure 83:
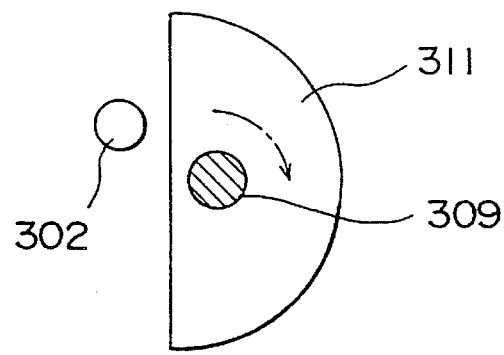
FIG. 83 is a sectional view of the part along the lines B to illustrate the positional relationship between the locking plate and stopper pin of the faucet in the turning non-restriction state.
Figure 84:
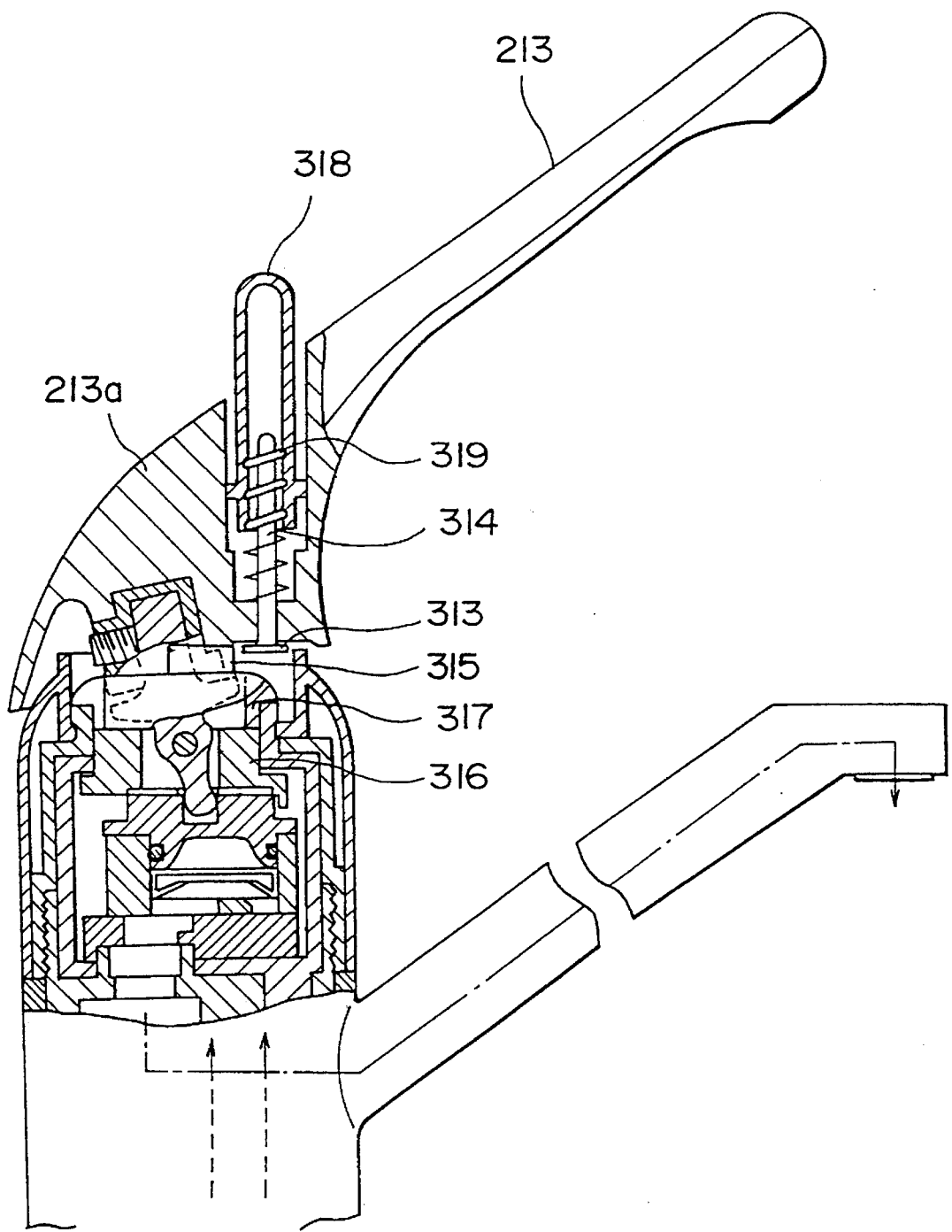
FIG. 84 is a cutaway side view of a hot and cold water mixing faucet which is a modification of that shown in FIG. 79.

When the handle 213 is turned to the prescribed angle in the direction to heighten the temperature of the discharged warm water as the button 306 remains not pressed in, the stopper pin 302 is revolved on the peripheral part of the top of the case hold-down member 298, and acts to ascend the slope 304 of the stopper portion 303 but cannot do it because the upper end of the pin is held down by the stopper plate 311, as shown in FIGS. 80 and 81. For that reason, the handle 213 cannot be turned further beyond the prescribed angle to more heighten the temperature of the discharged warm water. The danger of unexpectedly causing a warm water of high temperature to be discharged from the faucet can thus be avoided. If the button 306 is then pressed in, the rod 309 and the stopper plate 311 are rotated through the action of the acme thread of the button, so that the plate goes away from the upper end of the stopper pin 302, as shown in FIGS. 82 and 83. As a result, the stopper pin 302 is allowed to ascend the slope 304 so that the handle 213 can be turned further beyond the prescribed angle to more heighten the temperature of the discharged warm water.

Figure 85:
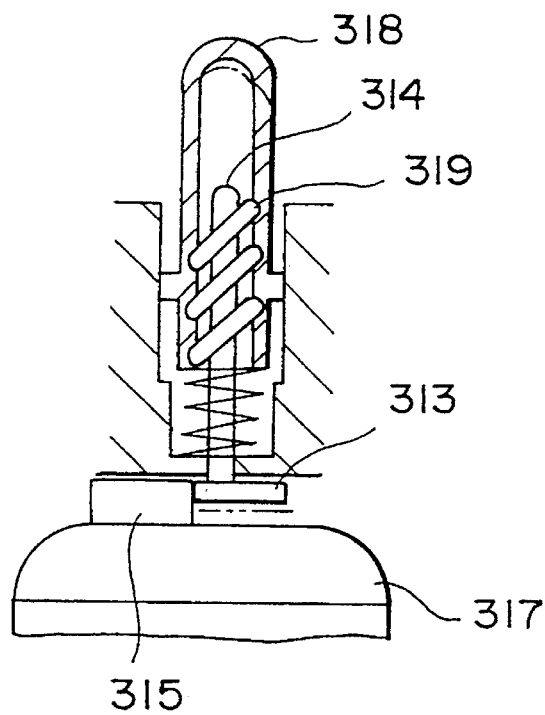
FIG. 85 is an enlarged sectional view of a major part of the faucet to illustrate the turning restriction state thereof.
Figure 86:
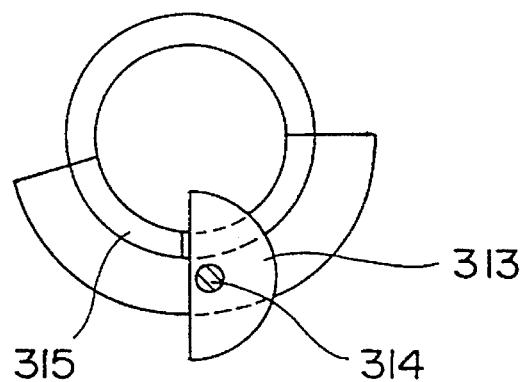
FIG. 86 is a sectional view of the part to illustrate the positional relationship between the locking plate and stopper ring of the faucet in the turning restriction state.
Figure 87:
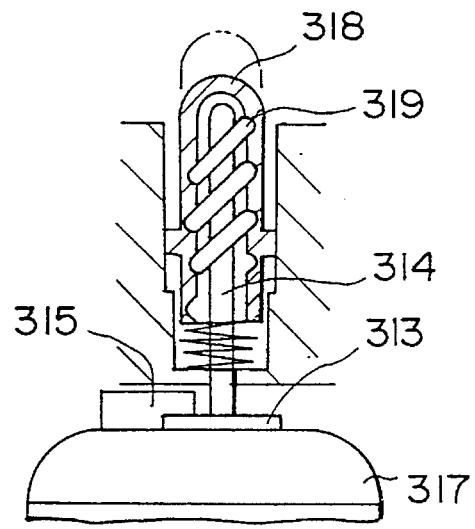
FIG. 87 is an enlarged sectional view of the part to illustrate the turning non-restriction state of the faucet.
Figure 88:
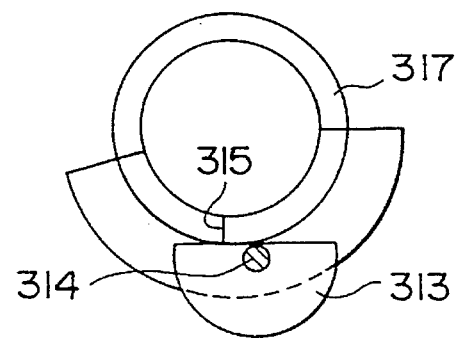
FIG. 88 is a sectional view of the part to illustrate the positional relationship between the locking disk and the stopper ring in the turning nonrestriction state.
Figure 89:
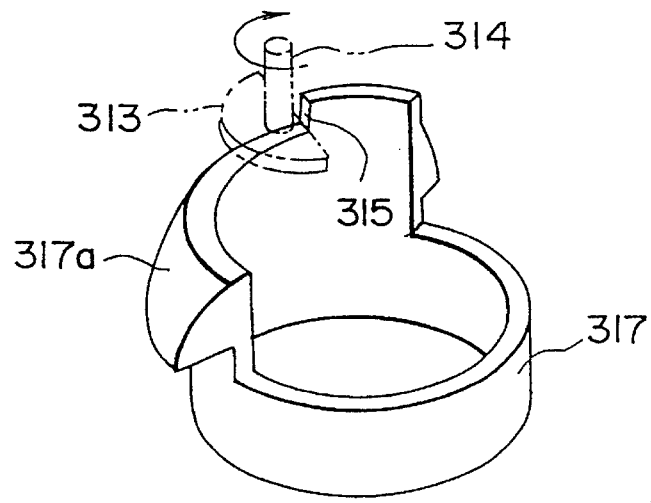
FIG. 89 is a perspective view of the stopper ring.

FIGS. 84, 85, 86, 87, 88 and 89 show a hot and cold water mixing faucet which is a modification of the preceding embodiment and in which a remote manipulation means is not provided as in the embodiment but a restriction eliminating manipulation means is provided near a stopper portion similarly to the embodiment. In the modification, a semicircular stopper plate 313 is attached to the lower end of a rod 314 so that the straight edge of the plate extends across the locus of the rod, which is generated as a handle 213 is turned. A stopper ring 317 is provided over a valve guide 315, and has the stopper portion 315 located inside the locus of the movement of the rod 314 and projecting from the top of the body of the ring so that if a push button 318 remains not pressed in, the stopper plate 303 comes into contact with the stopper portion, as shown in FIGS. 85 and 86, when the handle 213 is turned to a prescribed angle in such a direction as to heighten the temperature of a discharged warm water. For that reason, if the button 318 remains not pressed in, the contact of the stopper plate 313 with the stopper portion 315 prevents the turning of the handle 213 beyond the prescribed angle in the direction so as to make it impossible to more heighten the temperature of the discharged warm water. However, if the button 318 is then pressed in, the stopper plate 313 and the rod 314 are rotated through the action of the acme thread of the acme screw of the button so that the straight edge of the stopper plate is located outside the stopper portion 315, as shown in FIGS. 87 and 88, to enable the stopper plate to avoid coming into contact with the stopper portion. As a result, the handle 213 can be turned further beyond the prescribed angle in the direction to more heighten the temperature of the discharged warm water. The length of the rod 314 may be increased so that pressing in the button 318 results in not only rotating the stopper plate 313 but also moving the plate down the arc-shaped slope of the stopper ring 317 to more surely enable the plate to avoid coming into contact with the stopper portion 315.

Figure 90:
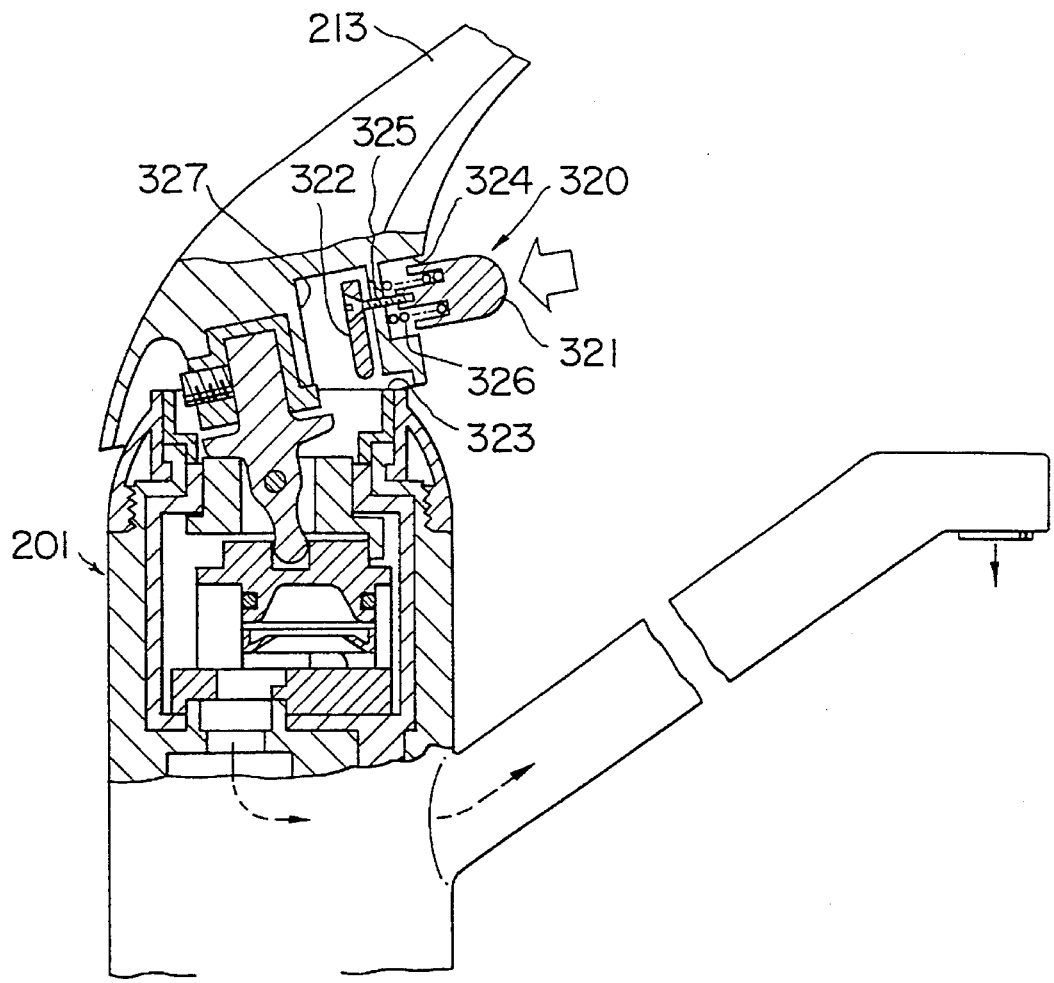
FIG. 90 is a cutaway side view of a hot and cold water mixing faucet which is another modification of that shown in FIG. 79.
Figure 91:
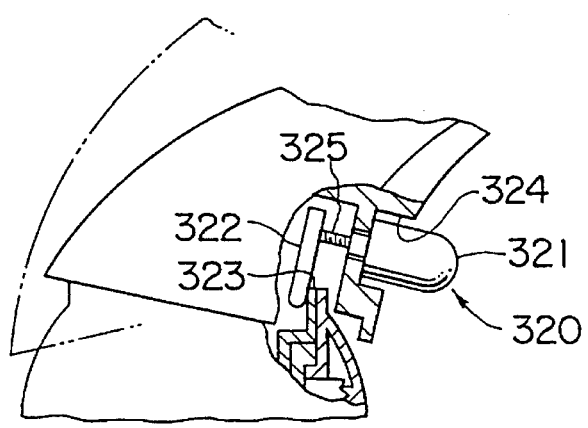
FIG. 91 is a cutaway view of a major part of the faucet.

FIGS. 90 and 91 show a hot and cold water mixing faucet which is another modification of the preceding embodiment and has a stopper mechanism 320 including a push button 321 provided in the front portion of the body of a handle 213, a stopper plate 322 attached to the button, and a stopper surface 323 provided on the body 201 of the faucet to stop the movement of the plate. The push button 321 is fitted in the fitting hole 324 of the front portion of the body of the handle 213. The stopper plate 322 is attached with a screw 325 to the front portion. A spring 326 is resiliently engaged between the bottom of the fitting hole 324 and the butt of the push button 321 so that the button can be moved in and out at a prescribed stroke. The stopper plate 322 is coupled to the button 321, and projects down into an operation space 327 in the body of the handle 213, so that the plate can be moved to an inner and an outer positions in the space as the button 321 is pressed in and let out, respectively. The stopper surface 323 is located at the edge of the open top of the faucet body 201 so that when the handle 213 is swung down to a prescribed position to increase the flow rate of a discharged warm water, the lower portion of the stopper plate 322 located in the outer position because of the letting-out of the push button 321 comes into contact with the stopper surface to prevent the handle from being swung down further beyond the prescribed position to more increase the flow rate of the discharged warm water. If the button 321 is then pressed in, the stopper plate 322 is moved into the inner position so as to be allowed to avoid coming into contact with the stopper surface 323. As a result, the handle 213 can be swung down further beyond the prescribed position, as shown in FIG. 91, to more increase the flow rate of the discharged warm water. If the manipulating hand of the user of the faucet is thereafter put off the button 321, the button is moved out to the original position thereof by the urging force of the spring 326 at the time of the swinging-up of the handle 213 so as to prevent it again from being swung down beyond the prescribed position to more increase the flow rate of the discharged warm water.

Figure 92:
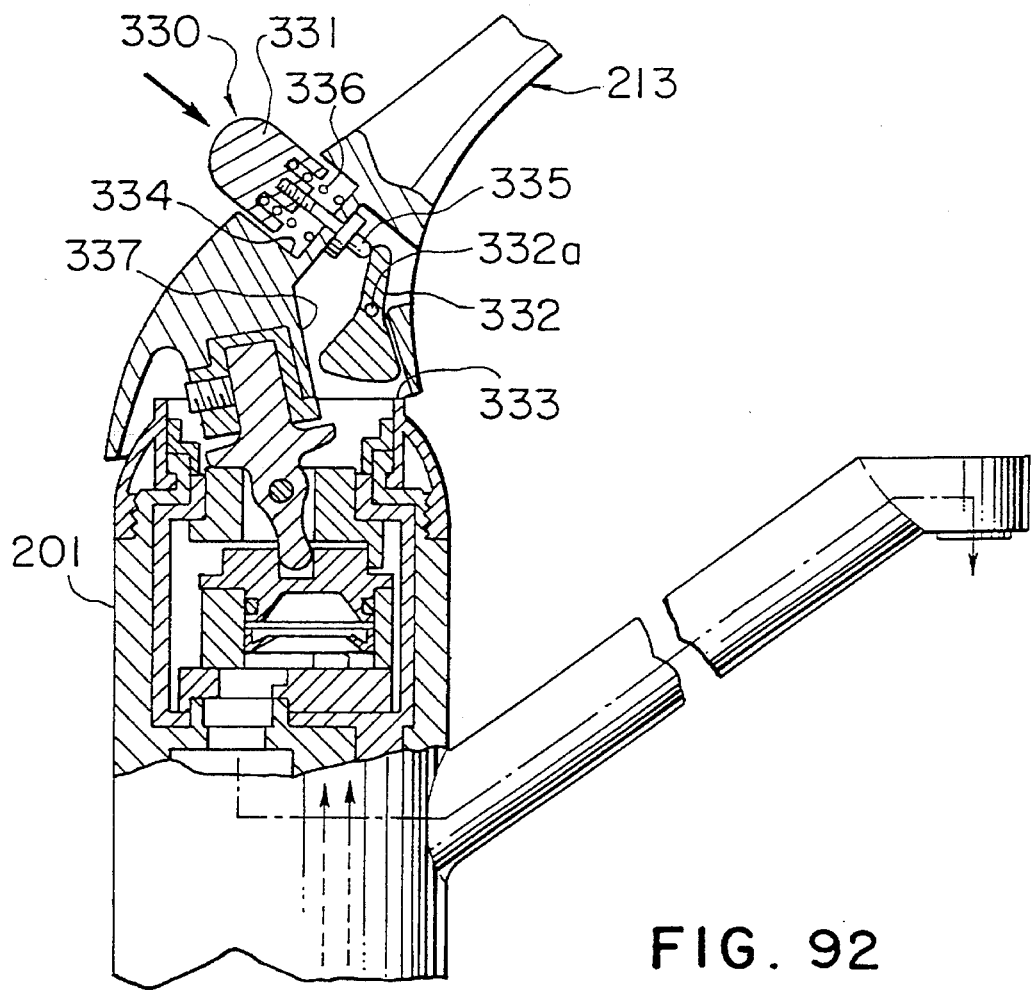
FIG. 92 is a cutaway side view of a hot and cold water mixing faucet which is yet another modification of that shown in FIG. 79.
Figure 93:
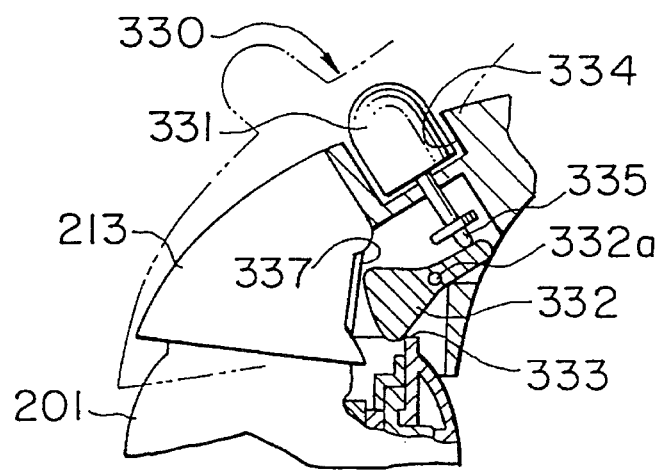
FIG. 93 is a cutaway view of a major part of the faucet to illustrate the non-restriction thereof.

FIGS. 92 and 93 show a hot and cold water mixing faucet which is yet another modification of the preceding embodiment and has a stopper mechanism 330 including a push button 331 provided in the upper portion of the body of a handle 213, a stopper member 332 which is swung when being pushed by the button, and a stopper surface 333 provided on the body 210 of the faucet. The push button 331 is fitted in the fitting hole 334 of the upper portion of the body of the handle 213. A push rod 335 is attached to the butt of the button 331. A spring 336 is resiliently engaged between the bottom of the hole 334 and the butt of the button 334 so that the button can be moved in and out at a prescribed stroke. The stopper member 332 is supported with a shaft 332a in an operation space 337 in the body of the handle 213 so that the stopper member can be swung as the push button 331 is pressed in. The lower half of the stopper member 332 is shaped as a fan, and the upper half thereof is shaped as a stick and butted to the tip of the push rod 335 in the operation space 337, so that when the button is pressed in, the upper half is pushed by the rod to swing the lower half inward about the shaft. The stopper surface 333 is provided at the edge of the open top of the faucet body 210 so that when the handle 213 is swung down to a prescribed position to increase the flow rate of a discharged warm water, the stopper member's lower half located in an outer position because of the letting-out of the button 331 comes into contact with the stopper surface to prevent the handle from being swung down further beyond the prescribed position to more increase the flow rate of the discharged warm water. If the button 331 is then pressed in, the lower half of the stopper member 332 is swung to an inner position so as to enable the handle 213 to be swung down further beyond the prescribed position, as shown in FIG. 93, to more increase the flow rate of the discharged warm water. When the manipulating hand of the user of the faucet is thereafter put off the push button 331 pressed in, the button is immediately moved out to the original position thereof by the urging force of the spring 336. When the handle 213 is thereafter swung up, the lower half of the stopper member 332 is moved back to the outer position due to the weight of the members so as to prevent the handle again from being swung down beyond the prescribed position.

FIGS. 94, 95, 96, 97, 98 and 99 show a hot and cold water mixing faucet which is yet another modification of the embodiment shown in FIG. 58. The faucet has a safety button 340 including a push button body 341 fitted in a button fitting hole 221 provided in the lever 213a of a handle 213 at the lower side thereof and communicating with the internal hole 218 of the lever, and a slider 342 provided in the button fitting hole 221. The button body 341 can be moved in and out, but cannot come off the lever 213a. The button body 341 usually projects down from the lower side of the lever 213a due to the weight of the body. The button body 341 has a slider engagement recess 343 open at the top of the body.

The slider 342 is engaged in the recess 343 and extends into the button fitting hole 221 over the push button body 341 so that the slider can be moved back and forth in the longitudinal direction of the lever 213a. An operation rod 347 extends from the lower side of the slider 342 toward the body 213b of the handle 213, and is coupled to the fixed tube 346 of a locking mechanism 345. The push button body 341 has a guide slope 348 in the slider engagement recess 343, and the slider 342 has a guide slope 348 in sliding contact with the former so that the slider is guided to be slid toward the body 213b of the handle 213 when the button body is pressed in. The upper portion of the button body 341 has an operation rod reception notch 349, which receives the operation rod 347 in the notch.

The locking mechanism 345 includes a guide sleeve 351 fitted in the portion of the lever 213a, at which the internal hole 218 and the button fitting hole 221 communicate with each other, the fixed tube 346 secured to the operation rod 347 inserted in the sleeve, and a rotary cup 353 fitted in the sleeve and facing the fixed tube. A wire 217 is fitted at the upper end thereof in the recess of the bottom of the rotary cup 353, because the wire is pushed by a spring 224. The fixed tube 346 has saw-like teeth 346a at the lower end of the tube, and projections 346b on the outer circumferential surface of the tube near the lower end thereof. The rotary cup 353 has saw-like teeth 353a at the top of the tube, and projections 353b on the outer circumferential surface thereof, so that the teeth can be engaged with those 346a of the tube 346. The inner circumferential surface of the guide sleeve 351 has grooves 351a and tooth-like projections 351b alternately adjacently to each other in the circumferential direction of the sleeve so that the projections 346b of the fixed tube 346 and those 353b of the rotary cup 353 can be engaged in the grooves.

Figure 94B:
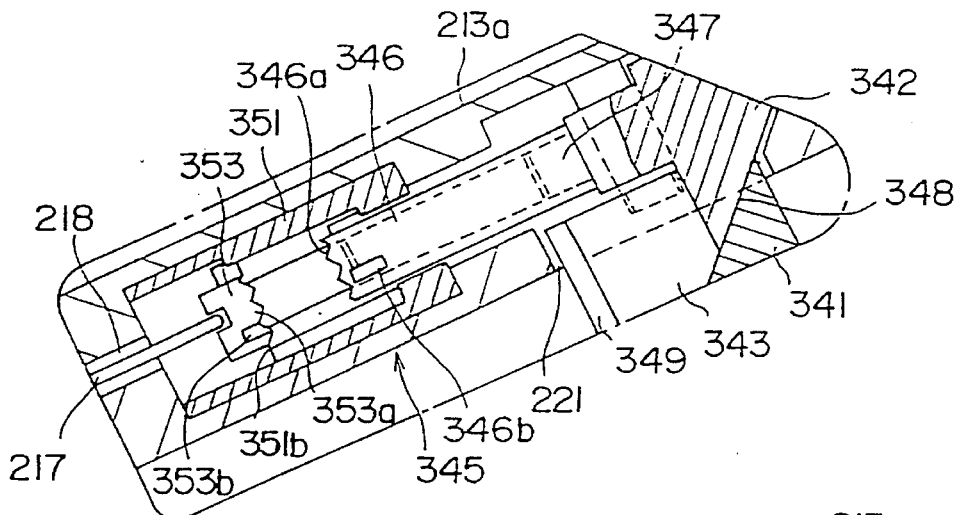
FIG. 94(B) is an enlarged sectional view of a portion Z of the faucet.
Figure 94A:
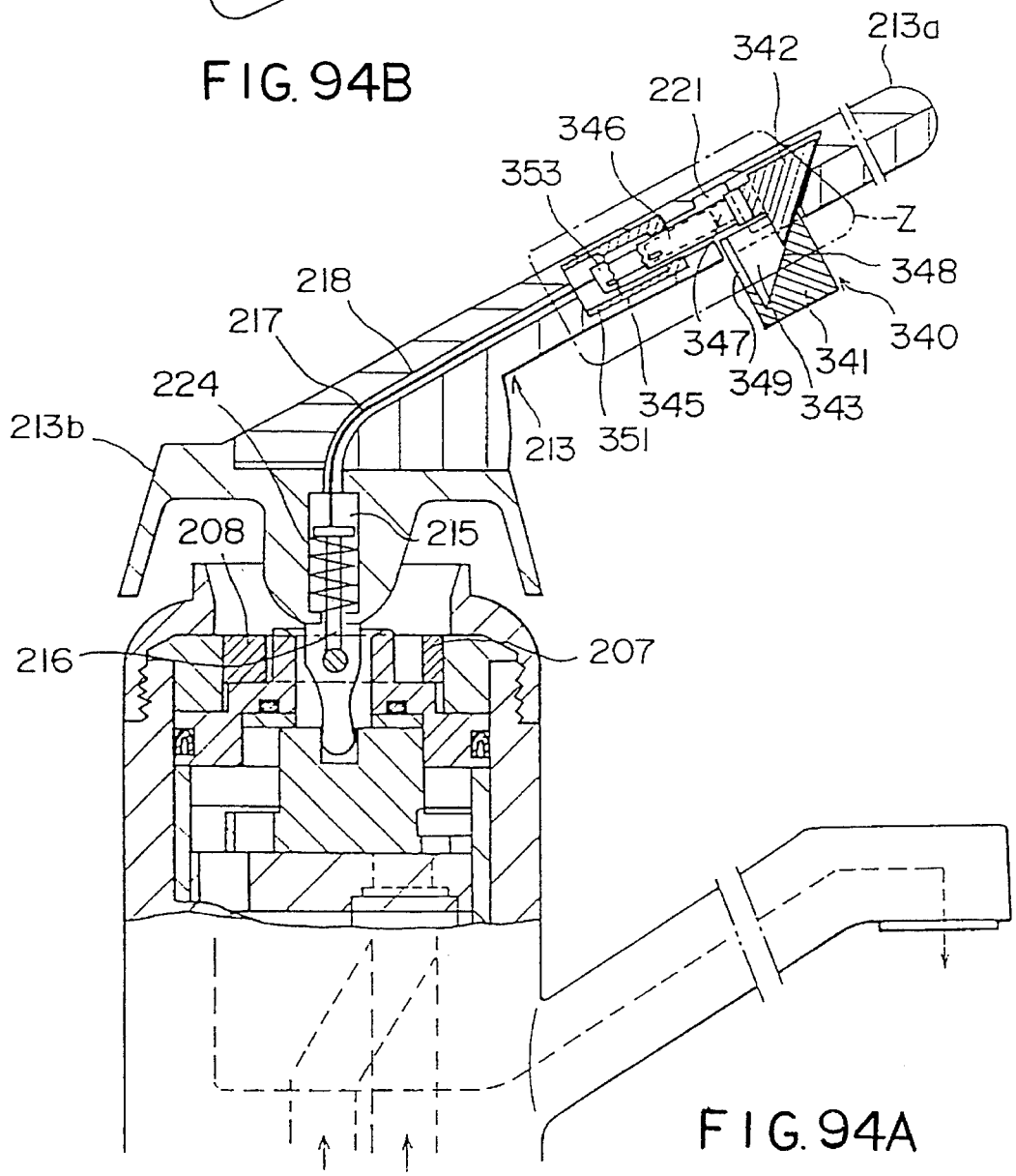
FIG. 94(A) is a cutaway side view of a hot and cold water mixing faucet which is yet another embodiment of that shown in FIG. 58.
Figure 95:
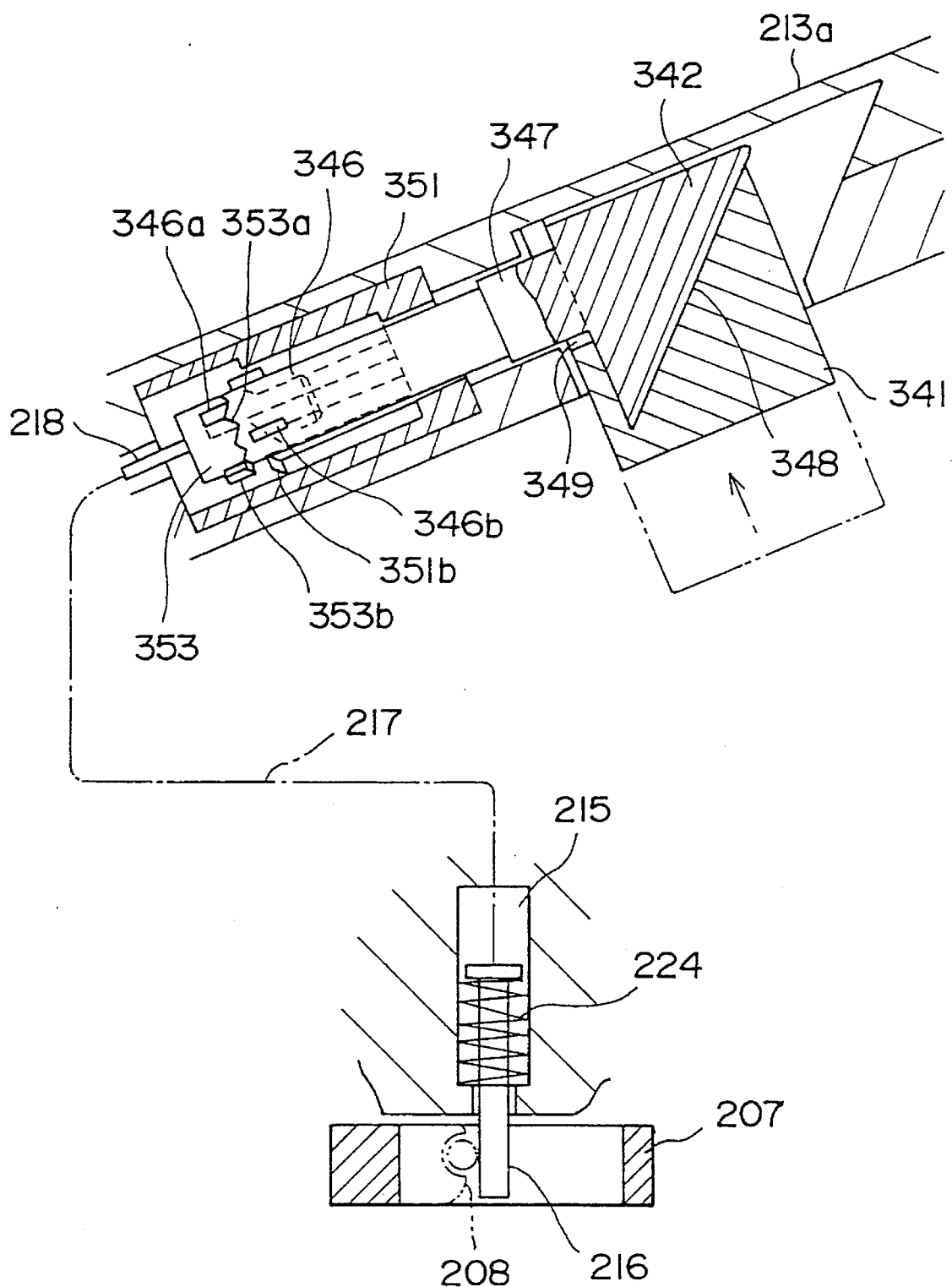
FIG. 95 is an enlarged sectional view of a major part of the faucet to illustrate the annulment of restriction thereof.
Figure 96:
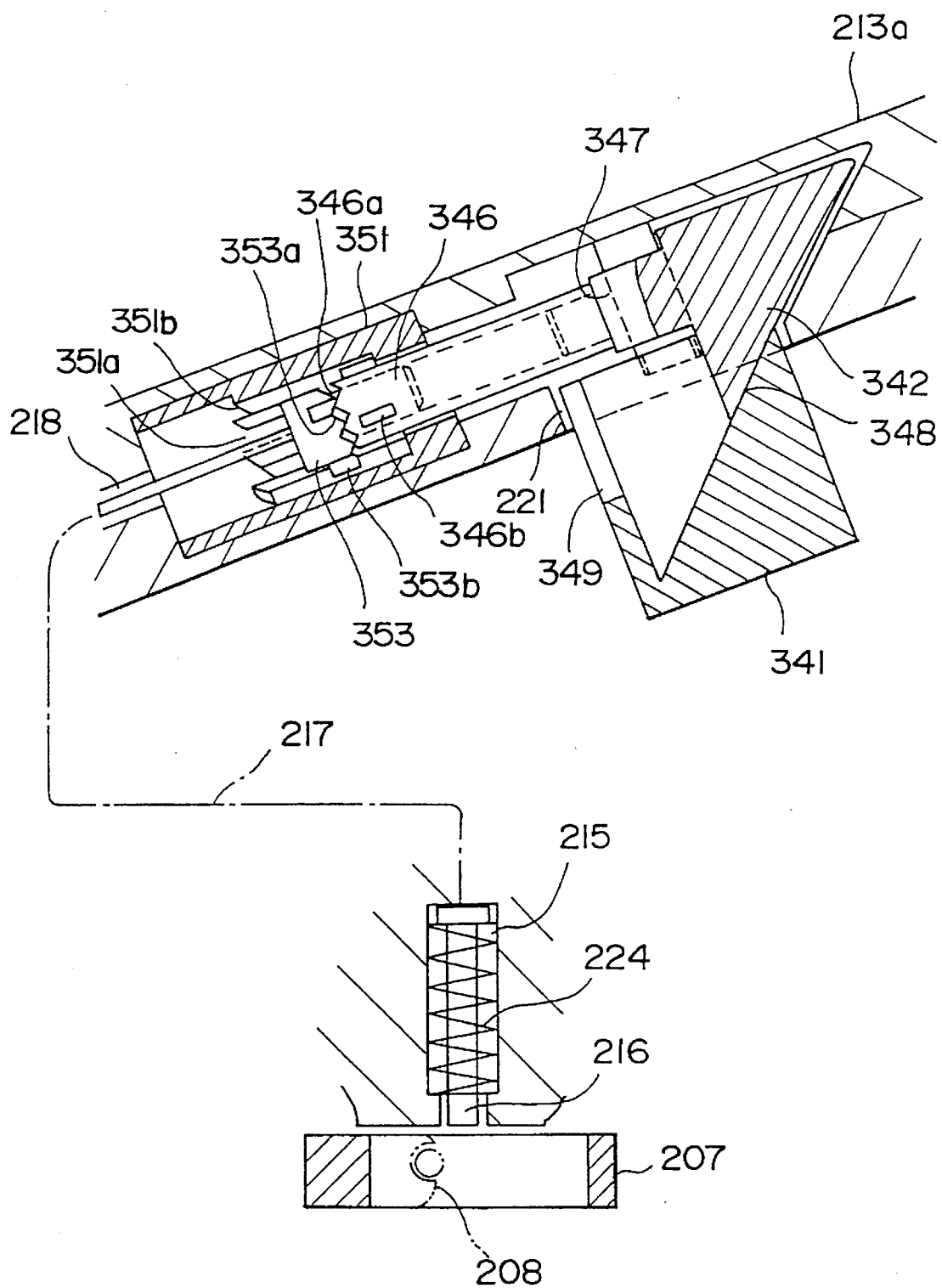
FIG. 96 is an enlarged sectional view of a major part to illustrate the state that the restriction is annulled.
Figure 97:
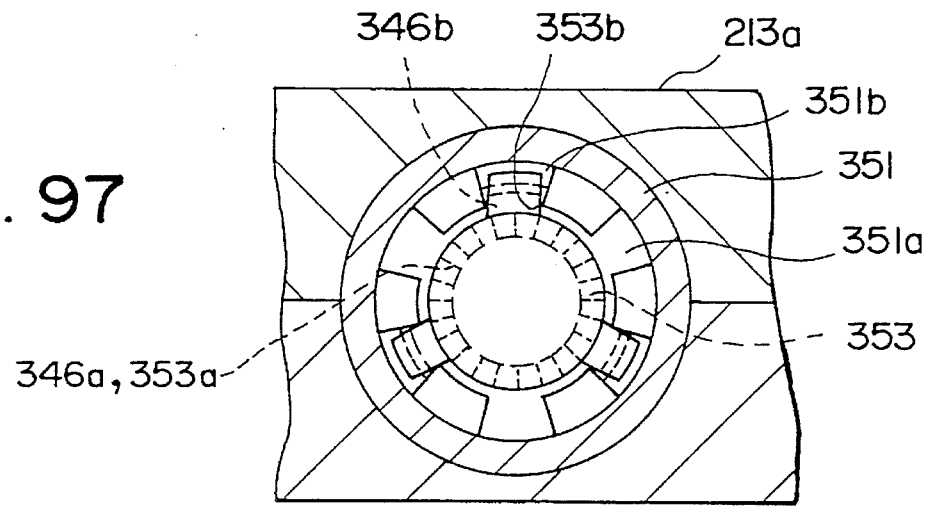
FIGS. 97, 98 and 99 are enlarged sectional views of the part to illustrate the operation of the fixed and rotary rings of the faucet.
Figure 98:
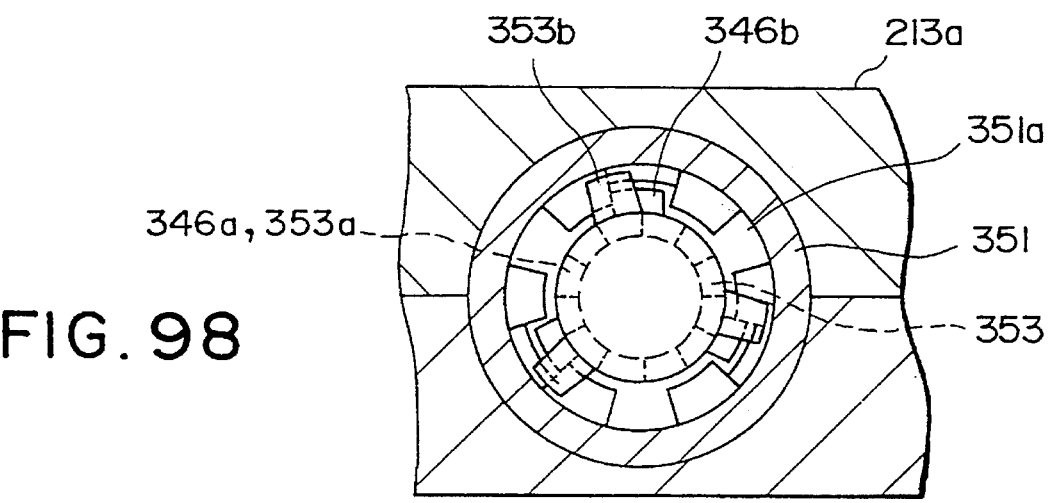
Figure 99:
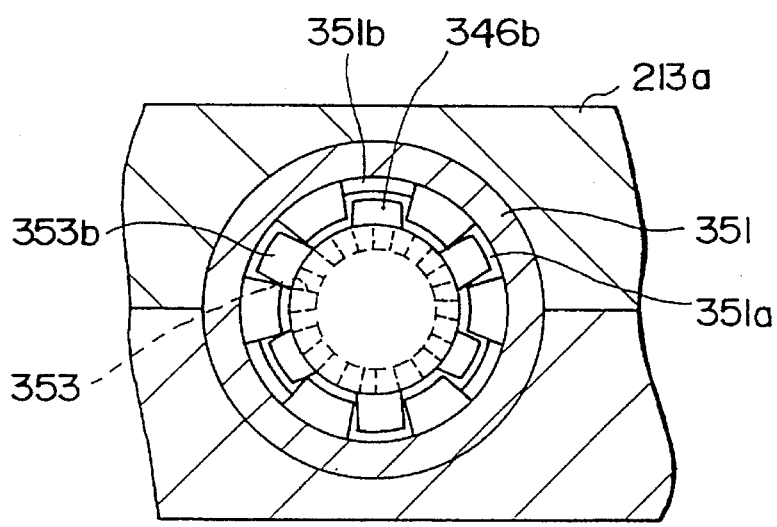

When the push button body 314 is not pressed in, the rotary cup 353 of the locking mechanism 345 is in a backwardly moved position and the projections 353b of the cup are engaged with those 351b of the guide sleeve 351, as shown in FIGS. 94 and 97. At that time, the wire 217 pushes out a stopper pin 216 down from the hole 215 of the body 213b of the handle 213 against the urging force of the spring 224 so that the pin projects into a stopper ring 207 and can come into contact with the stopper portion 208 thereof. When the button body 314 is then pressed in, the guide surfaces 348 of the body and the slider 342 slide on each other so that the slider is moved backward, as shown in FIGS. 95 and 98. As a result, the fixed tube 346 is moved backward with the operation rod 347 so that the tube pushes the rotary cup 353 to disengage the projections 353b thereof from those 351b of the guide sleeve and engage the saw-like teeth 346a of the tube with those 353a of the cup to slightly turn it and cause the projections of the cup to correspond to the grooves 351a of the sleeve. When the manipulating hand of the user of the faucet is thereafter put off the button body 341 to let it out, the projections 353b of the rotary cup 353 are engaged in the grooves 351a of the guide sleeve 351 and the cup is moved forward by the urging force of the spring 224 through the action of the wire 217 while being guided by the grooves, as shown in FIGS. 96 and 99. For that reason, the stopper pin 216 is moved up out of the stopper ring 207 by the urging force of the spring 224 so that the pin is kept from coming into contact with the stopper portion 208 of the ring. When the push button body 341 is thereafter pressed in again, the slider 342 is moved backward so that the fixed tube 346 is moved backward to push the rotary cup 353 to disengage the projections 353b thereof out of the grooves 351a of the guide sleeve 351. At that time, the saw-like teeth 346a of the tube 346 are engaged with those 353a of the cup 353 to slightly turn it to cause the projections 353b of the cup to correspond to those 351b of the sleeve

351. As a result, if pressing the button body 341 in is then ceased to let it out, it is performed again that the projections 353b of the rotary cup 353 are engaged with those 351b of the sleeve 351 to keep the cup in the backwardly moved position thereof and the stopper pin 216 is pushed out from the hole 215 by the wire 217 against the urging force of the spring 224 and kept protruded from the hole, as shown in FIGS. 94 and 97.

Thus, the locking mechanism 345 operates that the stopper pin 216 is locked in a restrictive position or a non-restrictive position every time the push button body 341 is pressed in. In other words, if the stopper pin 216 is locked in the restrictive position down in the stopper ring 207 by pressing the button body 341 in, the stopper pin comes into contact with the stopper portion 208 of the stopper ring when the handle 213 is horizontally turned clockwise to a prescribed position to heighten the temperature of a discharged warm water. As a result, the handle 213 is prevented from being turned clockwise further beyond the prescribed position to more heighten the temperature of the discharged warm water. For that reason, the temperature is not made higher than a prescribed level. If the button body 341 is thereafter pressed in again, the stopper pin 216 is pulled up to the non-restrictive position and locked therein. As a result, the stopper pin 216 does not come into contact with the stopper portion 208. For that reason, the handle 213 can be turned clockwise further beyond the prescribed position to more heighten the temperature of the discharged warm water. This state is maintained until the button body 341 is pressed in again.

In each of the faucets described above, a stopper means is provided so that as long as the safety button is not pressed in, the handle is prevented from being turned beyond the prescribed position to more heighten the temperature of the discharged warm water. For that reason, the warm water of temperature higher than the prescribed level can be kept from being discharged from the faucet by mistake or accident such as the playing of a little child. Therefore, the faucet is high in safety. If the button is pressed in, the handle can be turned beyond the prescribed position to more heighten the temperature of the discharged warm water. Therefore, the manipulating property of the faucet having the single manipulation lever is good. Since the locking mechanism is provided for the safety button so that the stopper pin can be locked in the non-restrictive position by pressing the button in once, the warm water of temperature higher than the prescribed level can be discharged from the faucet a large number of times during a short period without pressing the button in at each of the times. In that respect as well, the manipulating property of the faucet is good.

FIGS. 100, 101, 102, 103 and 104 show a hot and cold water mixing faucet assembly which is yet another embodiment of the present invention. The assembly is capable of supplying either of a warm water of preset appropriate temperature, a hot water and a cold water, and automatically keeping the preset temperature, to solve the problems of the conventional thermostatic mixing valve unit in which the temperature of each of a cold water, a warm water and a hot water is preset and regulated by a single control valve, and an open/close valve provided downstream of the former is opened to discharge the water of the temperature preset and regulated by the control valve. The problems are mentioned from now on.

(1) Since the temperature of each of the waters to be discharged is preset by the single control valve, there is a danger of discharging the hot water from the valve unit by the mistaken manipulation thereof. As there is such a conventional valve unit in which the temperature of discharged water cannot be preset above a prescribed level without manipulating a safety button provided in the temperature control handle of the faucet, a hot water is unexpectedly discharged therefrom if an open/close valve is opened without knowing that the temperature is preset to be high for the hot water. Therefore, it is necessary for safety before opening the open/close valve to confirm how high the temperature is preset to be, but this is troublesome, especially for old people who tend to be careless. Therefore, some consideration is required for these conventional valve units.

(2) Since the temperature is preset and regulated by the single control valve, there is a response lag in replacing cold or hot water with water of appropriate temperature. In other words, it takes some time to stabilize the temperature of the discharged water replacing the other. The response lag can result in making the discharged water higher or lower than the appropriate temperature, and be therefore danger.

(3) Since the temperature of the water is regulated by the control valve and the open/close valve is thereafter opened to discharge the water, it takes time and trouble to manipulate the valve unit for the discharge.

(4) Since the single control valve is used to preset and regulate the temperature of each of the cold water, the warm water and the hot water to discharge it, the manipulation of the valve is not only complicated but also the frequency of the use is high to make it difficult to enhance the reliability of the valve.

(5) Not all of the cold water, the warm water of appropriate temperature and the hot water need to be often discharged from the faucet in reality, but it is usually enough to be able to obtain both a warm water of appropriate temperature around 42° C. and the cold or hot water. Therefore, the valve unit of such constitution as to discharge all of the cold water, the warm water of appropriate temperature and the hot water is not always easy to use.

Figure 100:
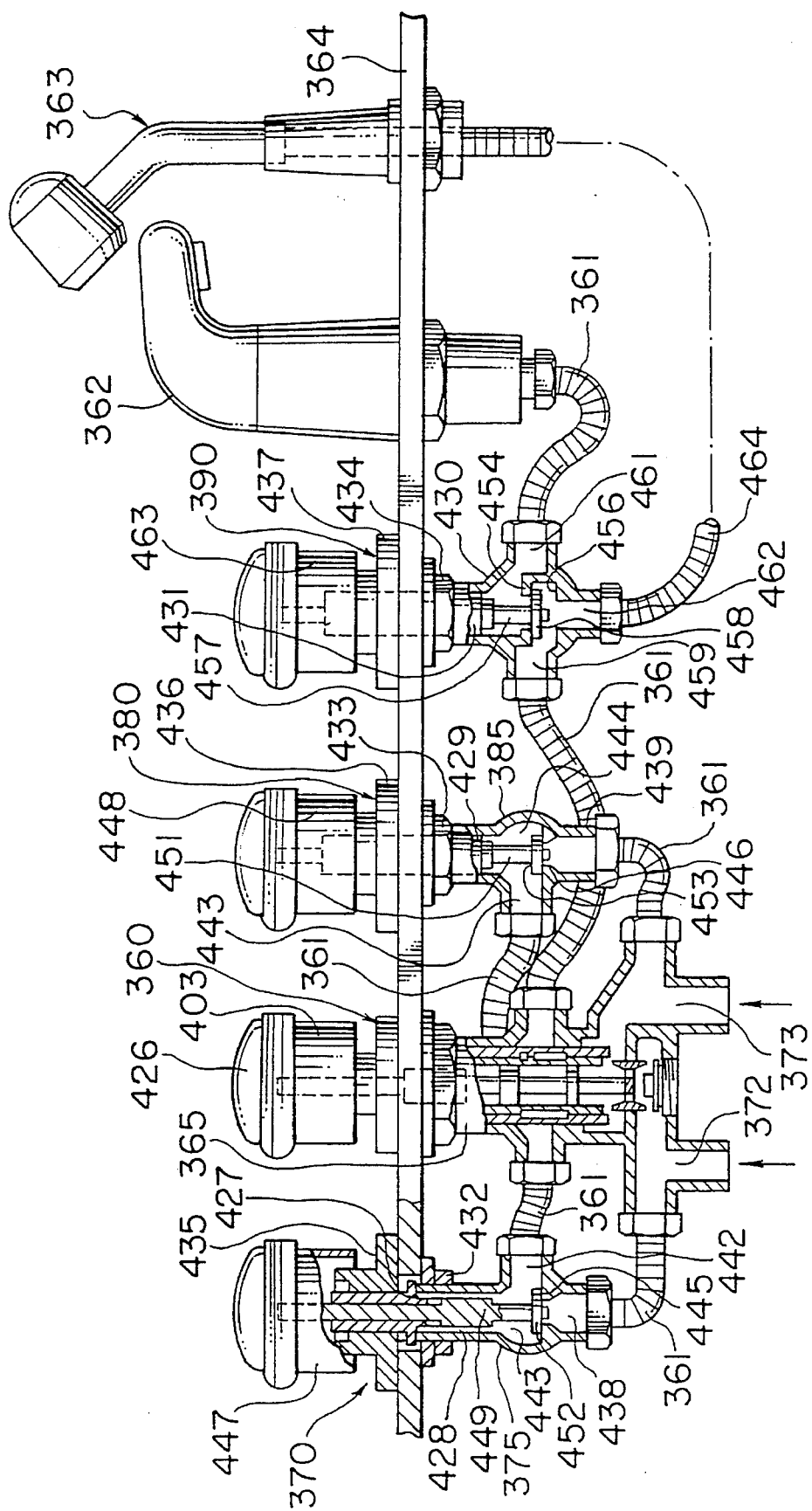
FIG. 100 is a cutaway side view of a hot and cold water mixing faucet assembly which is yet another embodiment of the invention.
Figure 101:
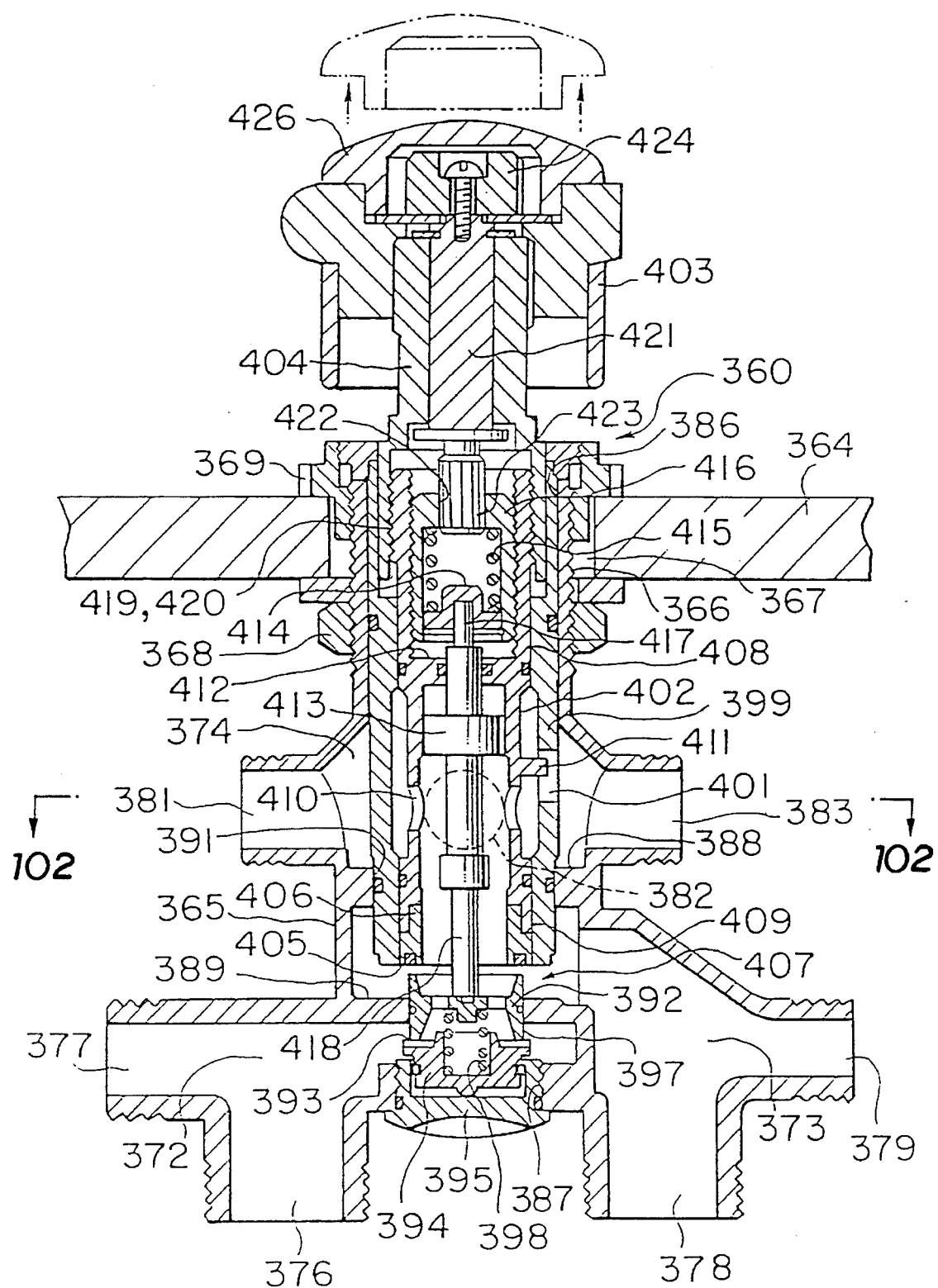
FIG. 101 is a sectional view of the automatic temperature control valve unit of the assembly.

The faucet assembly shown in FIG. 100 includes an automatic temperature control valve unit 360 exclusively for discharging a warm water of appropriate temperature, a valve unit 370 exclusively for discharging a hot water, and a valve unit 380 exclusively for discharging a cold water. The valve units 360, 370 and 380 are mutually independent units connected to each other through communication pipes, hoses or the like 361 so that each of the valve units can be optionally caused to communicate with either of a faucet 362 and a shower spouter 363 through a changeover valve unit 390 to discharge the warm water, the hot water or the cold water from the faucet or the spouter. The valve units 360, 370 and 380 are installed so that their bodies 365, 375 and 385 are fitted in the horizontal surface of a board 364, such as the top of a bathtub.

Figure 102:
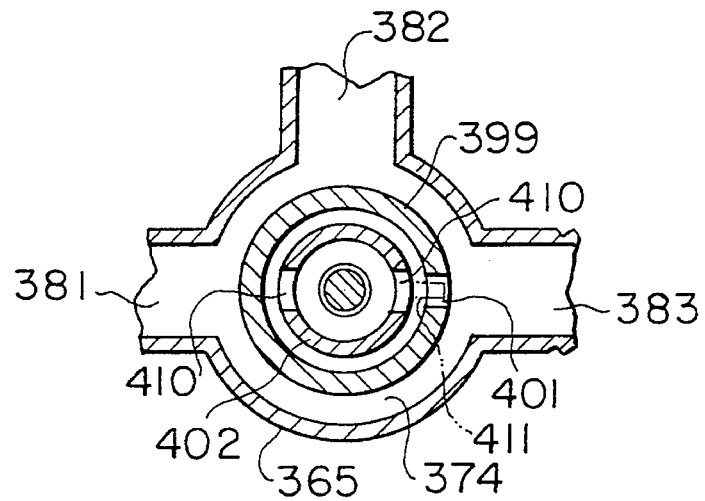
FIG. 102 is a sectional view of the unit along lines C shown in FIG. 101.
Figure 103:
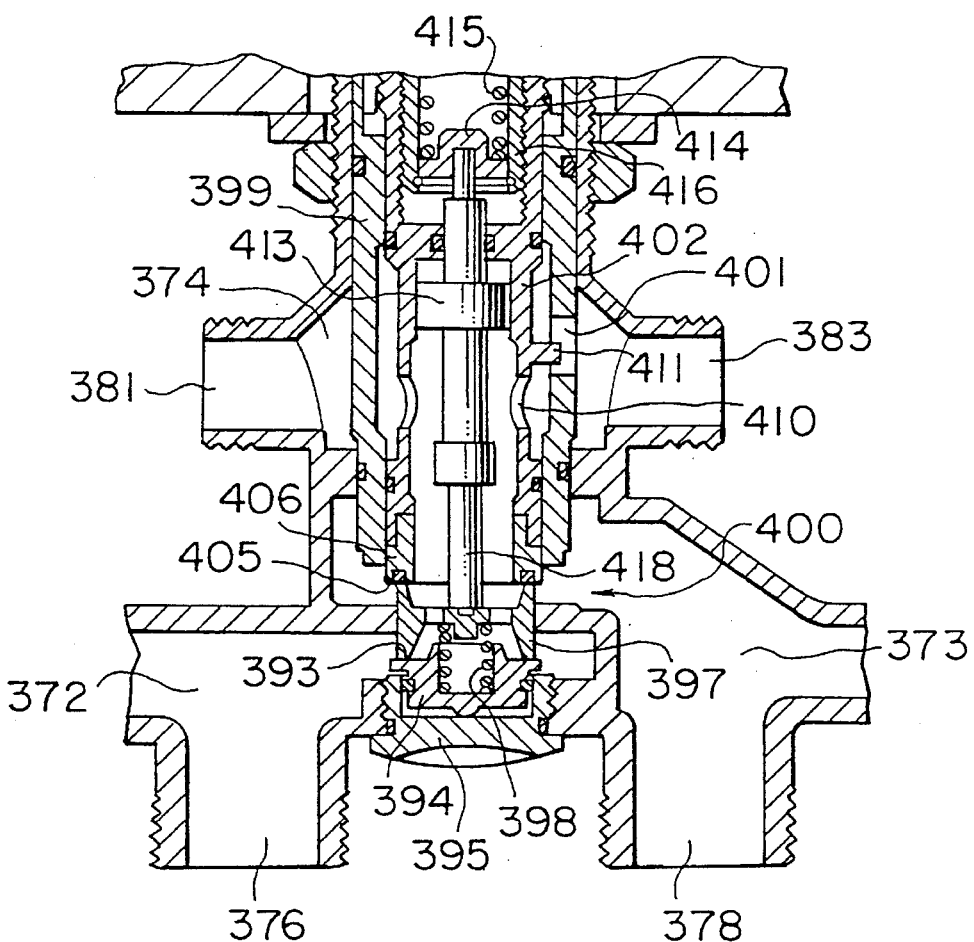
FIG. 103 is a sectional view of a major part of the unit to illustrate the water stoppage state thereof.

At least the upper portion of the body 365 of the automatic temperature control valve unit 360 is cylindrically shaped, and has an appropriate length and a screw thread 366 on the outer circumferential surface of the portion, as shown in FIG. 102. The valve unit body 365 is secured in the fitting hole 367 of the board 364 by a nut 368 and a clamping ring 369. The nut 368 is engaged with the screw thread 366 under the board 364 so that the nut and the ring 369 pinch the board.

The valve unit body 365 is a hollow body, and has an internal opening divided into a hot water chamber 372, a cold water chamber 373 and a hot and cold water mixing chamber 374 adjacently in that order upward. A hot water inflow hole 376, and a hot water outflow hole 377 for the hot water valve unit 370 are opened into the hot water chamber 372. A cold water inflow hole 378, and a cold water outflow hole 379 for the cold water valve unit 380 are opened into the cold water chamber 373. Secondary inflow holes 381 and 382 for the hot and the cold waters from the hot and the cold water valve units 370 and 380, and a water outflow hole 383 for the faucet 362 or the shower spouter 363 are opened into the mixing chamber 374. The hot and the cold water chambers 372 and 373 have portions extending sideward. The hot and the cold water inflow holes 376 and 378 project from the bottoms of the portions, while the hot and the cold water outflow holes 377 and 379 project from the sides of the portions. The hot and the cold water outflow holes 377 and 379 are connected to the hot water inflow hole of the hot water valve unit 370 and the cold water inflow hole of the cold valve unit through the communication pipes, hoses or the like 361, respectively. A hot and a cold water feed pipes not shown in the drawings are connected to the hot and the cold water inflow holes 376 and 378 through check valves, respectively. The hot and the cold water secondary inflow holes 381 and 382 and the water outflow hole 383 are opened on the same horizontal plane into the mixing chamber 374, and project sideward therefrom. The hot and the cold water secondary inflow holes 381 and 382, and the water outflow hole 383 are connected to the hot water outflow hole of the hot water valve unit 370, the cold water outflow hole of the cold water valve unit 380 and the inflow hole of the changeover valve unit 390 through the communication pipes, hoses or the like 361, respectively.

An upper opening 386 extends vertically, and is open at the upper end thereof in the top of the control valve unit body 365 and at the lower end of the opening into the mixing chamber 374. A lower opening 387 is open at the upper end thereof into the hot water chamber 372 and at the lower end of the opening in the bottom of the control valve unit body 365, and concentric to the upper opening 386. A partition 388 dividing the mixing chamber 374 and the cold water chamber 373 from each other, and a partition 389 dividing the cold water chamber and the hot water chamber 372 from each other have openings 391 and 392 concentric to the upper and the lower openings 386 and 387, respectively. The upper opening 386 is smaller in diameter than the portion of the mixing chamber 374 on the horizontal the plane at which the second inflow holes 381 and 382 and the outflow hole 383 project from the chamber. The opening 391 of the partition 388 between the mixing chamber 374 and the cold water chamber 373 is equal in diameter to the upper opening 386. The opening 392 of the partition 389 between the cold water chamber 373 and the hot water chamber 372 is smaller in diameter than the upper opening 386.

A lid 395 is screw-engaged in the lower opening 387 of the valve unit body 365. A hot water valve seat member 394 constituting a hot water valve seat 393 is attached to the inner surface of the lid 395. A liner 399 is inserted into the valve body 365 through the upper opening 386 so as to house functional members. A temperature control valve body 397 shaped cylindrically is fitted in the opening 392 of the partition 389 dividing the hot and the cold water chambers 373 from each other, and can be slid up and down. The bottom of the valve body 397 corresponds to the hot water valve seat 393. The valve body 397 is urged upward by a spring 398 resiliently engaged between the body and the hot valve seat member 394.

The liner 399 is cylindrically shaped, and inserted into the valve unit body 365 through the upper opening 386 so that the liner extends vertically through the mixing chamber 374, and makes it be an annular chamber surrounding the liner and connecting the hot and the cold water secondary inflow holes 381 and 382 to the water outflow hole 383. The liner 399 is also inserted into the cold water chamber 373 through the opening 391 of the partition 388 dividing the mixing chamber 374 and the cold water chamber 373 from each other, and is located in the cold water chamber at the lower end of the liner. The circumferential portion of the liner 399 has a warm water outflow hole 401 which is a vertically slender hole and connects the internal opening of the liner to the annular mixing chamber 374 outside the liner.

A cylindrical member 402 is fitted in the liner 399. A spindle 404 fitted with a handle 403 is screw-engaged with the upper portion of the cylindrical member 402. A cold water valve seat member 406 shaped annularly and constituting a cold water valve seat 405 is fitted in the cylindrical member 402 at the lower end thereof, which is opposed to the upper end of the temperature control valve body 397. A temperature control valve 407 is made of the cold water valve seat 405, the temperature control valve body 397 and the hot water valve seat 393, so that the ratio of the flow rates of the cold and the hot waters flowing from the cold and the hot water chambers 373 and 372 into the mixing chamber 374 is modulated by the valve to regulate the temperature of the warm water generated through the mixing of the cold and the hot waters in the mixing chamber. The cylindrical member 402 is fitted on the inwardly-projecting annular guide part 408 of the inner circumferential surface of the vertically halfway portion of the liner 399 and 409 of the inner circumferential surface of the vertically lower portion thereof so that the member can be moved up and down while being guided by the parts. The circumferential portion of the cylindrical member 402 has warm water passage holes 410 between the upper and the guide parts 408 and 409, and is integrally formed with a rotation preventive pin 411 projecting from the portion into the warm water outflow hole 401 of the liner. The internal opening of the cylindrical member 402 is divided into an upper and a lower openings by a partition 412 over the warm water passage holes 410. A temperature sensor 413 is accommodated in the lower opening. A case 416 housing an element holder 414 and a spring 415 for urging the holder downward is accommodated in the upper opening.

The temperature sensor 413 is of the wax element type in which wax is sealed off in the body of the sensor so as to be thermally expanded to protrude a rod 417 from the body. The body of the sensor 413 is coupled at the lower end thereof to the temperature control valve body 397 by a valve spindle 418, and extends into the upper opening of the cylindrical member 402 at the upper end of the sensor body through the partition 412. The rod 417 is in contact with the element holder 414 in the case 416.

The case 416 is cylindrically shaped, and open at the lower end thereof. The screw thread 419 of the outer circumferential surface of the case 416 is engaged with the screw thread 420 of the inner circumferential surface of the upper portion of the cylindrical member 402. A temperature control shaft 421 is coupled to the upper portion of the case 416, and fitted in the hole 422 of the case 416 at the upper end thereof. The shaft 421 and the case 416 have splines 423 engaged with each other. The shaft 421 is rotatably supported, and extends through the spindle 404. A temperature control knob 424 is secured to the upper end portion of the shaft 421, which projects up from the upper end of the spindle 404. When the knob 424 is turned, the temperature control shaft 421 is rotated to turn the case 416 through the actions of the splines 423 to move the case up or down through the engagement of the screw threads 419 and 420 to shift the position of the element holder 414 up or down. As a result, the temperature control valve body 397 is moved up or down through the action of the valve spindle 418 to alter the distance between the body and the hot valve seat 393 and that between the body and the cold water valve seat 405 to modulate the ratio of the flow rates of the hot and the cold waters which flow into the mixing chamber 374 so as to be mixed together therein to make the warm water.

When the handle 403 is turned, the spindle 404 is rotated so that the cylindrical member 402 screw-engaged with the spindle is moved up or down because the pin 411 of the member is engaged in the warm water outflow hole 401 of the liner 399. If the cylindrical member 402 is moved down at that time, the cold water valve seat member 406 fitted in the cylindrical member at the lower end thereof can be put into contact with the top of the temperature control valve body 397 to close a cold water passage and the bottom of the valve body can be thereafter put into contact with the hot water valve seat member 394 to close a hot water passage. The automatic temperature control valve unit 360 can thus be closed. If the cylindrical member 402 is moved up at the above-mentioned time, the valve member 397 can be moved off the hot water valve seat member 394 by the urging force of the spring 398 and the cold water valve seat member 406 can be thereafter moved off the valve body. The valve unit 360 can thus be opened. The open/close valve 400 of the automatic temperature control valve unit 360 is thus made of the hot and the cold water valve seat members 406 and the temperature control valve body 397.

When the automatic temperature control valve 360 is opened, the hot water enters into the hot water chamber 372 through the hot water inflow hole 376 and then flows into the cylindrical member 402 through between the temperature control valve body 397 and the hot water valve seat 393, and the cold water enters into the cold water chamber 373 through the cold water inflow hole 378 and then flows into the cylindrical member through between the valve body and the cold water valve seat 405, so that the hot and the cold waters are mixed together in the cylindrical member, to make the warm water which flows in contact with the temperature sensor 413 and then passes through the warm water passage holes 410 of the cylindrical member and the warm water outflow hole 401 of the liner 399 so as to be sent out to the changeover valve unit 390 through the mixing chamber 374 and the water outflow hole 383. If the temperature of the warm water is higher than a preset level, the wax in the temperature sensor 413 is thermally expanded to protrude the rod 417 to move the temperature control valve body 397 toward the hot water valve seat 393. If the temperature is lower than the level, the wax is thermally contracted to let the spring 398 to push the valve body 397 to move it toward the cold water valve seat 405. As a result, the temperature is automatically kept at the level.

Since the automatic temperature control valve unit 60 is exclusively for discharging the warm water of the appropriate temperature through the faucet 362 or the shower spouter 363 and the temperature control knob 424 hardly needs to be manipulated if the level is once preset for the temperature by turning the knob, a cap 426 is usually removably fitted on the knob to cover it.

In the hot water valve unit 370, the cold water valve unit 380, and the changeover valve unit 380, cylindrical liners 428, 429 and 431 are screw-engaged in openings 427 provided in the tops of the bodies 375, 385 and 430 of the units, although only the opening 427 of the hot water valve unit is shown in FIG. 100. The upper portions of the liners 428, 429 and 431 extend up from the unit bodies 375, 385 and 430. The liners 428, 429 and 431 are inserted into the fitting holes of the board 364 from the bottom thereof, and secured to the board 364 by nuts 432, 433 and 434 and ornamental metal members 435, 436 and 437 which pinch the board. The nuts are engaged in the outer circumferential surfaces of the unit bodies 375, 385 and 430 around the openings 427 thereof. The metal members 435, 436 and 437 are screw-engaged on the liners 428, 429 and 431.

The hot and the cold water valve units 370 and 380 are the same as each other in constitution and operation, and include a hot and a cold water inflow holes 438 and 439 in the lower portions of the bodies 375 and 385 of the units, a hot and a cold water outflow holes 441 and 442 in the side portions of the bodies, passages 443 and 444 connecting the inflow holes to the outflow holes, and valve seats 445 and 446 formed at the passages concentrically to the openings, respectively. Spindles 449 and 451, to which open/close handles 447 and 448 are coupled at the upper ends of the spindles, are screw-engaged in the liners 428 and 429 so that the spindles can be moved up and down. Open/close valve bodies 452 and 453 are mounted on the spindles 449 and 451 at the lower ends thereof so that the bodies can be put into and out of contact with the valve seats 445 and 446. The open/close valves of the hot and the cold water valve units 370 and 380 are thus made of the valve bodies 452 and 453 and the valve seats 445 and 446. When the handles 447 and 448 are turned, the spindles 449 and 451 are moved up or down so that the valve bodies 452 and 453 can be put into or out of contact with the valve seats 445 and 446, respectively. The open/close valves can thus be closed or opened. When the hot water valve unit 370 is opened, the hot water supplied to the hot water chamber 372 of the automatic temperature control valve unit 360 is introduced into the hot water valve unit and then flows to the mixing chamber 374 of the control valve unit through the hot water valve unit so that the hot water is sent out to the changeover valve unit 390 through the mixing chamber. When the cold water valve unit 380 is opened, the cold water supplied to the cold water chamber 373 of the automatic temperature control valve unit 360 is introduced into the cold water valve unit and then flows to the mixing chamber 374 of the control valve unit through the cold water valve unit so that the cold water is sent out to the changeover valve unit 390 through the mixing chamber. The hot water and/or the cold water can thus be sent to the changeover valve unit 390 by opening the hot water valve unit 370 and/or the cold water valve unit 380.

The body 430 of the changeover valve unit 390 has a valve seat 454 for the faucet 362 and a valve seat 456 for the shower spouter 363 so that the seats are concentric to the internal opening of the body. A spindle 457 is screw-engaged with a liner 431 fitted in the body 430. A changeover valve body 458 is mounted on the spindle 457 at the lower end thereof between the valve seats 454 and 456, so that the top and bottom of the valve body face the valve seats, respectively. The unit body 430 has an inflow hole 459 at the inlet sides of the valve seats 454 and 456, a faucet communication hole 461 at the outlet side of the valve seat 454, and a shower spouter communication hole 462 at the outlet side of the other valve seat 456. When a changeover handle 463 coupled to the upper end of the spindle 457 is turned, the changeover valve body 458 is moved up or down. If the valve body 458 is moved down at that time, it can be put into contact with the valve seat 456 to disconnect the inflow hole 459 from the shower spouter communication hole 462. If the valve body 458 is moved up at the above-mentioned time, it can be put into contact with the other valve seat 454 to disconnect the inflow hole 459 from the faucet communication hole 461. The faucet communication hole 461 communicates with the faucet 362 through an appropriate communication pipe, hose or the like 361. The shower spouter communication hole 462 communicates with the shower spouter 363 through a shower hose 464.

It will be understood from the above description that the handle 403 of the automatic temperature control valve unit 360 can be turned to open it to send out the warm water of the preset appropriate temperature to the faucet 362 or the shower spouter 363 selected by the changeover valve unit 390, and the handle 447 of the hot water valve unit 370 and/or that 448 of the cold water valve unit 380 can be turned to open the former unit and/or the latter unit to send the hot water and/or the cold water to the faucet 362 or the shower spouter 363 selected by the changeover valve unit 390. If a warm water of temperature between that of the hot water and the appropriate temperature preset by the automatic temperature control valve unit 360 is to be sent to the faucet 362 or the shower spouter 363, the unit and the hot water valve unit 370 are opened. If a warm water of temperature between that of the cold water and the preset appropriate temperature is to be sent to the faucet or the shower spouter, the temperature control valve unit 360 and the cold water valve unit 380 are opened.

Figure 104:
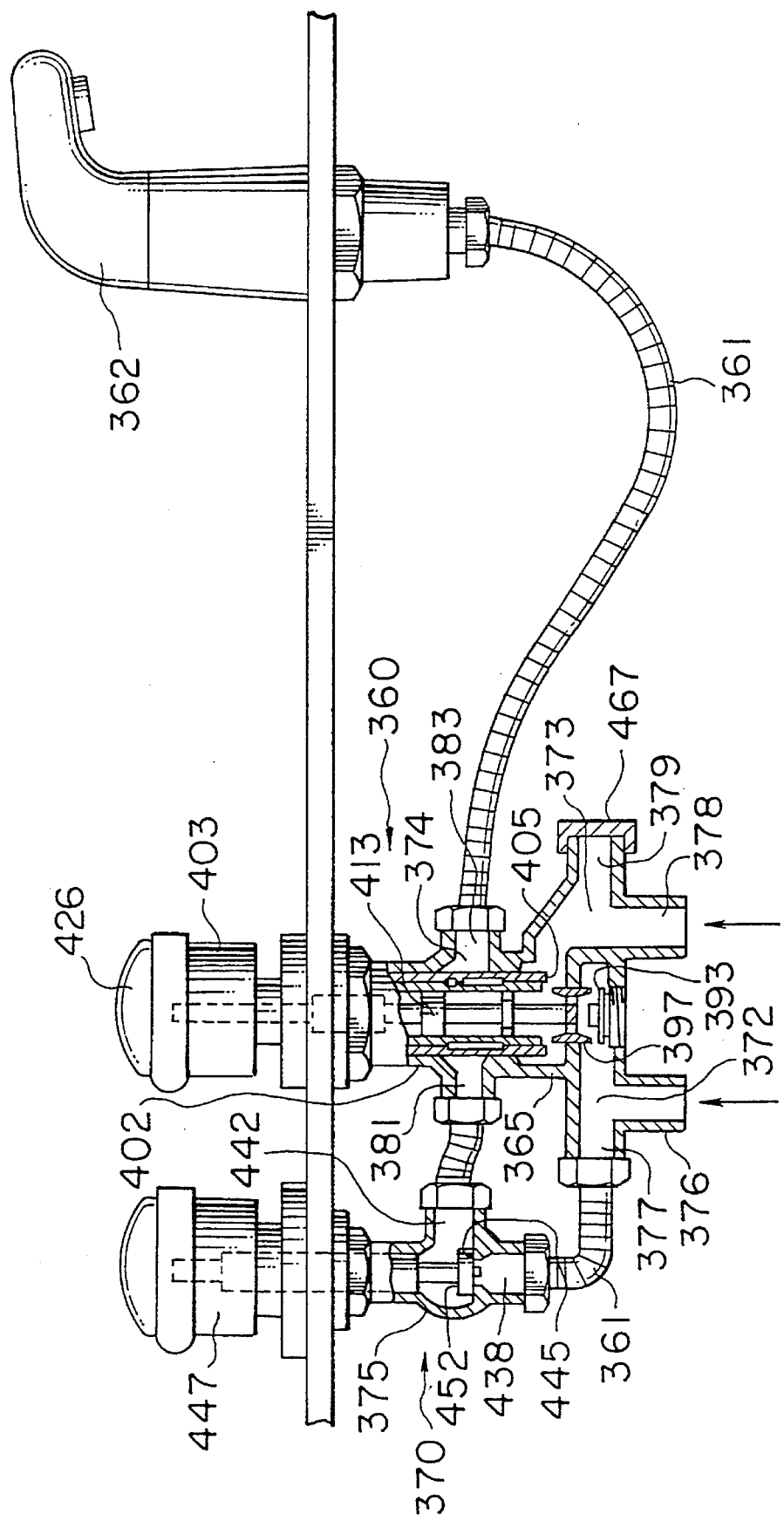
FIG. 104 is a cutaway side view of a hot and cold water mixing faucet assembly which is a modification of that shown in FIG. 100.

Although the automatic temperature control valve unit 360 is combined with both of the hot and the cold water valve units 370 and 380 in this embodiment, the present invention is not confined thereto but may be otherwise embodied so that an automatic temperature control valve unit 360 is combined with only one of a hot and a cold water valve units 370 and 380, as shown in FIG. 104. In the other embodiment, the unnecessary outflow holes of the automatic temperature control valve unit 360 such as a cold water outflow hole 379 and a cold water secondary inflow hole 382, are closed with caps 467. Besides, only one discharge means such as a shower spouter 362 may be provided in each of the embodiments. In that case, the water outflow hole 383 of the automatic temperature control valve is connected to the discharge means not through a changeover valve unit but through a communication pipe, a hose or the like.

Effects mentioned below can be produced by the hot and cold water mixing faucet assembly shown in FIGS. 100.

(1) Since the automatic temperature control valve unit exclusively for discharging the warm water of appropriate temperature is combined with the hot water valve unit exclusively for the hot water and the cold water valve unit exclusively for the cold water, so that the manipulation handles of the units are disposed independently of each other for the warm water, the hot water and the cold water, the assembly is less likely to be mistakenly manipulated to produce a danger of causing a scald or the like with the water discharged from the assembly.

(2) Since the warm water of appropriate temperature, the hot water and the cold water are sent through the exclusive valve units, respectively, it is not necessary to modulate the temperature of the cold or hot water up or down to an appropriate level to obtain the warm water of appropriate temperature, as is necessary in the conventional thermostatic mixing valve unit. In other words, the warm water of appropriate temperature can be instantly discharged from the assembly.

(3) Since each of the warm water of appropriate temperature, the hot water and the cold water can be sent by opening the exclusive valve unit, the desired water can be discharged through the single and simple manipulation of the unit.

(4) Since the warm water of appropriate temperature, the hot water and the cold water are sent through the exclusive valve units, the frequency of the use of each of the units is not only lower than in the conventional thermostatic mixing valve unit for sending each of the warm water, the hot water and the cold water by itself but also the constitution of the functional sections of the faucet assembly is simpler than in the conventional unit, to result in enhancing the reliability of the assembly.

(5) Since the automatic temperature control valve unit exclusively for the warm water of appropriate temperature is combined with the hot water valve unit exclusively for the hot water and the cold water valve exclusively for the cold water and these units are connected to each other through the communication pipes, hoses or the like, the bodies and functional sections of the units which require heavy processing, can be standardized to reduce the cost of the assembly, and the installation thereof can also be standardized to dispense with a high degree of installation technique.

(6) Since the automatic temperature control valve unit can be optionally combined with both or only one of the hot and the cold valve units, the constitution and operation of the assembly can be optimized depending on the condition of use thereof.

EXPLOITATION IN INDUSTRY

According to the present invention, a hot and cold water mixing faucet or faucet assembly is high in manipulating property and capable of stably discharging a warm water through the mixing of a hot and a cold waters can be provided to be used in a kitchen, a bathroom, lavatory or the like.

What is claimed is:

1. A hot and cold water mixing discharge device comprising a cold water inflow passage connected to a cold water source; a hot water inflow passage connected to a hot water source; a mixing chamber in which a cold water and a hot water are mixed together to make a warm water; an automatic temperature control means provided between said chamber and each of said passages so that the ratio of the flow rates of said cold and hot waters flowing into said chamber is automatically modulated by said means depending on a preset temperature for said warm water; a warm water passage communicating with said chamber; a by-pass including a cold water by-pass portion for connecting the cold water inflow passage to the warm water passage around the automatic temperature control means and a hot water by-pass portion for connecting the hot water inflow passage to said warm water passage around said control means; a flow rate control means provided at the downstream end of the by-pass in order to regulate the flow rate of said cold or hot water flowing from said by-pass to said warm water passage and the flow rate of the warm water; said flow rate control means being provided with a valve sheet having a cold water inflow hole, a hot water inflow hole and a warm water inflow hole and a valve means for controlling a fluid from said inflow holes; a single operating means for operating said flow rate control means; and a discharge port provided at the downstream end of said warm water passage.

2. A hot and cold water mixing discharge device according to the claim 1, wherein the flow rate control means includes a fixed valve body shaped nearly as a disk, and having a hot water inflow hole, a warm water inflow hole and a cold water inflow hole in that order at prescribed intervals along the circumference of said body; and a movable valve body shaped nearly as a disk, and having a plane surface water-tightly and slidably overlaid on said fixed valve member and capable of simultaneously covering all said three inflow holes, and a notch which can communicate with each of said holes and can simultaneously communicate with both of said hot and warm water inflow holes or with both of said cold and warm water inflow holes.

3. A hot and cold water mixing discharge device according to the claim 1, wherein the flow rate control means includes a fixed valve body shaped nearly as a disk, and having a hot water inflow hole, a warm water inflow hole and a cold water inflow hole in that order at prescribed intervals along the circumference of said body, and a water outflow hole provided inside an arc formed by said three inflow holes; and a movable valve body shaped nearly as a disk, and having a plane surface water-tightly and slidably overlaid on said fixed valve body and capable of simultaneously covering all said three inflow holes, an inlet opening which can communicate with each of said three flow holes and can also simultaneously communicate with both of said hot and warm water inflow holes and with both of said cold and warm water inflow holes, an outlet opening which can communicate with said outflow hole, and a communication opening connecting said inlet and outlet openings to each other.

4. A hot and cold water mixing discharge device according to the claim 1, wherein the automatic temperature control means includes a cold water inflow hole; a hot water inflow hole; a valve for opening and closing said cold water inflow hole; a valve for opening and closing said hot water inflow hole; a temperature detection means for detecting the temperature of the warm water; and a valve opening degree control means for regulating the degrees of opening of said valves on the basis of a detection signal from said detection means.

5. A hot and cold water mixing discharge device according to the claim 1, including automatic open/close valves provided in the cold and the hot water inflow passages, respectively; an object sensor disposed near the discharge port; a manipulation switch disposed away from the body of said device; and a valve opening and closing control means for opening or closing said valves on the basis of signals from said sensor and said switch.

6. A hot and cold water mixing discharge device according to the claim 1, wherein the flow rate control means includes a fixed valve body; a movable valve body water-tightly and slidably fitted thereon; and a handle coupled to said movable valve body and supported by the body of said device so that said handle can be vertically swung manually with the lever thereof to regulate the flow rate of the warm water about to be discharged from the discharge port, and can be horizontally turned manually with said lever to regulate the temperature of said warm water about to be discharged from said port.

* * * * *